US011666050B2

(12) United States Patent
Purschwitz et al.

(10) Patent No.: US 11,666,050 B2
(45) **Date of Patent: *Jun. 6, 2023**

(54) ENHANCING THE ANTIMICROBIAL ACTIVITY OF BIOCIDES WITH POLYMERS

(71) Applicant: BASF SE, Ludwigshafen (DE)

(72) Inventors: Janina Purschwitz, Bad Durkheim (DE); Stephan Hüffer, Ludwigshafen (DE); Alejandra Garcia Marcos, Ludwigshafen (DE); Menno Hazenkamp, Riehen (CH)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/744,679

(22) Filed: Jan. 16, 2020

(65) Prior Publication Data

US 2020/0221694 A1 Jul. 16, 2020

Related U.S. Application Data

(62) Division of application No. 14/374,005, filed as application No. PCT/IB2013/051326 on Feb. 19, 2013.

(60) Provisional application No. 61/600,725, filed on Feb. 20, 2012.

(30) Foreign Application Priority Data

Feb. 20, 2012 (EP) .................................... 12156172
Mar. 16, 2012 (EP) .................................... 12159866

(51) Int. Cl.

| | |
|---|---|
| ***A01N 37/04*** | (2006.01) |
| ***C08K 5/00*** | (2006.01) |
| ***A01N 33/04*** | (2006.01) |
| ***C08G 73/02*** | (2006.01) |
| ***A01N 33/12*** | (2006.01) |
| ***A01N 25/10*** | (2006.01) |
| ***A01N 31/14*** | (2006.01) |
| ***A01N 31/16*** | (2006.01) |
| ***A01N 33/20*** | (2006.01) |
| ***A01N 35/02*** | (2006.01) |

(52) U.S. Cl.
CPC ............ *A01N 37/04* (2013.01); *A01N 25/10* (2013.01); *A01N 31/14* (2013.01); *A01N 31/16* (2013.01); *A01N 33/04* (2013.01); *A01N 33/12* (2013.01); *A01N 33/20* (2013.01); *A01N 35/02* (2013.01); *C08G 73/0206* (2013.01); *C08K 5/0058* (2013.01)

(58) Field of Classification Search
None
See application file for complete search history.

(56) References Cited

U.S. PATENT DOCUMENTS 3,033,746 A 5/1962 Moyle et al.
3,301,783 A * 1/1967 Dickson ............... C10M 133/00 508/225
3,489,686 A 1/1970 Parran
3,629,477 A 12/1971 Model et al.
5,863,524 A 1/1999 Mason et al.
6,045,817 A * 4/2000 Ananthapadmanabhan ................ A61K 8/42 424/405
6,114,396 A 9/2000 Rens
6,261,581 B1 7/2001 Gebhardt et al.
6,322,802 B1 * 11/2001 Prusiner ................. A01N 33/04 128/114.1
6,784,168 B1 8/2004 Jones et al.
8,697,834 B2 4/2014 Schaub et al.
8,722,154 B2 * 5/2014 Li .......................... C09D 5/032 427/475
9,029,313 B2 5/2015 Man et al.
9,273,427 B2 3/2016 Williams et al.
2001/0055651 A1 12/2001 Mao et al.
2002/0028754 A1 3/2002 Johansen et al.
2002/0068014 A1 * 6/2002 Haught .................. A01N 37/40 422/28
2003/0003248 A1 1/2003 Forth et al.
2006/0040828 A1 2/2006 Mao et al.
2007/0010607 A1 1/2007 Smith et al.
2007/0231353 A1 10/2007 Gilbard et al.
2007/0237810 A1 10/2007 Wellinghoff (Continued)

FOREIGN PATENT DOCUMENTS

CA 1210009 A * 8/1986
CN 101812801 A 8/2010

(Continued)

OTHER PUBLICATIONS

Khalil et al. "Synergy between Polyethylenimine and Different Families of antibiotics against a Resistant Clinical Isolate of Pseudomonas aeruginosa" 2008.*

(Continued)

*Primary Examiner* — Danah Al-Awadi

(74) *Attorney, Agent, or Firm* — Marshall, Gerstein & Borun LLP

(57) ABSTRACT

Disclosed are compositions comprising a) an antimicrobial agent, which is selected from the group consisting of biocides containing halogen atoms and/or containing phenolic moieties, formic acid, chlorine dioxide, chlorine dioxide generating compounds, dialdehydes; components containing an antimicrobial metal such as antimicrobial silver, and b) a polyamine, especially a polyethylenimine. The polyamine is effective as a booster for the antimicrobial agent.

17 Claims, No Drawings

(56) References Cited

U.S. PATENT DOCUMENTS

| | | | | |
|---|---|---|---|---|
| 2008/0076314 | A1 | 3/2008 | Blanz et al. | |
| 2008/0200359 | A1* | 8/2008 | Smets | A61L 9/01 510/119 |
| 2008/0274929 | A1 | 11/2008 | Whitekettle et al. | |
| 2009/0226384 | A1* | 9/2009 | Mukhopadhyay | A61K 45/06 424/49 |
| 2009/0226394 | A1 | 9/2009 | Champ et al. | |
| 2009/0227457 | A1 | 9/2009 | Xu et al. | |
| 2010/0032084 | A1 | 2/2010 | Benaddi | |
| 2010/0086514 | A1 | 4/2010 | Liu et al. | |
| 2010/0093851 | A1 | 4/2010 | Blanton et al. | |
| 2010/0234357 | A1 | 9/2010 | Tsukamoto et al. | |
| 2010/0264359 | A1 | 10/2010 | Straetmans et al. | |
| 2011/0028563 | A1* | 2/2011 | Found | A01N 33/12 514/642 |
| 2011/0171279 | A1* | 7/2011 | Chisholm | A01N 31/16 424/411 |
| 2011/0224170 | A1 | 9/2011 | Wagner et al. | |
| 2011/0257321 | A1 | 10/2011 | Peretolchin et al. | |
| 2012/0004327 | A1* | 1/2012 | Bui | C08L 79/02 514/788 |
| 2012/0152149 | A1 | 6/2012 | Mijolovic et al. | |
| 2012/0207805 | A1 | 8/2012 | Colman et al. | |
| 2013/0076024 | A1 | 3/2013 | Lamontia et al. | |
| 2013/0137901 | A1 | 5/2013 | Strautmann et al. | |
| 2013/0150239 | A1 | 6/2013 | Premachandran et al. | |
| 2014/0296349 | A1 | 10/2014 | Both et al. | |
| 2015/0126479 | A1* | 5/2015 | Premachandran | A01N 25/02 514/161 |
| 2016/0130745 | A1 | 5/2016 | Williams et al. | |

FOREIGN PATENT DOCUMENTS

| | | | | |
|---|---|---|---|---|
| CN | 102245163 | A | | 11/2011 |
| CN | 102258064 | A | | 11/2011 |
| DE | 39 39 474 | A1 | | 6/1991 |
| EP | 2478149 | B1 | * | 7/2012 |
| JP | 5022044 | B2 | | 7/1975 |
| JP | 10182322 | | | 7/1998 |
| JP | H11189975 | A | | 7/1999 |
| JP | 2005-139142 | A | | 6/2005 |
| JP | 2007-254902 | A | | 10/2007 |
| JP | 2010-184987 | A | | 8/2010 |
| JP | 2010-540490 | A | | 12/2010 |
| JP | 2012-224563 | A | | 11/2012 |
| WO | WO-97/32477 | A1 | | 9/1997 |
| WO | WO-99/33345 | A1 | | 7/1999 |
| WO | WO-2006/117382 | A1 | | 11/2006 |
| WO | WO-2010/068888 | A2 | | 6/2010 |
| WO | WO-2010/077738 | A1 | | 7/2010 |
| WO | WO-2011/085067 | A1 | | 7/2011 |
| WO | WO 2011085067 | | * | 7/2011 |
| WO | WO-2013/076023 | A1 | | 5/2013 |
| WO | WO-2013/076025 | A1 | | 5/2013 |

OTHER PUBLICATIONS

"LUGALVAN-G 15000", Safety Data Sheet, BASF, Apr. 10, 2017, 6 pages.
"LUGALVAN-G 15000", Technical information, BASF, May 2000, 4 pages.
"Lupasol types", Technical Information, BASF, Sep. 2010, 10 pages.
"Polyethyleneimine,branched, M. W. 1800", Thermo Fisher Scientific, Safety Data Sheet, CAS No. 9002-98-6, 2018, 4 pages.
ECOLAB MSDS Oasis 146.
English language abstract of CN 101812801 Aug. 25, 2010.
English language abstract of CN 102258064 Nov. 30, 2011.
English language abstract of JP 10182322 Jul. 7, 1998.
European Search Report dated Jun. 20, 2012.
Finsgar et al., Electrochemical and XPS study of polyethyleneimines of different molecular sizes as corrosion inhibitors for AISI 430 stainless steel in near-neutral chloride media, Mat. Chem. Phys., 116:198-206 (2009).
Home Care application Mar. 19, 2012; IPCOM000216007D.
International Search Report dated Aug. 1, 2013.
Lupasol BASF.
Office Action for Japanese Patent Application No. 2014-557163, dated Aug. 2, 2016.
Petersen et al., Synthesis, characterization, and biocompatibility of polyethyleneimine-graft poly(ethylene glycol) block copolymers, Macromolecules, 35:6867-74 (2002).
Supplementary European Search Report for International Application No. EP 13 75 2044, dated Feb. 29, 2016 (10 pages).
Tilt et al., Repeatability and reproducibility of germicide tests: A literature review, J. AOAC Int., 82(2):384-9 (1999).
Khalil et al., Synergy between polyethylenimine and different families of antibiotics against a resistant clinical isolate of Pseudomonas aeruginosa, Antimicrob. Agents Chemother., 52(5):1635-41 (May 2008).
"Silwet L7600 Surfactant", MyBioSource, 2 pages.
"Uniquat 2250", Azelis Canada Inc., 7 pages.
Aono, et al., "Upside-Down Gliding of Lymnaea", The Biological Bulletin, vol. 215, Issue 3, Dec. 2008, pp. 272-279.

* cited by examiner

ENHANCING THE ANTIMICROBIAL ACTIVITY OF BIOCIDES WITH POLYMERS

CROSS-REFERENCE TO RELATED APPLICATIONS

This application is a division of U.S. patent application Ser. No. 14/374,005 (filed Jul. 23, 2014), which is incorporated herein by reference in its entirety and is a national stage of International Patent Application No. PCT/IB2013/051326 (filed Feb. 19, 2013), which claims the priority benefit of U.S. Provisional Application No. 61/600,725 (filed on Feb. 20, 2012).

The present invention relates to antimicrobial compositions comprising a biocide in combination with an polyamine, a method for enhancing the antimicrobial activity of a biocides, and the corresponding use of such aminopolymers as boosters for anti-microbial agents.

Antimicrobial effects of certain polymers containing quaternary ammonium groups has been described inter alia in WO06/117382, WO 97/32477. US-2011-171279 describes the antimicrobial activity of Triclosan, which has been chemically bonded to a polyethylenimine backbone.

It has now been found, that the antimicrobial action of common biocides may be greatly enhanced by addition of a polyamine.

The invention thus generally pertains to a composition comprising a) an antimicrobial agent and b) a polyamine, especially a polyethylenimine (PEI).

The antimicrobial agent (component a) is selected from the group consisting of chlorine dioxide, chlorine dioxide generating compounds, formic acid, and especially biocides containing halogen atoms, biocides containing phenolic moieties, and dialdehydes, as well as antimicrobial metal such as antimicrobial silver or components containing antimicrobial silver.

Preferred polyamines (component b) are of Mw higher than 400 g/mol, preferred classes are polyethyleneimines (PEIs).

As used in the present invention, these polymers generally are polycationic polymers or oligomers. Polycationic in the context of the invention means that the polymer has a minimum charge density of more than 1 meq/g, preferably from 5 to 25 meq/g, and more preferably from 10 to 20 meq/g, measured in each case at a pH of 4 to 5.

In accordance with the invention it is possible to use all polymers which either comprise free or alkyl-substituted amino groups or quaternary ammonium groups in the polymer chain or carry secondary or tertiary amino groups or quaternary ammonium groups attached to the polymer chain directly or via intermediate members. These amino groups or quaternary ammonium groups may also be members of 5- or 6-membered ring systems, such as of morpholine, piperidine, piperazine or imidazole rings, for example. In accordance with the invention the cationic polymer may be selected from polyamides, polyimines and polyamines, polydiallyldimethylammonium chloride, polyvinylamine, polyvinylpyridine, polyvinylimidazole, and polyvinylpyrrolidone, and also natural and semisynthetic polymers, including cationically modified starch.

The polycationic polymers for use in accordance with the invention preferably have a number-average molecular weight in the range from 500 to 2 000 000 g/mol, preferably 750 g/mol to 100 000 g/mol. As polycationic polymer (b) it is preferred to use polyethylenimine, the polyethylenimine preferably having a number-average molecular weight of 500 g/mol to 125 000 g/mol, and more preferably 750 g/mol to 100 000 g/mol.

The polycationic polymers may be present in linear or branched form or in the form of what are called dendrimers; preferably they are present in the form of dendrimers. Particular preference is given in accordance with the invention to using polyethylenimine in dendrimer form. The term dendrimer relates to a series of branched molecular structures, inter alia including dendrimers, star-like polymers and hyperbranched polymers.

Polyethylenimines of this kind are available, for example, under the trade name Lupasol® from BASF SE. A more precise description of such polyimines is found, for example, in Macromolecules vol. 2, H.-G. Elias, 2007 Vol. 2, pages 447 to 456.

One particularly preferred embodiment of the invention uses as said at least one polycationic polymer polyethylenimine having a number-average molecular weight of 500 g/mol to 125 000 g/mol, preferably of 750 g/mol to 100 000 g/mol, in dendrimer form.

In accordance with the invention at least one polycationic polymer (b) is used; hence there may be one polycationic polymer used or else mixtures of two, three or more polycationic polymers.

A survey on typical synthesis methods for polymers suitable in the invention may be found in C. Gao, D. Yan, Prog. Polym. Sci. 29 (2004), 183. Dendritic and hyperbranched polymers, as useful in the present invention, are further described in P. J. Flory, J. Am. Chem. Soc. 1952, 74, 2718, and H. Frey et al., Chemistry—A European Journal, 2000, 6, No. 14, 2499.

An important embodiment of the invention relates to a composition comprising b) at least one ethylenimine homopolymer (also recalled as polyethylenimine b).

In one embodiment, the polyethylenimine b) has a mean molecular weight $M_w$ from the range 500 to 1000000 g/mol, especially 600 to 75000 g/mol, more especially 800 to 25000 g/mol, as detectable by gel permeation chromatography (GPC).

Highly branched polyethylenimines b) are characterized by their degree of branching (DB). DB may be determined, for example, by $^{13}C$-NMR spectrometry, preferably in $D_2O$. DB is defined as follows:

$$DB=D+T/D+T+L$$

wherein D stands for the fraction of tertiary amino groups, L (linear) stands for the fraction of secondary amino groups, and T (terminal) stands for the fraction of primary amino groups.

Highly branched polyethylenimines, as preferred as present component (b), are those polyethylenimines whose DB ranges from 0.1 to 0.95, preferably 0.25 to 0.90, more preferably 0.30 to 0.80, almost preferably is 0.5 or higher, e.g. 0.5-0.8.

Most preferred are PEIs conforming in uncharged form with the (empirical) formula $-(CH_2-CH_2-NH)_n-$ wherein n ranges from approximately 10 to 100000, most especially from 10 to approximately 15000, and grafted variants thereof; end groups thus are predominantly amino and/or moieties of the grafting agent. Grafting is especially achieved by ethoxylation. The PEI backbone is usually branched, i.e. certain N-hydrogen atoms in the above formula are replaced by $CH_2-CH_2-NH_2$ or by a further polyethylenimine chain, which again may be branched, thus leaving the above empirical formula unchanged. PEIs are, under normal application conditions, e.g. in contact with water of pH close to the neutral such as pH 4-9 or pH 5-8, usually present in charged form as polycationic polymers or oligomers. Examples are the following species:

(I) Branched polyethylenimine of ca, molecular weight 800 (GPC) and charge density of 16 meq/g of dry substance, determined at pH 4.5, and ratio primary/secondary/tert. amino (as determined by $^{13}C$-NMR)=1/0.9/0.5 (product commercially available as Lupasol® FG).

(II) Branched polyethylenimine of ca, molecular weight 2000 (GPC; hereinafter referred to as PEI (II)).

(III) Branched polyethylenimine of ca, molecular weight 25000 (GPC), charge density of 17 meq/g of dry substance, determined at pH 4.5, and ratio primary/secondary/tert. amino (as determined by $^{13}C$-NMR)=1/1.1/0.7 (product commercially available as Lupasol® WF).

(IV) Ethoxylated polyethylenimine comprising 5 parts by weight of a branched polyethylenimine core of molecular weight 600-800 (GPC) and 95 parts by weight of moieties of formula $—CH_2—CH_2—O—$; hereinafter referred to as PEI (IV).

The antimicrobial agent (present component a) is within the definitions given, for example, selected from known biocides including pyrithiones, especially the sodium, copper and/or zinc complex (ZPT); Octopirox®; 1-(4-chlorophenyoxy)-1-(1-imidazolyl)3,3-dimethyl-2-butanone (Climbazol®), selensulfid; isothiazolinones such as methylchloroisothiazolinone/methylisothiazolinone (Kathon CG®); methylisothiazolinone, methylchloroisothiazolinone, octylisothiazolinone, benzylisothiazolinone, methylbenzisothiazolinone, butylbenzisothiazolinone, dichlorooctylisothiazolinone; inorganic sulphites and hydrogen sulphites, sodium sulfite; sodium bisulfite; imidazolidinyl urea (Germall 115®), diazolidinyl urea (Germall II®); ethyl lauroyl arginate, farnesol, benzyl alcohol, phenoxyethanol, phenoxypropanol, biphenyl-2-ol, phenethyl alcohol, 2,4-dichlorobenzyl alcohol, chlorbutanol, 1,2-diols, 1,2-pentandiol, 1,2-hexandiol, 1,2-octandiol, 1,2-propandiol, 3(2-ethylhexyloxy)propane (ethylhexylglycerin), 1,3-diols, 2-ethyl-1,3-hexandiol, ethanol, 1-propanol, 2-propanol; 5-bromo-5-nitro-1,3-dioxane (Bronidox®), 2-bromo-2-nitropropane-1,3-diol (Bronopol®); dibromhexamidin; formaldehyde, paraformaldehyde; iodopropynyl butylcarbamate (Polyphase P1000); chloroacetamide; methanamine; methyldibromonitrile glutaronitrile, (1,2dibromo-2,4-dicyanobutane or Tektamer®); glutaraldehyde; glyoxal; sodium hydroxymethylglycinate (Suttocide A®); polymethoxy bicyclic oxazolidine (Nuosept C®); dimethoxane; captan; chlorphenesin; dichlorophene; halogenated diphenyl ethers; 2,4,4'-trichloro-2'-hydroxy-diphenyl ether (Triclosan. or TCS); 4,4'-Dichloro-2-hydroxy-diphenyl ether (Diclosan); 2,2'-dihydroxy-5,5'-dibromo-diphenyl ether; phenolic compounds; phenol; Para-chloro-meta-xylenol (PCMX); 2-Methyl Phenol; 3-Methyl Phenol; 4-Methyl Phenol; 4-Ethyl Phenol; 2,4-Dimethyl Phenol; 2,5-Dimethyl Phenol; 3,4-Dimethyl Phenol; 2,6-Dimethyl Phenol; 4-n-Propyl Phenol; 4-n-Butyl Phenol; 4-n-Amyl Phenol; 4-tert-Amyl Phenol; 4-n-Hexyl Phenol; 4-n-Heptyl Phenol; Mono- and Poly-Alkyl and Aromatic Halophenols; p-Chlorophenol; Methyl p-Chlorophenol; Ethyl p-Chlorophenol; n-Propyl p-Chlorophenol; n-Butyl p-Chlorophenol; n-Amyl p-Chlorophenol; sec-Amyl p-Chlorophenol; Cyclohexyl p-Chlorophenol; n-Heptyl p-Chlorophenol; n-Octyl p-Chlorophenol; o-Chlorophenol; Methyl o-Chlorophenol; Ethyl o-Chlorophenol; n-Propyl o-Chlorophenol; n-Butyl o-Chlorophenol; n-Amyl o-Chlorophenol; tert-Amyl o-Chlorophenol; n-Hexyl o-Chlorophenol; n-Heptyl o-Chlorophenol; o-Benzyl p-Chlorophenol; o-Benzyl-m-methyl p-Chlorophenol; o-Benzyl-m; m-dimethyl p-Chlorophenol; o-Phenylethyl p-Chlorophenol; o-Phenylethyl-m-methyl p-Chlorophenol; 3-Methyl p-Chlorophenol; 3,5-Dimethyl p-Chlorophenol; 6-Ethyl-3-methyl p-Chlorophenol; 6-n-Propyl-3-methyl p-Chlorophenol; 6-iso-Propyl-3-methyl p-Chlorophenol; 2-Ethyl-3,5-dimethyl p-Chlorophenol; 6-sec-Butyl-3-methyl p-Chlorophenol; 2-iso-Propyl-3,5-dimethyl p-Chlorophenol; 6-Diethylmethyl-3-methyl p-Chlorophenol; 6-iso-Propyl-2-ethyl-3-methyl p-Chlorophenol; 2-sec-Amyl-3,5-dimethyl p-Chlorophenol; 2-Diethylmethyl-3,5-dimethyl p-Chlorophenol; 6-sec-Octyl-3-methyl p-Chlorophenol; p-Chloro-m-cresol: p-Bromophenol; Methyl p-Bromophenol; Ethyl p-Bromophenol; n-Propyl p-Bromophenol; n-Butyl p-Bromophenol; n-Amyl p-Bromophenol; sec-Amyl p-Bromophenol; n-Hexyl p-Bromophenol; Cyclohexyl p-Bromophenol; o-Bromophenol; tert-Amyl o-Bromophenol; n-Hexyl o-Bromophenol; n-Propyl-m,m-Dimethyl o-Bromophenol; 2-Phenyl Phenol; 4-Chloro-2-methyl phenol; 4-Chloro-3-methyl phenol; 4-Chloro-3,5-dimethyl phenol; 2,4-Dichloro-3,5-dimethylphenol; 3,4,5,6-Terabromo-2-methylphenol; 5-Methyl-2-pentylphenol; 4-Isopropyl-3-methylphenol Para-chloro-meta-xylenol (PCMX); Chlorothymol; Phenoxyethanol; Phenoxyisopropanol; 5-Chloro-2-hydroxydiphenylmethane; Resorcinol and its Derivatives; Resorcinol; Methyl Resorcinol; Ethyl Resorcinol; n-Propyl Resorcinol; n-Butyl Resorcinol; n-Amyl Resorcinol; n-Hexyl Resorcinol; n-Heptyl Resorcinol; n-Octyl Resorcinol; n-Nonyl Resorcinol; Phenyl Resorcinol; Benzyl Resorcinol; Phenylethyl Resorcinol; Phenylpropyl Resorcinol; p-Chlorobenzyl Resorcinol; 5-Chloro 2,4-Dihydroxydiphenyl Methane; 4'-Chloro 2,4-Dihydroxydiphenyl Methane; 5-Bromo 2,4-Dihydroxydiphenyl Methane; 4'-Bromo 2,4-Dihydroxydiphenyl Methane; bisphenolic compounds; 2,2'-methylene bis-(4-chlorophenol); 2,2'-methylene bis-(3,4,6-trichlorophenol); 2,2'-methylene bis-(4-chloro-6-bromophenol); bis(2-hydroxy-3,5-dichlorophenyl)sulfide; bis(2-hydroxy-5-chlorobenzyl)sulfide; halogenated carbanilides; 3,4,4'-trichlorocarbanilides (Triclocarban® or TCC); 3-trifluoromethyl-4,4'-dichlorocarbanilide; 3,3',4-trichlorocarbanilide; chlorohexidine and its digluconate; diacetate and dihydrochloride; hydroxybenzoic acid and its salts and esters (parabenes); methylparaben, ethylparaben, propylparaben, butylparaben, isopropylparaben, isobutylparaben, benzylparaben, sodium methylparaben, sodium propylparaben; benzoic acid and its salts, lactic acid and its salts, citric acid and its salts, formic acid and its salts, performic acid and its salts, propionic acid and its salts, salicylic acid and its salts, sorbic acids and its salts, 10-undecylenic acid and its salts; decanoic acid and its salts; dehydroacetic acid, acetic acid, peracetic acid, bromoacetic acid, nonanoic acid, lauric acid and its salts, glyceryl laurate, hydrochloric acid and its salts, sodium hypochlorite, hydrogen peroxide, sodium hydroxy methyl-aminoacetate, sodium hydroxymethylglycinate, thiabendazole, hexetidine (1,3-bis(2-ethylhexyl)-hexahydro-5-methyl-5-pyrimidine); poly(hexamethylenebiguanide) hydrochloride (Cosmocil); hydroxy biphenyl and its salts such as ortho-phenylphenol; dibromo hexamidine and its salts including isethionate (4,4'-hexamethylenedioxy-bis(3-bromo-benzamidine) and 4,4'-hexamethylenedioxy-bis(3-bromo-benzamidinium 2-hydroxyethanesulfonate); mercury, (aceto-o)phenyl (i.e. phenyl mercuric acetate) and mercurate (2-), (orthoboate(3-) o)phenyl, dihydrogene (i.e. phenyl mercuric borate); 4-chloro-3,5-dimethylphenol (Chloroxylenol); poly-(hexamethylene biguanide) hydrochloride; 2-benzyl-4-chlorphenol (Methenamine); 1-(3-chloroallyl)-3,5,7-triaza-1-azonia-adamantanchloride (Quaternium 15), 1,3-bis (hydroxymethyl)-5,5-dimethyl-2,4-imidazolidinedione (DMDM hydantoin, Glydant®); 1,3-Dichloro-5,5-dimethylhydantoin; 1,2-dibromo-2,4-dicyano butane; 2,2' methylene-bis(6-bromo-4-chloro phenol) bromochlorophene; 2-benzyl-4-chlorophenol (Chlorophenone); chloracetamide; 3-(4-chlorophenoxy)-1,2-propandiol(chlorophenesin); phenylmethoxymethanol and ((phenylmethoxy)methoxy) methanol (benzylhemiformal); N-alkyl(C12-C22)trimethyl ammoniumbromide and—chloride (cetrimonium bromide, cetrimonium chloride); dimethydidecylammonium chloride; benzyl-dimethyl-(4-(2-(4-(1,1,3,3-tetramethylbutyl)-phenoxy)-ethoxy)-ethyl)-ammonium chloride (benzethonium chloride); Alkyl-(C8-C18)-dimethyl-benzylammonium chloride, —bromide and saccharinate (benzalkonium chloride, benzalkonium bromide, benzalkonium saccharinate); mercurate (1-ethyl)2-mercaptobenzoate(2-)-O,S—, hydrogene (Thiomersal or Thiomerosal); silver compounds such as organic silver salts, inorganic silver salts, silver chloride including formulations thereof such as JM Acticare® and micronized silver particles, organic silver complexes such as for example silver citrate (Tinosan SDC®) or inorganic silvers such as silver zeolites and silver glass compounds (e.g. Irgaguard® B5000, Irgaguard® B6000, Irgaguard® B7000) and others described in WO-A-99/18790, EP1041879B1, WO2008/128896; inorganic or organic complexes of metal such as Cu, Zn, Sn, Au etc.; geraniol, tosylchloramide sodium (Chloramin T); 3-(3,4-dichlorphenyl)-1,1-dimethylharnstoff (Diuron®); dichlofluanid; tolylfluanid; terbutryn; cybutryne; (RS)-4-[1-(2,3-dimethylphenyl)ethyl]-3Himidazole; 2-butanone peroxide; 4-(2-nitrobutyl)morpholine; N-(3-aminopropyl)-Ndodecylpropane-1,3-diamine (Diamin®); dithio-2,2'-bis(N-methylbenzamide); mecetroniumetilsulfat; 5-ethyl-1-aza-3,7-dioxabicyclo-(3,3,0)octan; 2,2-dibromo-2-cyanoacetamide; methylbenzimidazol-2-ylcarbamat (Carbendazim®); 1,2-dibromo-2,4-dicyanobutane; 4,4-Dimethyloxazolidine; tetrakis(hydroxymethyl)phosphonium sulfate; octenidine dihydrochloride; tebuconazole; glucoprotamine; Amines, n-C10-16-alkyltrimethylenedi-, reaction products with chloroacetic acid (Ampholyte 20®), PVP iodine; sodium iodinate, 1,3,5-Tris-(2-hydroxyethyl)-1,3,5-hexahydrotriazin; Dazomet.

Preferred antimicrobial agents are selected from the group consisting of dialdehydes; components containing an antimicrobial metal such as antimicrobial silver; formic acid, and antimicrobial compounds of molecular weight 80 to about 400 g/mol. Most important as present component (a) are dialdehydes and especially biocides containing halogen atoms and/or phenolic moieties. Phenolic moieties generally are moieties of phenol (i.e. hydroxybenzene) or etherified or esterified variants thereof, which are contained in the biocide molecule or make up the biocide molecule (example: phenoxyethanol). The biocides containing halogen atoms, and the biocides containing phenolic moieties, usually are monomeric compounds of molecular weight 80 to about 400 g/mol. Dialdehydes generally are of the same molecular weight range or less (like 1,2-ethanedial of molecular weight 58 g/mol).

Monomeric antimicrobials of molecular weight 80 to about 400 g/mol may be selected from the above list.

Components containing antimicrobial silver generally are active by releasing small amounts of silver; suitable components of this class are described as elemental silver, silver compounds and/or silver incorporated into a support material e.g. in WO2008/128896. Preferred are silver zeolites and silver glass compounds (e.g. Irgaguard® B5000, Irgaguard® B6000, Irgaguard® B7000) and others described in WOA-99/18790, EP1041879B1, WO2008/128896; preferred components of this class like silver zeolites, silver glass, usually contain 0.25-5% b.w. of silver; the support material may contain up to 70% b.w., preferably 3-65% b.w., of zinc (Zn, generally in ionic form bound in glass or zeolite).

A subject of specific technical interest in the present invention pertains to a combination of present component (b), especially polyethylene-imines (PEIs), with the biocidal active chlorine dioxide in aqueous solution. Preferably, the chlorine dioxide is generated via a water soluble or water dispersable solid tablet comprising NaClO2 (commercially available under the trade name Aseptrol®).

More preferred as component (a) are biocides from the class containing halogen (especially Cl or Br) atoms and/or containing phenolic moieties, formic acid, chlorine dioxide or chlorine dioxide generating compounds, or dialdehydes.

Some biocide components (a) of special importance are the compounds:

i) 2-Bromo-2-nitropropane-1,3-diol (Bronopol®) of the formula

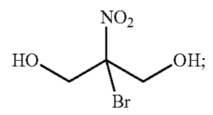

ii) 1,5-Pentandial (also known as glutaraldehyde) of the formula $OHC(CH_2)_3CHO$;

iii) 2-Phenoxyethanol of the formula Phenyl-O—$CH_2CH_2$—OH;

iv) formic acid of the formula H(CO)OH;

v) 1,2-ethanedial of the formula H(CO)(CO)H;

vi) 2,4-Dichlorobenzyl alcohol of the formula

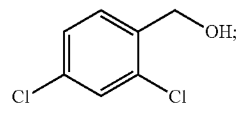

vii) 3,5-Dimethyl-1,3-5-thiadiazinane-2-thione of the formula

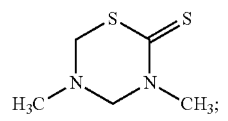

viii) 1,3,5-Tris-(2-hydroxyethyl)-hexahydro-1,3,5-triazine of the formula

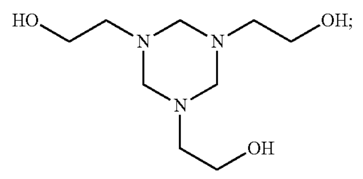 [SMILES: OCCN1CN(CCO)CN(CCO)C1]

ix) 2-Methylthio-4-tert-butylamino cyclopropylamino-6-(1,3,5-triazine) of the formula

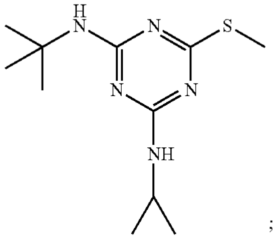 [SMILES: CSc1nc(NC(C)C)nc(NC(C)(C)C)n1]

;

x) 2,4,4'-Trichloro 2'-hydroxydiphenylether of the formula

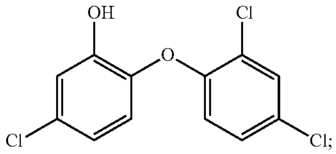 [SMILES: Oc1cc(Cl)ccc1Oc1ccc(Cl)cc1Cl]

xi) 4,4'-Dichloro 2'-hydroxydiphenylether of the formula

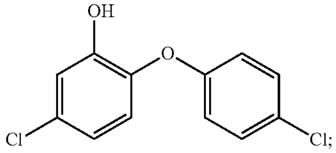 [SMILES: Oc1cc(Cl)ccc1Oc1ccc(Cl)cc1]

xii) silver-glass;
xiii) silver zeolite.

The biocide component (a) according to the invention may be a single compound or a mixture of compounds.

On 1 part by weight of the biocide (component a), the present composition preferably comprises 0.001 to 1000, especially 0.001 to 10, parts by weight of component (b).

The invention further relates to a biocidal composition, which composition contains 0.001 to 5% b.w. of the biocide (component a), relative to the total weight of the composition.

Summarizing the effects found in the present invention, it is noted that:

1. Polyamines such as PEI may show antimicrobial, preservative and/or microorganism adhesion inhibiting effects.
2. Especially, PEIs with the preferred structural features as described above (see passages ranging from page 1, line 22, to page 3, line 37) may show anti-microbial, preservative and/or microorganism adhesion inhibiting effect.
3. Beside the effects described under 1 and 2, low concentrations of PEIs, and combinations of PEIs which do not show antimicrobial or preservation activity or microorganism adhesion inhibiting effects on their own, are able to increase the anti-microbial efficacy of biocides.
4. Surprisingly, especially PEIs as described above (see passages ranging from page 1, line 22, to page 3, line 37) and combinations of these PEIs increase the anti-microbial efficacy of biocides at concentrations of the PEIs which usually don't show anti-microbial or preservation activity or only very weak antimicrobial activity.
5. PEIs as described above (see passages ranging from page 1, line 22, to page 3, line 37) are especially able to increase the activity of the following biocides: phenoxyethanol, bronopol, Tinosan H P100, glutaraldehyde.
6. According to the invention, combinations as described under 1 to 5 are used in the antimicrobial treatment, deodorization and disinfection if the skin, mucosa and hair.
7. According to the invention, combinations as described under 1 to 5 are used for preservation of cosmetic products.
8. According to the invention, combinations as described under 1 to 5 are used in hand disinfection.
9. According to the invention, combinations as described under 1 to 5 are in the shape of hand soaps, hygienic hand rubs or surgical scrubs.
10. According to the invention, combinations as described under 1 to 5 are used in disinfection of inanimate surfaces, fabrics, medical and surgical instruments, swimming pools, chemical toilets and waste bins, barns and animal housings.
11. According to the invention, combinations as described under 1 to 5 and used as described in section 10 can be in the physical state of liquid and powder detergents, hygienic fabric rinsers, all-purpose cleaners, disinfection sprays, sachets etc.
12. According to the invention, combinations as described under 1 to 5 are used in in—can preservation.
13. According to the invention, combinations as described under 1 to 5 as used in section 12 are used in preservation of raw materials, paints, adhesives, dispersions, home care products like detergent cleaners, all-purpose cleaners, manual dish wash; colorants.
14. According to the invention, combinations as described under 1 to 5 are used in the preservation of metal working fluids and drilling muds.
15. According to the invention, combinations as described under 1 to 5 are used in the treatment of organic or synthetic textile fibre materials and leather.
16. According to the invention, combinations as described under 1 to 5 are used in water-treatment applications like preservation and disinfection of cooling water reservoirs and cycles, cleaning of reverse-osmosis membranes.
17. According to the invention, combinations as described under 1 to 5 are used in pulp and paper applications.
18. According to the invention, combinations as described under 1 to 5 are used in production and processing of mineral oil.
19. According to the invention, combinations as described under 1 to 5 are used in marine anti-fouling application.
20. According to the invention, combinations as described under 1 to 5 are used in odor-control applications like waste bin deodorization, treatment of rental cars and campers, room sprays.
21. According to the invention, combinations as described under 1 to 5 are anti-microbial compositions comprising a synergistic mixture, the first component of which is a PEI as described above (see passages ranging from page 1, line 22, to page 3, line 37) and the second component of which is a commercial biocide as described above, especially selected from the class containing halogen (especially Cl or Br) atoms and/or containing phenolic moieties, like Tinosan HP 100, bronopol, phenoxyethanol; wherein the ratio of the first component to the second component is 1/0.001 to 1/1000; and wherein the composition has 0.001% up to 5% of the biocide present.
22. According to the invention, compositions as under section 21 are used in the anti-microbial treatment, deodorization and disinfection if the skin, mucosa and hair.
23. According to the invention, compositions as under section 21 are used for preservation of cosmetic products.

24. According to the invention, compositions as under section 21 are used in hand disinfection.
25. According to the invention, compositions as under section 24 are in the shape of hand soaps, hygienic hand rubs or surgical scrubs.
26. According to the invention, compositions as under section 21 are used in disinfection of inanimate surfaces, fabrics, medical and surgical instruments, swimming pools, chemical toilets and waste bins, barns and animal housings.
27. According to the invention, products as under section 26 can be in the physical state of liquid and powder detergents, hygienic fabric rinsers, all-purpose cleaners, disinfection sprays, sachets etc.
28. According to the invention, compositions as under section 21 are used in in-can preservation.
29. According to the invention, compositions as under section 28 are used in preservation of raw materials, paints, adhesives, dispersions, home care products like detergent cleaners, all-purpose cleaners, manual dish wash; colorants.
30. According to the invention, compositions as under section 21 are used in preservation of metal working fluids and drilling muds.
31. According to the invention, compositions as under section 21 are used in the treatment of organic or synthetic textile fibre materials.
32. According to the invention, compositions as under section 21 are used in water-treatment applications like preservation and disinfection of cooling water reservoirs and cycles, cleaning of reverse-osmosis membranes.
33. According to the invention, compositions as under section 21 are used in pulp and paper applications.
34. According to the invention, compositions as under section 21 are used in production and processing of mineral oil.
35. According to the invention, compositions as under section 21 are used in marine anti-fouling application.
36. According to the invention, compositions as under section 21 are used in odourcontrol applications like waste bin deodorization, treatment of rental cars and campers, room sprays.

Home Care Application

Antimicrobial compounds like those of present component (b) can be formulated into cleaning and disinfecting products. These may be cleaning products for hard surfaces, laundry detergents, fabric conditioners, hand dishwash products, products for disinfection and sanitization of hard surfaces, all purpose cleaners, floor cleaners, glass cleaners, kitchen cleaners, bath cleaners, sanitary cleaners, hygiene rinse products for fabrics, carpet cleaners, furniture cleaners, but also products for conditioning, sealing, caring or treating hard and soft surfaces. The cleaning and disinfecting products can be solids, powders, granules, cakes, bars, tablets, liquids, pastes or gels. They may be ready to use products, or concentrates which are diluted before or during the cleaning, washing, treating or conditioning process.

The purposes of the cleaning and disinfecting products containing BIOCIDE are the killing, control and/or inhibition of growth of microorganisms, like bacteria, fungi, yeasts, viruses and algae on the hard and soft surfaces that are treated with the product. The BIOCIDE can also have a benefit in the sense that it manipulates the metabolism of the mentioned microorganisms on these surfaces, which may result in fewer odours. The effect can be a quick effect which takes place and is finished within the treatment period. But the antimicrobial effect can also be a longer lasting effect, which continues to take place on the treated surfaces, after application. Below we will use the phrase "anti-microbial effect" to refer to all these effects mentioned in this paragraph.

Present invention thus includes cleaning and disinfecting product formulations comprising (a) 0.01-10% of a combination of present components (a) and (b), i.e. BIOCIDE and polyamine, and at least one of the following components (c) 0-80% of one or more surface active agents (d) 0-50% of one or more hydrotropic agent(s)

(e) 0-50% of one or more further additive(s) that may improve the antimicrobial effect of the cleaning or disinfecting product.

(f) 0-10% of one or more agent(s) that can stabilize the active BIOCIDE in the formulation.

Examples for the components (c) to (f) are given below:

(c) Surface Active Agents

Surface active agents will normally comprise at least one surfactant which may be anionic, cationic, nonionic or amphoteric.

The anionic surfactant can be, for example, a sulfate, sulfonate or carboxylate surfactant or a mixture thereof. Often used are alkylbenzenesulfonates, alkyl sulfates, alkyl ether sulfates, olefin sulfonates, fatty acid salts, alkyl and alkenyl ether carboxylates or to an a-sulphonic fatty acid salt or an ester thereof.

Often used sulfonates are, for example, alkylbenzenesulfonates having from 10 to 20 carbon atoms in the alkyl radical, alkyl sulfates having from 8 to 18 carbon atoms in the alkyl radical, alkyl ether sulfates having from 8 to 18 carbon atoms in the alkyl radical, and fatty acid salts derived from palm oil or tallow and having from 8 to 18 carbon atoms in the alkyl moiety. The average molar number of ethylene oxide units added to the alkyl ether sulfates is from 1 to 20, preferably from 1 to 10. The cation in the anionic surfactants is preferably an alkaline metal cation, especially sodium or potassium, more especially sodium. Preferred carboxylates are alkali metal sarcosinates of formula R19'-CON(R20')CH2COOM1 wherein R19' is C9-C17alkyl or C9-C17alkenyl, R20' is C1-C4alkyl and M1 is an alkali metal, especially sodium.

The non-ionic surfactant may be, for example, a primary or secondary alcohol ethoxylate, especially a C8-C20 aliphatic alcohol ethoxylated with an average of from 1 to 20 mol of ethylene oxide per alcohol group. Preference is given to primary and secondary C10-C15 aliphatic alcohols ethoxylated with an average of from 1 to 10 mol of ethylene oxide per alcohol group. Non-ethoxylated non-ionic surfactants, for example alkylpolyglycosides, glycerol monoethers and polyhydroxyamides (glucamide), may likewise be used.

In addition to anionic and/or non-ionic surfactants the composition may contain cationic surfactants. Possible cationic surfactants include all common cationic surface-active compounds, especially surfactants having a textile softening effect.

Non-limiting examples of cationic surfactants are given in by the below formulae:

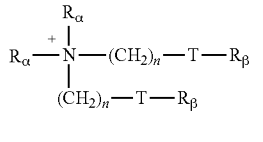

-continued

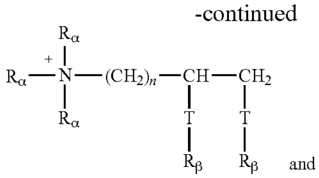

and

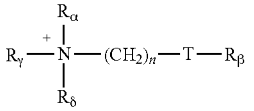

wherein each radical $R_\alpha$ is independent of the others C1-6-alkyl-,-alkenyl- or -hydroxyalkyl;

each radical $R_\beta$ is independent of the others C8-28-alkyl- or alkenyl;

$R\gamma$ is $R_\alpha$ or $(CH_2)_n$-T-$R_\beta$;

$R_\delta$ is $R_\alpha$, or $R_\beta$ or $(CH_2)_n$-T-$R_\beta$; T=—$CH_2$—, —O—CO— or —CO—O— and n is between 0 and 5.

Preferred cationic surfactants present in the composition according to the invention include hydroxyalkyl-trialkyl-ammonium-compounds, especially C12-18-alkyl(hydroxyethyl)-dimethylammonium compounds, and especially preferred the corresponding chloride salts.

(d) Hydrotropic Agents

The hydrotropic agents comprise for example: ethoxylated or non ethoxylated monoalcohols, diols or polyols with a low number of carbon atoms or their ethers (e.g. ethanol, isopropanol, 1,2-dipropanediol, propyleneglycol, glyerin, ethylene glycol, ethylene glycol monoethylether, ethylene glycol monobutylether, propylene glycol monomethylether, propylene glycol monoethylether, propylene glycol monobutylether, diethylene glycol monomethylether; diethylene glycol monoethylether, diethylene glycol monobutylether and similar products). The polyols that come into consideration for that purpose have preferably from 2 to 15 carbon atoms and at least two hydroxy groups. The polyols may also contain further functional groups, especially amino groups, and/or may be modified with nitrogen. Typical examples are as follows: glycerol, alkylene glycols, for example ethylene glycol, diethylene glycol, propylene glycol, butylene glycol, hexylene glycol and also polyethylene glycols having an average molecular weight of from 100 to 1000 Dalton; technical oligoglycerol mixtures having an intrinsic degree of condensation of from 1.5 to 10, for example technical diglycerol mixtures having a diglycerol content of from 40 to 50% by weight; methylol compounds, such as, especially, trimethylolethane, trimethylolpropane, trimethylolbutane, pentaerythritol and dipentaerythritol; lower alkyl-glucosides, especially those having from 1 to 8 carbon atoms in the alkyl radical, for example methyl and butyl glucoside; sugar alcohols having from 5 to 12 carbon atoms, for example sorbitol or mannitol; sugars having from 5 to 12 carbon atoms, for example glucose or saccharose; amino sugars, for example glucamine; dialcohol amines, such as diethanolamine or 2-amino-1,3-propanediol.

Other hydrotropic agents (d) comprise for example those mentioned in WO02/48298 A1 from page 7, 4th paragraph to page 8 under the "components (b)" and more specifically cumene sulfonate, ammonium cumene sulfonate, ammonium xylene sulfonate, potassium toluene sulfonate, sodium toluene sulfonate, sodium xylene sulfonate, toluene sulforic acid and xylene sulfonic acid.

(e) Further Additives, Improving the Antimicrobial Effect of the Formulation

Examples for the other components (e) are organic acids like simple c1-c6 linear or branched mono- and di- and tri-carboxylic acids like formic acid, acetic acid, propanoic acid, oxalic acid and further organic acids like lactic acid, citric acid, tartric acid, mandelic acid, benzoic acid, salicylic acid, glutaric acid, sorbic acid and succinic acid.

Other components (e) can be cationic polymers, for example, cationic cellulose derivatives, for example a quaternised hydroxymethyl cellulose obtainable under the name Polymer JR 400 from Amerchol, cationic starches, homopolymers and copolymers comprising diallyldimethylammonium chloride (DADMAC) monomers, polyvinylamines, copolymers of diallylammonium salts and acrylamides, quarternised vinylpyrrolidone/vinyl imidazole polymers, for example Luviquat® (BASF), condensation products of polyglycols and amines, quaternised collagen polypeptides, for example lauryldimonium hydroxypropyl hydrolyzed collagen (Lamequa®L/Grünau), quaternised wheat polypeptides, polyethyleneimine, cationic silicone polymers, for example amidomethicones, copolymers of adipic acid and dimethylaminohydroxypropyldiethylenetriamine (Cartaretin/Sandoz), copolymers of acrylic acid with dimethyldiallylammonium chloride (Merquat 550/Chemviron), polyaminopolyamides, as described, for example, in FR-A2 252 840, and the crosslinked water-soluble polymers thereof, cationic chitin derivatives, for example of quaternised chitosan, optionally distributed as microcrystals; condensation products of dihaloalkyls, for example dibromobutane, with bisdialkylamines, for example bisdimethylamino-1,3-propane, cationic guar gum, for example Jaguar C17, Jaguar C-16 from Celanese, quaternised ammonium salt polymers, for example Mirapol A-15, Mirapol AD-1, Mirapol AZ-1 from Miranol.

Other additives (e) comprise metal chelating and—complexing agents for example, EDTA, NTA, alaninediacetic acid or phosphonic acids, ethylene di-amine tetra acetic acid (EDTA), beta-alanine diacetic acid (EDETA), phosphonomethyl chitosan, carboxymethyl chitosan, hydroxyethylene di-amino tetraacetic acid, nitrilotriacetic acid (NTA) and ethylenediamine disuccinic acid (S,S-EDDS, R,R-EDDS or S,R-EDDS), alkali metal phosphates, like tripolyphosphates, polycarboxylates, polycarboxylic acids, organic phosphonates, aminoalkylenepoly(alkylenephosphonates), amino acid acetates like MGDA (Trilon M, BASF), and Dissolvine GL (AKZO), as well as asparaginic acid derivatives, such as Baypure CX (Lanxess).

Here examples of polycarboxylates are polyhydroxycarboxylates, like citrates, and acrylates, and copolymers thereof with maleic anhydride. Example of polycarboxylic acids are nitrilotriacetic acid, ethylenediaminetetraacetic acid and ethylenediamine disuccinate either in racemic form or in the enantiomerically pure (S,S) form.

Here, examples of phosphonates or aminoalkylenepoly (alkylenephosphonates) are alkali metal salts of 1-hydroxyethane-1,1-diphosphonic acid, nitrilotris(methylenephosphonic acid), ethylenediaminetetramethylenephosphonic acid and diethylenetriaminepentamethylenephosphonic acid, and also salts thereof.

Further examples of polyphosphonates are those having have the following formula

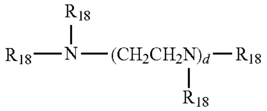

wherein $R_{18}$ is $CH_2PO_3H_2$ or a water soluble salt thereof and d is an integer of the value 0, 1, 2 or 3.

(f) Stabilizing Agent

Components (f) are for example reducing agents, anti-oxidants and metal complexing/chelating agents.

Metal chelating and—complexing agents are for example those mentioned under the components (e), see above.

Reducing agents and anti-oxidants are for example the reducing agents mentioned in German patent DE2020968, page 3.

Further examples for stabilizing agents (f) are for example the acids, acid generating substances, anti-oxidants, mild reducing agents and sequestering agents mentioned in Research Disclosure (1982), 213 471-2

Here further examples for anti-oxidants are those from the BASF Tinogard range, like Tinogard LO1, Tinogard MD1, Tinogard NO, Tinogard Q, Tinogard TS, Tinogard TT.

Personal Care Preparations

The personal care compositions provided on the following slides, containing Biocides in combination with non-ionic surfactants and/or anionic surfactant and/or cationic surfactants and/or amphoteric surfactants present at a concentration effective to preserve the composition against microbes and/or to confer an antimicrobial effect on a person to whom it is applied. Such compositions are non-toxic, cost-effective and shelf-stable over prolonged periods.

Anti-microbial compositions of the inventions are contained in a wide variety of cosmetic preparations. There come into consideration, for example, especially the following preparations:

- skin-care preparations, e.g. skin-washing and cleansing preparations in the form of tablet-form or liquid soaps, soapless detergents or washing pastes,
- bath preparations, e.g. liquid (foam baths, milks, shower preparations) or solid bath preparations, e.g. bath cubes and bath salts;
- skin-care preparations, e.g. skin emulsions, multi-emulsions or skin oils;
- cosmetic personal care preparations, e.g. facial make-up in the form of day creams or powder creams, face powder (loose or pressed), rouge or cream make-up, eye-care preparations, e.g. eyeshadow preparations, mascara, eyeliner, eye creams or eye-fix creams; lip-care preparations, e.g. lipsticks, lip gloss, lip contour pencils, nail-care preparations, such as nail varnish, nail varnish removers, nail hardeners or cuticle removers;
- foot-care preparations, e.g. foot baths, foot powders, foot creams or foot balsams, special deodorants and anti-perspirants or callus-removing preparations;
- light-protective preparations, such as sun milks, lotions, creams or oils, sunblocks or tropicals, pre-tanning preparations or after-sun preparations;
- skin-tanning preparations, e.g. self-tanning creams;
- depigmenting preparations, e.g. preparations for bleaching the skin or skinlightening preparations;
- insect-repellents, e.g. insect-repellent oils, lotions, sprays or sticks;
- deodorants, such as deodorant sprays, deodorant aerosols, pump-action sprays, deodorant gels, sticks or roll-ons, also waterfree-deodorant aersols or sticks;
- antiperspirants, e.g. antiperspirant sticks, creams or roll-ons, also waterfreeantiperspirant aerosols and water-free antiperspirant sticks;
- preparations for cleansing and caring for blemished skin, e.g. synthetic detergents (solid or liquid), peeling or scrub preparations or peeling masks;
- hair-removal preparations in chemical form (depilation), e.g. hair-removing powders, liquid hair-removing preparations, cream- or paste-form hair-removing preparations, hair-removing preparations in gel form or aerosol foams;
- shaving preparations, e.g. shaving soap, foaming shaving creams, non-foaming shaving creams, foams and gels, preshave preparations for dry shaving, aftershaves or aftershave lotions;
- fragrance preparations, e.g. fragrances (eau de Cologne, eau de toilette, eau de parfum, parfum de toilette, perfume), perfume oils or perfume creams;
- cosmetic hair-treatment preparations, e.g. hair-washing preparations in the form of shampoos and conditioners, hair-care preparations, e.g. pretreatment preparations, hair tonics, styling creams, styling gels, pomades, hair rinses, treatment packs, intensive hair treatments, hair-structuring preparations, e.g. hair-waving preparations for permanent waves (hot wave, mild wave, cold wave), hairstraightening preparations, liquid hair-setting preparations, hair foams, hairsprays, bleaching preparations, e.g. hydrogen peroxide solutions, lightening shampoos, bleaching creams, bleaching powders, bleaching pastes or oils, temporary, semi-permanent or permanent hair colourants, preparations containing self-oxidising dyes, or natural hair colourants, such as henna or camomile.
- Antidandruff preparations in the form of shampoos, conditioners, hair tonics, styling creams or gels or treatments packs Some appropriate personal care compositions include deodorants, antiperspirants, skin care products for facial, foot, hand and whole body uses, sun protection products, personal cleaning products, hair care products, feminine hygiene products, oral care products and decorative cosmetics such as lipsticks, mascara, facial makeup crémes and rouge.

Suitable cosmetic preparation may exist in a wide variety of forms, for example:

- in the form of liquid preparations as a W/O, O/W, O/W/O, W/O/W or PIT emulsion and all kinds of microemulsions,
- in the form of a gel,
- in the form of an oil, a cream, milk or lotion,
- in the form of a powder, a lacquer, a tablet or make-up,
- in the form of a stick,
- in the form of a spray (spray with propellent gas or pump-action spray) or an aerosol,
- in the form of a foam, or
- in the form of a paste.

The cosmetic or pharmaceutical preparations may be, for example, creams, gels, lotions, alcoholic and aqueous/alcoholic solutions, emulsions, wax/fat compositions, stick preparations, powders or ointments.

Of special importance as cosmetic preparations for the hair, espiacially with the purpose of antidandruff treatment are the above-mentioned preparations for hair treatment, especially hair-washing preparations in the form of shampoos, hair conditioners, hair-care preparations, e.g. pretreatment preparations, hair tonics, styling creams, styling gels, pomades, hair rinses, treatment packs, intensive hair treatments, hairstraightening preparations, liquid hair-setting preparations, hair foams and hairsprays. Of special interest are hair-washing preparations in the form of shampoos.

A shampoo has, for example, the following composition: from 0.01 to 5% by weight of the aqueous dispersion as defined in claim 1, 12.0% by weight of sodium laureth-2-sulfate, 4.0% by weight of cocamidopropyl betaine, 3.0% by weight of sodium chloride, and water ad 100%.

The personal care preparations of the invention thus generally comprise (a) 0.01-50% of one or more Biocides
(b) 0.01-10% of one or more polyamines, and at least one of
(c) up to 80% of one or more surface active agents
(d) up to 10% of one or more fragrances
(e) up to 30% of one or more mildness-enhancing agents and moisturizing agents
(f) up to 10% of one or more thickening agents
(g) up to 30% of one or more UV absorber
(h) up to 20% of one or more emulsifiers
(i) up to 50% of one or more additional functional ingredients
(k) up to 50% of one or more further biocidal active chemical(s), in addition to components (a) and (b).

Examples for the Components (c) to (k) are Given Below (c) surfactants

Further provided are personal care compositions containing polyol derives substances and non-ionic or anionic surfactant or amphoteric surfactants in a physiologically acceptable medium. As used herein "physiologically acceptable medium" means a composition which is non-toxic, non-irritating and otherwise suitable for contact with the surfaces of a human or other vertebrate body. Such surfaces include the hair, skin, mouth, anal, urethral and vaginal surfaces. Whether a composition is physiologically acceptable can be determined by tests well known to those of skill in the art.

The present disclosure further provides methods of using the present personal care compositions. The methods include contacting the inventive personal care compositions with a part of the human body. In general, the method comprises applying the personal care composition to a body surface or part to be treated.

The term "applying" includes an appropriate action on the part of the user to contact the personal care composition to the body part. Applying includes, in some embodiments, spreading, spraying, squirting, wiping and brushing. The particular type of application depends on the body part to which the personal care composition is to be applied.

"Body part" means a part of body including the mouth and other epithelial surfaces of the body. Thus the term body part includes hair, skin and mouth, anus, urethra and vagina. In the case of the skin, the body part is often more specific. For example, in some embodiments the body part is the skin of the face, hand or foot. In other embodiments, the body part is the whole body. In other embodiments, for example where the personal care compositions are deodorants or antiperspirants, body part can be the underarms.

The disclosure further provides a cleansing composition that comprises an anionic surfactant. In some embodiments, the anionic surfactant constituted from about 0.05% to about 10%, preferably from about 0.1% to about 2%, and more preferably from about 0.2% to about 1%, by weight of the cleansing composition.

Non-limiting examples of anionic lathering surfactants useful in embodiments of the compositions of the present disclosure are disclosed in McCutcheon's, Detergents and Emulsifiers, North American edition (1990), published by The Manufacturing Confectioner Publishing Co.; McCutcheon's, Functional Materials, North American Edition (1992); and U.S. Pat. No. 3,929,678, to Laughlin et al., issued Dec. 30, 1975, all of which are incorporated herein by reference.

A wide variety of anionic surfactants will be useful in embodiments of the disclosure. Non-limiting examples of anionic lathering surfactants include those selected from the group consisting of alkyl and alkyl ether sulfates; sulfated monoglycerides; sulfonated olefins; alkyl aryl sulfonates; primary or secondary alkane sulfonates; alkyl sulfosuccinates; acyl taurates; acyl isethionates; alkyl glycerylether sulfonate; sulfonated methyl esters; sulfonated fatty acids; alkyl phosphates; acyl glutamates; acyl sarcosinates; alkyl sulfoacetates; acylated peptides; alkyl ether carboxylates; acyl lactylates; anionic fluorosurfactants; and mixtures thereof. Mixtures of anionic surfactants can be used effectively in some embodiments of the present disclosure.

Anionic surfactants for use in inventive cleansing compositions include alkyl and alkyl ether sulfates. These materials have the respective formulae $R_{11}$—O—$SO_3$-M and $R_{11}$—$(CH_2H_4—O)_x$—O—$SO_3$-M, wherein $R_{11}$ is a saturated or unsaturated, branched or unbranched alkyl group from about 8 to about 24 carbon atoms, x is 1 to 10, and M is a water-soluble cation such as ammonium, sodium, potassium, magnesium, triethanolamine, diethanolamine and monoethanolamine. The alkyl sulfates are typically made by the sulfation of monohydric alcohols (having from about 8 to about 24 carbon atoms) using sulfur trioxide or other known sulfation technique. The alkyl ether sulfates are typically made as condensation products of ethylene oxide and monohydric alcohols (having from about 8 to about 24 carbon atoms) and then sulfated. These alcohols can be derived from fats, for example, coconut oil or tallow, or can be synthetic. Specific examples of alkyl sulfates which are useful in some embodiments of inventive cleanser compositions are sodium, ammonium, potassium, magnesium, or TEA salts of lauryl or myristyl sulfate. Examples of alkyl ether sulfates include ammonium, sodium, magnesium, or TEA laureth-3 sulfate.

Another suitable class of anionic surfactants are the sulfated monoglycerides of the formula $R_{12}$—CO—O—$CH_2$—C(OH)H—$CH_2$—O—$SO_3$-M, wherein $R_{12}$ is a saturated or unsaturated, branched or unbranched alkyl group from about 8 to about 24 carbon atoms, and M is a water-soluble cation such as ammonium, sodium, potassium, magnesium, triethanolamine, diethanolamine and monoethanolamine. These are typically made by the reaction of glycerin with fatty acids (having from about 8 to about 24 carbon atoms) to form a monoglyceride and the subsequent sulfation of this monoglyceride with sulfur trioxide. An example of a sulfated monoglyceride is sodium cocomonoglyceride sulfate.

Other suitable anionic surfactants include olefin sulfonates of the form $R_{13}SO_3$-M, wherein $R_{13}$ is a mono-olefin having from about 12 to about 24 carbon atoms, and M is a water-soluble cation such as ammonium, sodium, potassium, magnesium, triethanolamine, diethanolamine and monoethanolamine. These compounds can be produced by the sulfonation of olefins by means of uncomplexed sulfur trioxide, followed by neutralization of the acid reaction mixture in conditions such that any sulfones which have been formed in the reaction are hydrolyzed to give the corresponding hydroxyalkanesulfonate. An example of a sulfonated olefin is sodium $C_{14}/C_{16}$ olefin sulfonate.

Other suitable anionic surfactants are the linear alkylbenzene sulfonates of the form $R_{14}$—$C_6H_4$—$SO_3$-M, wherein $R_{14}$ is a saturated or unsaturated, branched or unbranched alkyl group from about 8 to about 24 carbon atoms, and M is a water-soluble cation such as ammonium, sodium, potassium, magnesium, triethanolamine, diethanolamine and monoethanolamine. These are formed by the sulfonation of linear alkyl benzene with sulfur trioxide. An example of this anionic surfactant is sodium dodecylbenzene sulfonate.

Still other anionic surfactants suitable for embodiments of inventive the cleansing composition include the primary or secondary alkane sulfonates of the form $R_{15}$—$SO_3$-M, wherein $R_{15}$ is a saturated or unsaturated, branched or unbranched alkyl chain from about 8 to about 24 carbon atoms, and M is a water-soluble cation such as ammonium, sodium, potassium, magnesium, triethanolamine, diethanolamine and monoethanolamine. These are commonly formed by the sulfonation of paraffins using sulfur dioxide in the presence of chlorine and ultraviolet light or another known sulfonation method. The sulfonation can occur in either the secondary or primary positions of the alkyl chain. An example of an alkane sulfonate useful herein is alkali metal or ammonium $C_{13}$-$C_{17}$ paraffin sulfonates.

Still other suitable anionic surfactants are the alkyl sulfosuccinates, which include disodium N-octadecylsulfosuccinamate; diammonium lauryl sulfosuccinate; tetrasodium N-(1,2-dicarboxyethyl)-N-octadecylsulfosuccinate; diamyl ester of sodium sulfosuccinic acid; dihexyl ester of sodium sulfosuccinic acid; and dioctyl esters of sodium sulfosuccinic acid.

Also useful are taurates which are based on taurine, which is also known as 2-aminoethanesulfonic acid. Examples of taurates include N-alkyltaurines such as the one prepared by reacting dodecylamine with sodium isethionate, according to the teaching of U.S. Pat. No. 2,658,072, which is incorporated herein by reference in its entirety. Other examples of taurine derivatives that are useful in embodiments of the disclosure include the acyl taurines formed by the reaction of n-methyl taurine with fatty acids (having from about 8 to about 24 carbon atoms).

Another class of anionic surfactants suitable for use in some embodiments of the inventive cleansing composition is the acyl isethionate class. The acyl isethionates typically have the formula $R_{16}$—CO—O—$CH_2$—$CH_2SO_3$-M, wherein $R_{16}$ is a saturated or unsaturated, branched or unbranched alkyl group having from about 10 to about 30 carbon atoms, and M is a cation. These are typically formed by the reaction of fatty acids (having from about 8 to about 30 carbon atoms) with an alkali metal isethionate. Nonlimiting examples of these acyl isethionates include ammonium cocoyl isethionate, sodium cocoyl isethionate, sodium lauroyl isethionate, and mixtures thereof.

Still other suitable anionic surfactants are the alkylglyceryl ether sulfonates of the form $R_{17}$—$OCH_2$—C(OH)H—$CH_2$—$SO_3$-M, wherein $R_{17}$ is a saturated or unsaturated, branched or unbranched alkyl group from about 8 to about 24 carbon atoms, and M is a water-soluble cation such as ammonium, sodium, potassium, magnesium, triethanolamine, diethanolamine and monoethanolamine. These can be formed by the reaction of epichlorohydrin and sodium bisulfite with fatty alcohols (having from about 8 to about 24 carbon atoms) or other known methods. One example is sodium cocoglyceryl ether sulfonate.

Other suitable anionic surfactants include the sulfonated fatty acids of the form $R_{18}$—$CH(SO_4)$—COOH and sulfonated methyl esters of the from $R_{18}$—$CH(SO_4)$—CO—O—$CH_3$, where $R_{18}$ is a saturated or unsaturated, branched or unbranched alkyl group from about 8 to about 24 carbon atoms. These surfactants are generally formed by the sulfonation of fatty acids or alkyl methyl esters (having from about 8 to about 24 carbon atoms) with sulfur trioxide or by other known sulfonation techniques. Examples include alpha sulfonated coconut fatty acid and lauryl methyl ester.

Other suitable anionic materials include phosphates such as monoalkyl-, dialkyl-, and trialkylphosphate salts formed by the reaction of phosphorous pentoxide with monohydric branched or unbranched alcohols having from about 8 to about 24 carbon atoms. In some embodiments, these anionic materials are also be formed by other known phosphation methods. An example from this class of surfactants is sodium mono or dilaurylphosphate.

Other suitable anionic materials include acyl glutamates corresponding to the formula $R_{19}$—CO—N(COOH)—$CH_2CH_2$—$CO_2$-M wherein $R_{19}$ is a saturated or unsaturated, branched or unbranched alkyl or alkenyl group of about 8 to about 24 carbon atoms, and M is a water-soluble cation. Nonlimiting examples of which include sodium lauroyl glutamate and sodium cocoyl glutamate.

Other anionic materials include alkanoyl sarcosinates corresponding to the formula $R_{20}$—$CON(CH_3)$—$CH_2CH_2$—$CO_2$-M wherein $R_{20}$ is a saturated or unsaturated, branched or unbranched alkyl or alkenyl group of about 10 to about 20 carbon atoms, and M is a water-soluble cation. Nonlimiting examples of which include sodium lauroyl sarcosinate, sodium cocoyl sarcosinate, and ammonium lauroyl sarcosinate.

Other anionic materials include alkyl ether carboxylates corresponding to the formula $R_{21}$—$(OCH_2CH_2)_x$—$OCH_2$—$CO_2$-M wherein $R_{21}$ is a saturated or unsaturated, branched or unbranched alkyl or alkenyl group of about 8 to about 24 carbon atoms, x is 1 to 10, and M is a water-soluble cation. Nonlimiting examples of which include sodium laureth carboxylate.

Other anionic materials include acyl lactylates corresponding to the formula $R_{22}$—CO[O—$CH(CH_3)$—$CO]_x$—$CO_2$-M wherein $R_{22}$ is a saturated or unsaturated, branched or unbranched alkyl or alkenyl group of about 8 to about 24 carbon atoms, x is 3, and M is a water-soluble cation, nonlimiting examples of which include sodium cocoyl lactylate.

Other anionic materials include the carboxylates, nonlimiting examples of which include sodium lauroyl carboxylate, sodium cocoyl carboxylate, and ammonium lauroyl carboxylate. Anionic flourosurfactants can also be used.

A counter cation, M, counterbalances the negative charge of the anionic surfactant. Some especially suitable counter cations are sodium, potassium, ammonium, monoethanolamine, diethanolamine, and triethanolamine. An especially suitable counter cation is ammonium.

The disclosure further provides personal care and home care compositions that comprise one or more non-ionic surfactants. Some nonionic surfactants are condensation products of ethylene oxide with various reactive hydrogen-containing compounds reactive therewith having long hydrophobic chains (for example aliphatic chains of about 12-20 carbon atoms), which condensation products ("ethoxamers") contain hydrophilic polyoxyethylene moieties, such as condensation products of poly(ethyleneoxide) with fatty acids, fatty alcohols, fatty amides, polyhydric alcohols (for example sorbitan monostearate) and polypropylene oxide (for example Pluronic® materials). Polyoxamers include for example block copolymers of polyoxyethylene and polyoxypropylene having an average molecular weight from about 3000 to 5000 and a preferred average molecular weight from about 3500 to 4000 and containing about 10-80% hydrophilic polyoxyethylene groups, by weight, of the block copolymer (for example Pluronic F127). Other non-ionic surfactants are for example alkyl polyglucosids, alcanolamides, ethers of e.g. fatty acids with ethylene oxid or polyethylenglycol, amine oxids e.g. cocamidopropyla amine oxid.

The disclosure further provides personal care and home care compositions comprising one or more amphoteric surfactants. Non-limiting examples for amphoteris surfactants are secondary or thir aliphatic amine derivatives where aliphatic chain, linear or branched, contains at least 8 to 22 carbon atoms and one anionic group such as carboxylate, sulfonate, sulfate, phosphate or phosphonate, acyl/dialkyl ethylenediamines Such as acylamphoacetate, disodium acylamphodipropionate, sodium acylamphohydroxypropylsulfonate, disodium acylamphodiacetate, sodium acylamphopropionate where the acyl represents either an alkyl or alkenyl, mon- or polyunsaturated containing 5 to 29 carbon atoms, N-alkyl amino acids or imino acids Such as aminopropyl alkylglutamide, alkylaminopropionic acid, sodium alkylimino propionate, alkyl glycinates and carboxyglycinates, sodium cocoglycinates.

are $C_8$-$C_{18}$-betains, $C_8$-$C_{18}$-sulfobetains, $C_8$-$C_{24}$-alkylamido-$C_1$-$C_4$-alkylene betains, imidazoline carboxylates, alkylamphocarboxycarbonic acids, alkylamphocarbonic acid (for example lauroamphoglycinate) and N-alkyl-β-aminopropionate or -iminodipropionate. In particular embodiments, the amphoteric surfactant comprises $C_{10}$-$C_{20}$-alkylamido$C_1$-$C_4$-alkylenbetaine and/or coco fatty acid amide propylbetaine.

The disclosure further provides personal care and home care compositions comprising a combination of anionic, non-ionic and amphoteric surfactants. The anionic, non-ionic and amphoteric surfactants are set forth above.

(d) Fragrances

The disclosure further provides personal care formulations that comprise one or more fragrances. In particular compositions, the combination of the Biocide defined in (a) with one or more perfumes, particularly those containing plant derived oils, result in improved or qualitatively different antimicrobial efficacy.

Some embodiments of the antimicrobial compositions of the present disclosure comprise suitable perfume oils mixtures of natural and/or synthetic aromatic substances. Natural aromatic substances are, for example, extracts from blossom (lilies, lavender, roses, jasmine, neroli, ylang-ylang), from stems and leaves (geranium, patchouli, petitgrain), from fruit (aniseed, coriander, carraway, juniper), from fruit peel (bergamot, lemons, oranges), from roots (mace, *angelica*, celery, cardamom, costus, iris, calmus), from wood (pinewood, sandalwood, guaiacum wood, cedarwood, rosewood), from herbs and grasses (tarragon, lemon grass, sage, thyme), from needles and twigs (spruce, pine, Scots pine, mountain pine), from resins and balsams (*galbanum*, elemi, benzoin, myrrh, olibanum, opoponax). Animal raw materials also come into consideration, for example civet and castoreum. Typical synthetic aromatic substances are, for example, products of the ester, ether, aldehyde, ketone, alcohol or hydrocarbon type. Aromatic substance compounds of the ester type are, for example, benzyl acetate, phenoxyethyl isobutyrate, p-tert-butylcyclohexyl acetate, linalyl acetate, dimethylbenzylcarbinyl acetate, phenylethyl acetate, linalyl benzoate, benzyl formate, ethylmethylphenyl glycinate, allylcyclohexyl propionate, styrallyl propionate and benzyl salicylate. The ethers include, for example, benzyl ethyl ether; the aldehydes include, for example, the linear alkanals having from 8 to 18 hydrocarbon atoms, citral, citronellal, citronellyl oxyacetaldehyde, cyclamen aldehyde, hydroxycitronellal, lilial and bourgeonal; the ketones include, for example, the ionones, isomethylionone and methyl cedryl ketone; the alcohols include, for example, anethol, citronellol, eugenol, isoeugenol, geraniol, linalool, phenyl ethyl alcohol and terpinol; and the hydrocarbons include mainly the terpenes and balsams. It is preferable, however, to use mixtures of various aromatic substances that together produce an attractive scent. Ethereal oils of relatively low volatility, which are chiefly used as aroma components, are also suitable as perfume oils, e.g. sage oil, camomile oil, clove oil, melissa oil, oil of cinnamon leaves, lime blossom oil, juniper berry oil, vetiver oil, olibanum oil, *galbanum* oil, labolanum oil and lavandin oil. Preference is given to the use of bergamot oil, dihydromyrcenol, lilial, lyral, citronellol, phenyl ethyl alcohol, hexyl cinnamaldehyde, geraniol, benzyl acetone, cyclamen aldehyde, linalool, boisambrene forte, ambroxan, indole, hedione, sandelice, lemon oil, tangerine oil, orange oil, allyl amyl glycolate, cyclovertal, lavandin oil, muscatel sage oil, damascone, bourbon geranium oil, cyclohexyl salicylate, vertofix coeur, iso-E-Super, Fixolide NP, evernyl, iraldein gamma, phenylacetic acid, geranyl acetate, benzyl acetate, rose oxide, romillat, irotyl and floramat alone or in admixture with one another.

(e) Mildness-Enhancing Agents and Moisturizing Agents

The disclosure further provides personal care and home care compositions having "mildness-enhancing agents" added thereto. These "mildness-enhancing ingredients" include cationic and nonionic polymers, co-surfactants, moisturizers and mixtures thereof. Polymers used in some embodiments include: polyethylene glycols; polypropylene glycols; hydrolyzed silk proteins; hydrolyzed milk proteins; hydrolyzed keratin proteins; guar hydroxypropyltrimonium chloride; polyquats; silicone polymers and mixtures thereof. Suitable cationic polymers are also, for example, cationic cellulose derivatives, for example a quaternised hydroxymethyl cellulose obtainable under the name Polymer JR 400 from Amerchol, cationic starches, copolymers of diallylammonium salts and acrylamides, quarternised vinylpyrrolidone/vinyl imidazole polymers, for example Luviquat® (BASF), condensation products of polyglycols and amines, quaternised collagen polypeptides, for example lauryldimonium hydroxypropyl hydrolyzed collagen (Lamequat L/Grunau), quaternised wheat polypeptides, polyethyleneimine, cationic silicone polymers, for example amidomethicones, copolymers of adipic acid and dimethylaminohydroxypropyldiethylenetriamine (Cartaretin/Sandoz), copolymers of acrylic acid with dimethyldiallylammonium chloride (Merquat 550/Chemviron), polyaminopolyamides, as described, for example, in FR-A-2 252 840, and the crosslinked water-soluble polymers thereof, cationic chitin derivatives, for example of quaternised chitosan, optionally distributed as microcrystals; condensation products of dihaloalkyls, for example dibromobutane, with bisdialkylamines, for example bisdimethylamino-1,3-propane, cationic guar gum, for example Jaguar C-17, Jaguar C-16 from Celanese, quaternised ammonium salt polymers, for example Mirapol A-15, Mirapol AD-1, Mirapol AZ-1 from Miranol. In some embodiments, the mildness enhancing polymers comprise from about 0.1% to about 1%, preferably from about 0.2% to about 1.0%, and more preferably from about 0.2% to about 0.6%, by weight of the antimicrobial composition. Co-surfactants used in some embodiments include: nonionic surfactants such as the Genapol24® series of ethoxylated alcohols; POE(20) sorbitan monooleate (Tween® 80); polyethylene glycol cocoate and Pluronic® propylene oxide/ethylene oxide block polymers; and amphoteric surfactants such as alkyl betaines; alkyl sultaines; alkyl amphoacetates; alkyl amphodiacetates; alkyl amphopropionates; and alkyl amphodipropionates. As examples for other anionic, zwitterionic, amphoteric and non-ionic polymers come into consideration, for example, vinyl acetate/crotonic acid copolymers, vinylpyrrolidone/vinyl acrylate copolymers, vinyl acetate/butyl maleate/isobornyl acrylate copolymers, methyl vinyl ether/maleic anhydride copolymers and esters thereof, uncrosslinked polyacrylic acids and polyacrylic acids crosslinked with polyols, acrylamidopropyl-trimethylammonium chloride/acrylate copolymers, octyl acrylamide/methyl methacrylatetertbutylaminoethyl methacrylate/2-hydroxypropyl methacrylate copolymers, polyvinylpyrrolidone, vinylpyrrolidone/vinyl acetate copolymers, vinylpyrrolidone/dimethylaminoethyl methacrylate/vinyl caprolactam terpolymers and also optionally derivatised cellulose ethers and silicones. Furthermore the polymers as described in EP 1093796 (pages 3-8, paragraphs 17-68) may be used.

In some embodiments, the mildness enhancing co-surfactants comprise from about 20% to about 70%, preferably from about 20% to about 50%, by weight of the anionic surfactant, of the cleansing composition.

The disclosure further provides compositions comprising one or more lipid skin moisturizing agents, which provide a moisturizing benefit to the user when deposited to the user's skin. In some embodiments, lipophilic skin moisturizing agents are constitute about 0.1% to about 30%, preferably from about 0.2% to about 10%, most preferably from about 0.5% to about 5% by weight of the composition. In some embodiments, the lipophilic skin moisturizing agent is characterized by its solubility parameter, as defined by Vaughan in Cosmetics and Toiletries, Vol. 103, p. 47-69, October 1988 (expressly incorporated herein by reference). A lipophilic skin-moisturizing agent having a Vaughan solubility Parameter (VSP) from 5 to 10, preferably from 5.5 to 9 is suitable for use in antimicrobial cleansing embodiments of the inventive antimicrobial compositions.

A wide variety of "lipid-type materials" and mixtures of materials will be suitable for use in embodiments of antimicrobial compositions of the present disclosure. "Lipid-type materials" means lipophilic compounds, and include lipophilic skin conditioning agents. Some such skin conditioning agents are: hydrocarbon oils and waxes; silicones; fatty acid derivatives; cholesterol; cholesterol derivatives; di- and tri-glycerides; vegetable oils; vegetable oil derivatives; liquid nondigestible oils (such as those described in U.S. Pat. No. 3,600,186 to Mattson, issued Aug. 17, 1971 and U.S. Pat. Nos. 4,005,195 and 4,005,196 to Jandacek et al., both issued Jan. 25, 1977) all of which are herein incorporated by reference; or blends of liquid digestible or nondigestible oils with solid polyol polyesters (such as those described in U.S. Pat. No. 4,797,300 to Jandacek, issued Jan. 10, 1989; U.S. Pat. Nos. 5,306,514, 5,306,516 and 5,306,515 to Letton, all issued Apr. 26, 1994, all of which are herein incorporated by reference); and acetoglyceride esters; alkyl esters; alkenyl esters; lanolin and its derivatives; milk triglycerides; wax esters; beeswax derivatives; sterols; phospholipids; and mixtures of any or all of the foregoing. Fatty acids, fatty acid soaps and water soluble polyols are specifically excluded from this definition of a lipophilic skin moisturizing agent.

Some examples of lipid-type materials are: petrolatum (yellow or white); mineral oil; (light or heavy); mineral oil microcrystalline waxes; paraffinic and isoparaffinic compounds; polyalkenes like for example hydrogenated and nonhydrogenated polybutene and polydecene, isohexadecane, isododecane; cerasin; ozokerite; polyethylene; squalene and perhydrosqualene and others from plant and animal kingdom. Blends of petrolatum and hydrogenated and nonhydrogenated high molecular weight polybutenes, wherein the ratio of petrolatum to polybutene ranges from about 90:10 to about 40:60, are also suitable for use in some embodiments as the lipid skin moisturizing agent in the compositions herein.

Some additional examples of lipid-type materials are: dimethicone copolyol; dimethylpolysiloxane; diethylpolysiloxane; high molecular weight dimethicone; mixed $C_1$-$C_{30}$ alkyl polysiloxane; phenyl dimethicone; dimethiconol, and mixtures of any two or more of the foregoing. More preferred in some embodiments are non-volatile silicones selected from dimethicone; dimethiconol; mixed C1-C30 alkyl polysiloxane; and mixtures of any two or more thereof. Nonlimiting examples of silicones useful in some embodiments are described in U.S. Pat. No. 5,011,681, to Ciotti et al., issued Apr. 30, 1991, which is incorporated by reference.

Silicones or Siloxanes (Organosubstituted Polysiloxanes)

As generally accepted by "silicones" is intended any organosilicon polymers or oligomers having a linear or cyclic, branched or crosslinked structure, of variable molecular weight, and essentially based of recurring structural units in which the silicone atoms are linked to each other by oxygen atoms (siloxane bond SiOSi), optionally substituted hydrocarbon radicals being directly linked via a carbon atom to the silicone atoms.

The following list informs on the different categories of silicones that such emulsion should contain;

Siloxanes

Cyclic siloxane polymers; Cyclomethicones of the general formula

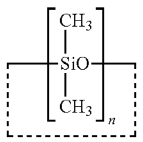

such as cyclopentasiloxane, cyclohexasiloxane low viscous, volatile fluid

The INCI names for labeling specific cyclic dimethyl polysiloxane compounds are: Cyclotrisiloxane (q.v.) when n is equal to 3, Cyclotetrasiloxane (q.v.) when n is equal to 4, Cyclopentasiloxane (q.v.) when n is equal to 5, Cyclohexasiloxane (q.v.) when n is equal to 6, and Cycloheptasiloxane when n is equal to 7 (q.v.).

Linear siloxane polymer end-blocked with Trimethylsiloxy units (M unit) Dimethicones; non polar liquid with broad range of viscosity of the general formula

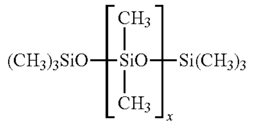

Silanol Compounds or Dimethiconols

Dimethyl siloxane terminated with hydroxyl groups (—OH) of the general formula

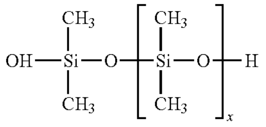

Silicone Elastomers & Resins

Crosslinking of siloxane structures such as Dimethicones.

Elastomer: medium crosslinking with a density that allows elongation/distorsion of the molecule. We have to exclude PEG-modified Dimethicone Crosspolymers.

Resin: high crosslinking with a density that provides some rigidity to the molecule Silicone Elastomers as Co-Emulsifier Systems Dimethicone Crosspolymer in Cyclopentasiloxane; DC 9045 silicone elastomer blend (Dow Corning)

Dimethicone Crosspolymer in Dimethicone; DC 9041 silicone elastomer blend (Dow Corning)

polymer of Dimethicone (q.v.) crosslinked with a C3 to C20 alkyl group

Dimethicone/Vinyldimethicone Crosspolymer; DC 9506 powder (Dow Corning)

Dimethicone/Vinyldimethicone Crosspolymer in Cyclopentasiloxane; SFE 839 (GE silicones) or KSG 15(Shin-Etsu) copolymer of dimethylpolysiloxane crosslinked with vinyl dimethylpolysiloxane.

Resin Silicones

Dispersing agents such as KP-545 (Shin-Etsu); Acrylates/Dimethicone copolymer in Cyclopentasiloxane copolymer of dimethicone and one or more monomers of acrylic acid, methacrylic acid or one of their simple esters Siloxysilicates such as Trimethylsiloxysilicates T-resins; branched polymer of T-Units Q-resins; branched polymer of Q-Units:

$$[(CH_3)_3SiO_{1/2}]_x \quad [SiO_2]_y$$

Film-forming and water-resistant agents such as Trimethylsiloxysilicate; SR 399 (GE Silicones) or Wacker-Belsil TMS803 (Wacker Chemie); mixtures from Dow Corning such as DC 749 cosmetic fluid (Trimethylsiloxysilicate in Cyclopentasiloxane) or DC 593 fluid (Trimethylsiloxysilicate in Dimethicone)

Alkyl-Modified Siloxanes (AMS)

AMS improve spreadability and wash-off resistance.

For inorganic sunscreens, it improves particle dispersion, reduce the re-agglomeration and better long-lasting effect on skin.

Alkyl Dimethicone of the General Formula

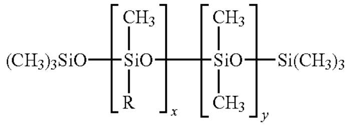

wherein R is —(CH2)n-CH3

For example: Bis-Phenylpropyl Dimethicone (SF 1555 fluid; GE Silicone)

Alkyl Methicone of the General Formula

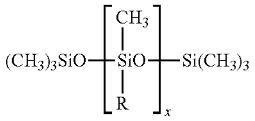

wherein R is —(CH2)n-CH3

=>silicone waxes such as DC 2503 cosmetic wax (Dow Corning); Stearyl Dimethicone

- DC 2502 fluid (Dow Corning); Cetyl Dimethicone
- DC AMS-C30 wax (Dow Corning); C30-C45 Alkyl Methicone
- DC 580 wax (Dow Corning); Stearoxytrimethylsilane and Stearyl Alcohol Also suitable are simethicones, which are mixtures of dimethicones having an average chain length of from 200 to 300 dimethylsiloxane units with hydrogenated silicates. A detailed survey by Todd et al. of suitable volatile silicones may in addition be found in Cosm. Toil. 91, 27 (1976).

Some additional examples of lipid-type materials are: di- or tri-glycerides, based on $C_6$-$C_{18}$ fatty acids, modified by reaction with other alcohols (caprylic/capric triglyceride, wheat germ glycerides, etc.). Fatty acid esters of polyglycerin (polyglyceryl-n such as polyglyceryl-4 caprate, polyglyceryl-2 isostearate, etc. or Waxes including esters of long-chain acids and alcohols as well as compounds having wax-like properties, e.g., carnauba wax, beeswax (white or yellow), lanolin wax, candellila wax, ozokerite, japan wax, paraffin wax, microcrystalline wax, ceresin, cetearyl esters wax, synthetic beeswax, etc. Also, hydrophilic waxes as Cetearyl Alcohol or partial glycerides.

castor oil; hydrogenated castor oil, sweet almond oil, wheat germ oil, corn oil, shea butter, cocoa butter, mink oil, sunflower oil, macadamia nut oil, hydrogenated tallow, apricot kernel oil, hazelnut oil, *borago* oil, soy bean oil; derivatized soybean oils such as maleated soy bean oil; safflower oil; cotton seed oil; corn oil; walnut oil; peanut oil; olive oil; cod liver oil; avocado oil; palm oil and sesame oil; vegetable oils and vegetable oil derivatives; coconut oil and derivatized coconut oil; cottonseed oil and derivatized cottonseed oil; jojoba oil; cocoa butter; and the like, as well as mixtures of any two or more thereof. Acetoglyceride esters are useful in some embodiments; and an example is acetylated monoglyceride. Lanolin and its derivatives are preferred in some embodiments; and some examples are: lanolin, lanolin oil, lanolin wax, lanolin alcohols, lanolin fatty acids, isopropyl lanolate, acetylated lanolin, acetylated lanolin alcohols, lanolin alcohol linoleate and lanolin alcohol riconoleate. Some embodiments might contain esters of long-chain acids and alcohols as well as compounds having wax-like properties, e.g., carnauba wax, beeswax (white or yellow), candellila wax, ozokerite, japan wax, paraffin wax, microcrystalline wax, ceresin, cetearyl esters wax, synthetic beeswax etc. Also, hydrophilic waxes as Cetearyl Alcohol or partial glycerides.

Pearlescent Waxes:

Ikylene glycol esters, especially ethylene glycol distearate; fatty acid alkanolamides, especially coco fatty acid diethanolamide; partial glycerides, especially stearic acid monoglyceride; esters of polyvalent, unsubstituted or hydroxy-substituted carboxylic acids with fatty alcohols having from 6 to 22 carbon atoms, especially long-chained esters of tartaric acid; fatty substances, for example fatty alcohols, fatty ketones, fatty aldehydes, fatty ethers and fatty carbonates, which in total have at least 24 carbon atoms, especially (aurone and distearyl ether; fatty acids, such as stearic acid, hydroxystearic acid or behenic acid, ring-opening products of olefin epoxides having from 12 to 22 carbon atoms with fatty alcohols having from 12 to 22 carbon atoms and/or polyols having from 2 to 15 carbon atoms and from 2 to 10 hydroxy groups, and mixtures thereof.

In some embodiments, it is most preferred that at least 75% of the lipophilic skin conditioning agent consists of lipids selected from the group consisting of: petrolatum; blends of petrolatum and high molecular weight polybutene; mineral oil; liquid nondigestible oils (for example liquid cottonseed sucrose octaesters); or blends of liquid digestible or nondigestible oils with solid polyol polyesters (for example sucrose octaesters prepared from $C_{22}$ fatty acids), wherein the ratio of liquid digestible or nondigestible oil to solid polyol polyester ranges from about 96:4 to about 80:20; hydrogenated or nonhydrogenated polybutene; microcrystalline wax; polyalkene; paraffin; cerasin; ozokerite; polyethylene; perhydrosqualene; dimethicones; alkyl siloxane; polymethylsiloxane; methylphenylpolysiloxane; and mixtures of any two or more thereof. In embodiments comprising a blend of petrolatum and other lipids, the ratio of petrolatum to the other selected lipids (hydrogenated or unhydrogenated polybutene or polydecene or mineral oil) is preferably from about 10:1 to about 1:2, more preferably from about 5:1 to about 1:1.

In some embodiments wherein a lipophilic skin moisturizing agent is employed as the mildness enhancer in the inventive antimicrobial compositions, a stabilizer will be included at a level ranging from about 0.1% to about 10%, preferably from about 0.1% to about 8%, more preferably from about 0.1% to about 5% by weight of the antimicrobial composition. A "stabilizer" is a compound or mixture that forms a crystalline stabilizing network in the liquid composition that prevents the lipophilic skin moisturizer agent droplets from coalescing and phase splitting in the product. The network exhibits timedependent recovery of viscosity after shearing (for example, thixotropy).

(f) Thickening Agents

In some embodiments, the stabilizer employed in the antimicrobial compositions herein comprises a polymeric thickener. A "thickener" is a compound capable of increasing the viscosity of a liquid composition, but which don't necessarily form the aforementioned cross-linked matrix. Particular thickeners are described in more detail in the following. Thickeners can be divided into at least 2 general categories: those that show the best performance in water, and those that show the best performance in oils. In addition, it is also possible to differentiate them according to their nature, for example synthetic polymers, natural polymers and their derivatives, mineral polymers etc., but also according to their ionic character such as anionic, cationic, nonionic or amphoteric.

TABLE 2a

| Natural thickeners<br>Most of them are derived from the Polysaccharides category | |
|---|---|
| RM 1 | Cellulose gum such as cross-linked or not Sodium Carboxymethylcellulose...or even Cocodimonium Hydroxypropyloxyethyl Cellulose |
| RM 2 | Microcrystalline cellulose and Carboxymethyl Cellulose Sodium |
| RM 3 | Guar gum and derivatives (except hydroxypropyl-modified), -Biosacccharide gum-1 (Fucogel 1000 from Solabia), -Sclerotium Gum (Amigel from Alban Muller) or Scleroglucan (Tinocare GL from Ciba SC) |
| RM 4 | Galactoarabinan from Larch extract (Laracare A200) |
| RM 5 | Acaccia/Arabic Gum |
| RM 6 | Konjac mannan; linear chains of glucose and mannose units linked in (β-1, 4) |
| RM 7 | Pectin polysaccharides; backbone of galacturonic acid and rhamnose with side chains as Rhamnogalacturonan I or Rhamnogalacturonan II |
| RM 8 | Xanthan Gum; (β-1, 4) linked Glucose residues or Dehydroxanthan Gum (Amaze XT from National Starch) |
| RM 9 | Starch and derivatives: Potato starch modified (Structure Solanace from National Starch); Hydroxypropyl Starch Phosphate (Structure XL or ZEA from National Starch); Amylose and Amylopectin polymeric forms; Maltodextrins |
| RM 10 | Carrageenan from red algae as Sulfated linear polysaccharides |
| RM 11 | Alginic acid and alginates from brown algae; polymers of mannuronic acid and Guluronic acid |

TABLE 2b

| Mineral thickeners<br>Most of them are derived from smectite clays and silica derivatives | |
|---|---|
| RM 12 | Aluminum Silicates or Bentonites or Montmorillonites such as Magnesium Aluminum Silicates (Veegum range from R.T.Vanderbilt) and Quaternized compounds such as Stearalkonium Bentonite |
| RM 13 | Magnesium Silicates or Hectorites such as Bentone Series (from Elementis Specialties) and Quaternized compounds such as Disteardimonium Hectorite (to disperse in lipophilic media) |

TABLE 2b-continued

| Mineral thickeners<br>Most of them are derived from smectite clays and silica derivatives | |
|---|---|
| RM 14 | Magnesium sodium Fluorosilicate or modified Mica |
| RM 15 | Synthetic layered Silicates; similar structure to Hectorites; Sodium Magnesium Silicates (Laponite range from Solvay) |
| RM 16 | Fumed Silicas such as Aerosil range from Degussa |

TABLE 2c

| Synthetic Rheology modifiers<br>Poly(acrylic acid) PAA and its copolymers; within such structure, it can be incorporated ester groups, with hydrophilic character such as 2-Hydroxyethyl Methacrylate etc. | |
|---|---|
| RM 17 | Carbomer or crosslinked polyacrylic acid polymer such as Carbopol Ultrez 10, Carbopol ETD2001, Carbopol ETD2050 from Noveon Inc |
| RM 18 | Sodium polyacrylate (Cosmedia SP from Cognis), Acrylates copolymer (Carbopol Aqua SF-1 from Noveon Inc.), Acrylates/acrylamides Coplymer (Noveon EC-1 from Noveon Inc.) |
| RM 19 | Hydroxyethyl/Acrylate/Sodium Acryloyldimethyl Taurate copolymer (Simulgel NS or EG from Seppic); combination with Tinosorb M claimed in PCA N° November 2001 |
| RM 20 | Ammonium Polyacrylates (Simulgel A from Seppic)<br>⇒"Hydro Swelling Droplets" concept |
| RM 21 | Glyceryl Polyacrylates (e.g.,Hispagel 100) or Polymethacrylates (e.g., Lubrajel range from ISP Corp.) |
| RM 22 | Poly(Acrylamide) PAAm and its copolymers; copolymers of ammonium acrylate and acrylamide; copolymers of AAam with long hydrophobic chain and acrylates |
| RM 23 | Poly(Ethylene oxide) PEO and Poly (Propylene oxide) PPO and their copolymers; these are block terpolymers of EO and PO with the structure ABA or BAB; A: PEO with good water solubility B: PPO with limited water solubility |
| RM 24 | Poly(VinylPyrrolidone)PVP homopoplymers or Poly(VinylPyrrolidone)/Vinyl Acetate coplymers |
| RM 25 | Poly (vinylalcohol) PVA |
| RM 26 | VA/Crotonates copolymer Poly(vinylacetate)/Crotonic acid or VA/Crotonates/Vinyl Neodecanoate copolymer |
| RM 27 | Ethylene/VinylAcetate copolymer such as A.C.cop1ymer400 (Allied-Signal) |
| RM 28 | PVM/MA copolymers and their esterified derivatives such Ethyl, Isopropyl or Butyl esters |
| RM 29 | PVM/MA Decadiene Crosspolymer; copolymer of methyl vinyl ether/Maleic Anhydric (PVM/MA) crosslinked with 1,9-decadiene |
| RM 30 | Polyethylene resins such as PEG-2M to PEG-9M (RITA Corp.) |
| RM 31 | polysiloxanes and copolymers; copolymers of polysiloxanes and other blocks such as PEO blocks |
| RM 32 | PEG-modified materials, the most commonly used class of non ionic thickeners with the following basic structure: $R(OCH_2\ CH_2)_n$ OH, werein R is the fatty moiety, like fatty alcohol, glyceryl ester, propylene glycol ester or carboxylic acid; for example; PEG-150 Distearate; these thickeners are not susceptible to hydrolysis and offer better viscosity stability under a broad range of pH and temperature profiles |
| RM 33 | Trihydroxystearin or Glycol Tri-(12-Hydroxystearate) |
| RM 34 | Glyceryl Tribehenate such as Syncrowax HRS-C from Croda |

TABLE 2d

| Phospholipid derivatives | |
|---|---|
| RM 35 | Alkylated Phosphatidyl Choline forming fluid lamellar assembly as the stable liquid crystalline phase of aeneral formula:<br>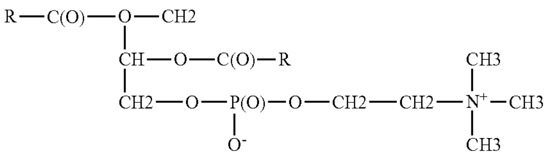<br>wherein R is $C_2$-$C_4$alkyl |

TABLE 2d-continued

| | Phospholipid derivatives |
|---|---|
| RM 36 | Phosphobetaines (amphoteric ingredients); alkylamido Phosphobetaine of gerneral formula 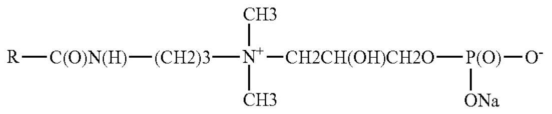 wherein R is $C_2$-$C_{14}$alkyl |
| RM 37 | Alkyl Phosphate Quaternary compounds of general formula 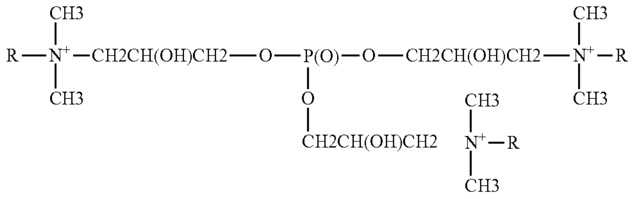 wherein R is $C_2$-$C_{14}$alkyl |

When polymeric thickeners are used as stabilizers in embodiments of the inventive antimicrobial compositions, they are typically included in an amount ranging from about 0.01% to about 5%, preferably from about 0.3% to about 3%, by weight of the composition. In some embodiments, the polymeric thickener is preferably an anionic, non-ionic, cationic or hydrophobically modified polymer selected from the group consisting of: cationic polysaccharides of the cationic guar gum class with molecular weights of 1,000 to 3,000,000; anionic, cationic, and nonionic homopolymers derived from acrylic and/or methacrylic acid; anionic, cationic, and nonionic cellulose resins; cationic copolymers of dimethyldialkylammonium chloride, and acrylic acid; cationic homopolymers of dimethylalkylammonium chloride; cationic polyalklene and ethoxypolyalkylene imines; polyethylene glycol of molecular weight from 100,000 to 4,000,000; and mixtures of two or more thereof. In some embodiments, the polymer is preferably selected from the group consisting of sodium polyacrylate, hydroxy ethyl cellulose, cetyl hydroxy ethyl cellulose, and polyquaternium 10.

(g) UV Absorbers

In some embodiments also one or more UV absorbers might be included in personal care applications (Table 3).

TABLE 3

Suitable UV filter substances and adjuvants which can be additionally used with the UV absorbers according to the present disclosure

| No. | Chemical Name | CAS No. |
|---|---|---|
| 1 | (+/−)-1,7,7-trimethyl-3-[(4-methylphenyl)methylene]bicyclo[2.2.1]heptan-2-one; p-methyl benzylidene camphor | 36861-47-9 |
| 2 | 1,7,7-trimethyl-3-(phenylmethylene)bicyclo[2.2.1]heptan-2-one; benzylidene camphor | 15087-24-8 |
| 3 | (2-Hydroxy-4-methoxyphenyl)(4-methylphenyl)methanone | 1641-17-4 |
| 4 | 2,4-dihydroxybenzophenone | 131-56-6 |
| 5 | 2,2',4,4'-tetrahydroxybenzophenone | 131-55-5 |
| 6 | 2-Hydroxy-4-methoxy benzophenone; | 131-57-7 |
| 7 | 2-Hydroxy-4-methoxy benzophenone-5-sulfonic acid | 4065-45-6 |
| 8 | 2,2'-dihydroxy-4,4'-dimethoxybenzophenone | 131-54-4 |
| 9 | 2,2'-Dihydroxy-4-methoxybenzophenone | 131-53-3 |
| 10 | Alpha-(2-oxoborn-3-ylidene)toluene-4-sulphonic acid and its salts (Mexoryl SL) | 56039-58-8 |
| 11 | 1-[4-(1,1-dimethylethyl)phenyl]-3-(4-methoxyphenyl)propane-1,3-dione (Avobenzone) | 70356-09-1 |
| 12 | Methyl N,N,N-trimethyl-4-[(4,7,7-trimethyl-3-oxobicyclo[2,2,1]hept-2-ylidene)methyl]anilinium sulphate (Mexoryl SO) | 52793-97-2 |
| 22 | 3,3,5-Trimethyl cyclohexyl-2-hydroxy benzoate; homosalate | 118-56-9 |
| 23 | Isopentyl p-methoxycinnamate; isoamyl methoxy cinnamate | 71617-10-2 |
| 27 | Menthyl-o-aminobenzoate | 134-09-8 |
| 28 | Menthyl salicylate | 89-46-3 |
| 29 | 2-Ethylhexyl 2-cyano,3,3-diphenylacrylate; octocrylene | 6197-30-4 |
| 30 | 2-ethylhexyl 4-(dimethylamino)benzoate | 21245-02-3 |
| 31 | 2-ethylhexyl 4-methoxycinnamate; octyl methoxy cinnamate | 5466-77-3 |

TABLE 3-continued

Suitable UV filter substances and adjuvants which can be additionally used with the UV absorbers according to the present disclosure

| No. | Chemical Name | CAS No. |
|---|---|---|
| 32 | 2-ethylhexyl salicylate | 118-60-5 |
| 33 | Benzoic acid,4,4',4''-(1,3,5-triazine-2,4,6-triyltriimino)tris-, tris(2-ethylhexyl)ester; 2,4,6-Trianilino-(p-carbo-2'-ethylhexyl-1'-oxi)-1,3,5-triazine (Octyl Triazone) | 88122-99-0 |
| 34 | 4-aminobenzoic acid | 150-13-0 |
| 35 | Benzoic acid, 4-amino-, ethyl ester, polymer with oxirane | 113010-52-9 |
| 38 | 2-phenyl-1H-benzimidazole-5-sulphonic acid; phenylbenzimidazolsulfonic acid | 27503-81-7 |
| 39 | 2-Propenamide, N-[[4-[(4,7,7-trimethyl-3-oxobicyclo[2.2.1]hept-2-ylidene)methyl]phenyl]methyl]-, homopolymer | 147897-12-9 |
| 40 | Triethanolamine salicylate | 2174-16-5 |
| 41 | 3, 3'-(1,4-phenylenedimethylene)bis[7,7-dimethyl-2-oxo-bycyclo[2.2.1]methanesulfonic acid] (Cibafast H) | 90457-82-2 |
| 42 | Titanium dioxide (primary particle size 10-50 nm) For example T805 or Eusolex T-AVO, Eusolex T-2000, Titaniumdioxid VT 817 | 13463-67-7 |
| 44 | Zinc oxide (primary particle size 20-100 nm) For example Zinc oxide NDM, Zinc oxide Z-Cote HP1, Nanox Zinc oxide | 1314-13-2 |
| 45 | 2,2'-Methylene-bis-[6-(2H-benzotriazol-2-yl)-4-(1,1,3,3-tetramethylbutyl)-phenol] (Tinosorb M) | 103597-45-1 |
| 46 | 2,4-bis{[4-(2-ethylhexyloxy)-2-hydroxy]-phenyl}-6-(4-methoxyphenyl)-(1,3,5)-triazine (Tinosorb S) | 187393-00-6 |
| 47 | 1H-Benzimidazole-4,6-disulfonic acid, 2,2'-(1,4-phenylene)bis-, disodium salt | 180898-37-7 |
| 48 | Benzoic acid, 4,4'-[[6-[[4-[[(1,1-dimethylethyl)amino]carbonyl] phenyl]amino]1,3,5-triazine-2,4-diyl]diimino]bis-, bis(2-ethylhexyl)ester; diethylhexyl butamido triazone (Uvasorb HEB) | 154702-15-5 |
| 49 | Phenol, 2-(2H-benzotriazol-2-yl)-4-methyl-6-[2-methyl-3-[1,3,3,3-tetramethyl-1-[(trimethylsilyl)oxy]disiloxanyl]propyl]-; drometrizole trisiloxane (Mexoryl XL) | 155633-54-8 |
| 50 | Dimethicodiethylbenzalmalonate; Polysilicone 15 (Parsol SLX) | 207574-74-1 |
| 51 | Benzenesulfonic acid, 3-(2H-benzotriazol-2-yl)-4-hydroxy-5-(1-methylpropyl)-, monosodium salt (Tinogard HS) | 92484-48-5 |
| 52 | Benzoic acid, 2-[4-(diethylamino)-2-hydroxybenzoyl]-, hexyl ester (Uvinul A Plus) | 302776-68-7 |
| 53 | 1-Dodecanaminium, N-[3-[[4-(dimethylamino)benzoyl]amino]propyl]N,N-dimethyl-, salt with 4-methylbenzenesulfonic acid (1:1) (Escalol HP610) | 156679-41-3 |
| 54 | 1-Propanaminium, N,N,N-trimethyl-3-[(1-oxo-3-phenyl-2-propenyl)amino]-, chloride | 177190-98-6 |
| 55 | 1H-Benzimidazole-4,6-disulfonic acid, 2,2'-(1,4-phenylene)bis- | 170864-82-1 |
| 56 | 1,3,5-Triazine, 2,4,6-tris(4-methoxyphenyl)- | 7753-12-0 |
| 57 | 1,3,5-Triazine, 2,4,6-tris[4-[(2-ethylhexyl)oxy]phenyl]- | 208114-14-1 |
| 58 | 1-Propanaminium, 3-[[3-[3-(2H-benzotriazol-2-yl)-5-(1,1-dimethylethyl)-4-hydroxyphenyl]-1-oxopropyl]amino]-N,N-diethyl-N-methyl-, methyl sulfate (salt) | 340964-15-0 |
| 59 | 2-Propenoic acid, 3-(1H-imidazol-4-yl)- | 104-98-3 |
| 60 | Benzoic acid, 2-hydroxy-, [4-(1-methylethyl)phenyl]methyl ester | 94134-93-7 |
| 61 | 1,2,3-Propanetriol, 1-(4-aminobenzoate) (Glyceryl PABA) | 136-44-7 |
| 62 | Benzeneacetic acid, 3,4-dimethoxy-a-oxo- | 4732-70-1 |
| 63 | 2-Propenoic acid, 2-cyano-3,3-diphenyl-, ethyl ester | 5232-99-5 |
| 64 | Anthralinic acid, p-menth-3-yl ester | 134-09-8 |
| 65 | 2,2'-bis(1,4-phenylene)-1H-benzimidazole-4,6-disulphonic acid mono sodium salt or Disodium phenyl dibenzimidazole tetrasulfonate (Neo Heliopan AP) | 349580-12-7, |
| 66 | 1,3,5-Triazine-2,4,6-triamine, N,N'-bis[4-[5-(1,1-dimethylpropyl)-2-benzoxazolyl]phenyl]-N''-(2-ethylhexyl)- (Uvasorb K2A) | 288254-16-0 |
| 67 | Merocyanine derivatives as described in WO 2004006878, WO2006032741, IPCOM000022279D and in IP.COM JOURNAL (2005), 5(7B), 18 | |
| 68 | 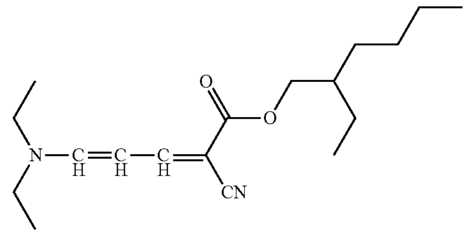 [SMILES: CCCCC(CC)COC(=O)C(C#N)=CC=CN(CC)CC] | |

TABLE 3-continued

Suitable UV filter substances and adjuvants which can be additionally used with the UV absorbers according to the present disclosure

| No. | Chemical Name | CAS No. |
|---|---|---|
| 69 | sterols (cholesterol, lanosterol, phytosterols), as described in WO0341675 | |
| 70 | mycosporines and/or mycosporine-like amino acids as described in WO2002039974, e.g. Helioguard 365 from Milbelle AG, isolated mycosporine like amino acids from the red alga porphyra umbilicalis (INCI: Porphyra Umbilicalis) that are encapsulated into liposomes,) | |
| 71 | alpha-lipoic-acid as described in DE 10229995 | |
| 72 | synthetic organic polymers as described in EP 1371358, [0033]-[0041] | |
| 73 | phyllosilicates as described in EP 1371357 [0034]-[0037] | |
| 74 | silica compounds as described in EP1371356, [0033]-[0041] | |
| 75 | inorganic particles as described in DE10138496 [0043]-[0055] | |
| 76 | latex particles as described in DE10138496 [0027]-[0040] | |
| 77 | 1H-Benzimidazole-4,6-disulfonic acid, 2,2'-(1,4-phenylene)bis-, disodium salt; Bisimidazylate (Neo Heliopan APC) | 180898-37-7 |
| 78 | 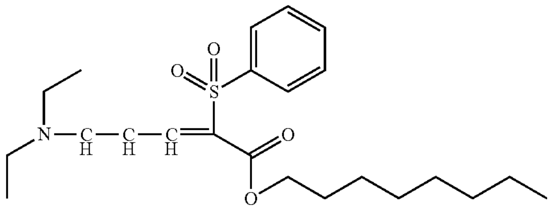 [SMILES: CCCCCCCCOC(=O)C(=CCCN(CC)CC)S(=O)(=O)c1ccccc1] | |
| 79 | 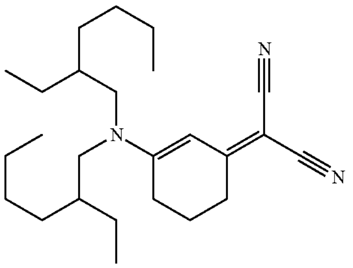 [SMILES: CCCCC(CC)CN(CC(CC)CCCC)C1=CC(=C(C#N)C#N)CCC1] | |
| 80 | 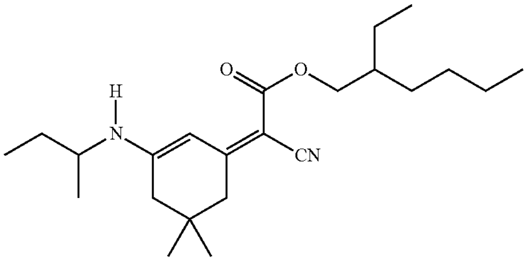 E or Z isomer or mixture of E/Z isomers | |
| 81 | 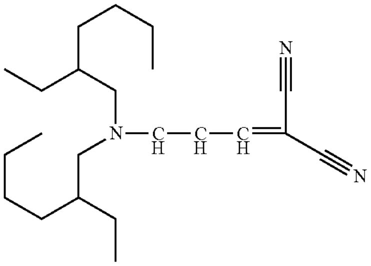 [SMILES: CCCCC(CC)CN(CCC=C(C#N)C#N)CC(CC)CCCC] | |
| 82 | Di-2-ethylhexyl-3,5-dimethoxy-4-hydroxy-benzalmalonate (Oxynex ST, EMD Chemicals, as described in US 20040247536) | |
| 83 | 2,4,6-Tris-1,1',4',1"-terphenyl-4-yl-1,3,5-triazine | |
| 84 | 2,4,6-Tris(p-biphenylyl)-s-triazine | 31274-51-8 |
| 85 | Ethylhexyly methoxycinnamate (Uvinul MC 80) | 5466-77-3 |

TABLE 3-continued

| Suitable UV filter substances and adjuvants which can be additionally used with the UV absorbers according to the present disclosure | | |
|---|---|---|
| No. | Chemical Name | CAS No. |
| 85 | Ethylhexyly methoxycinnamate (and) Diethylamino hydroxylbenzoyl hexyl benzoate (Uvinul A Plus B) | 5466-77-3<br>302776-68-7 |
| 86 | Ethylhexyl Triazone (Uvinul T 150) | 88122-99-0 |
| 87 | Octocrylene (Uvinul N 539 T) | 6197-30-4 |

(h) Emulsifier Systems

Any conventionally usable emulsifier can be used for the compositions. Emulsifier systems may comprise for example: carboxylic acids and their salts: alkaline soap of sodium, potassium and ammonium, metallic soap of calcium or magnesium, organic basis soap such as Lauric, palmitic, stearic and oleic acid etc. Alkyl phosphates or phosphoric acid esters, acid phosphate, diethanolamine phosphate, potassium cetyl phosphate. Ethoxylated carboxylic acids or polyethyleneglycol esters, PEG-n acylates. Linear fatty alcohols having from 8 to 22 carbon atoms, branched from 2 to 30 mol of ethylene oxide and/or from 0 to 5 mol propylene oxide with fatty acids having from 12 to 22 carbon atoms and with alkylphenols having from 8 to 15 carbon atoms in the alkyl group. Fatty alcohol polyglycolether such as laureth-n, ceteareth-n, steareth-n, oleth-n. Fatty acid polyglycolether such as PEG-n stearate, PEG-n oleate, PEG-n cocoate. Monoglycerides and polyol esters. C12-C22 fatty acid mono- and di-esters of additional products of from 1 to 30 mol of ethylene oxide with polyols. Fatty acid and polyglycerol ester such as monostearate glycerol, diisostearoyl polyglyceryl-3-diisostearates, polyglyceryl-3-diisostearates, triglyceryl diisostearates, polyglyceryl-2-sesquiisostearates or polyglyceryl dimerates. Mixtures of compounds from a plurality of those substance classes are also suitable. Fatty acid polyglycolesters such as monostearate diethylene glycol, fatty acid and polyethylene glycol esters, fatty acid and saccharose esters such as sucro esters, glycerol and saccharose esters such as sucro glycerides. Sorbitol and sorbitan, sorbitan mono- and di-esters of saturated and unsaturated fatty acids having from 6 to 22 carbon atoms and ethylene oxide addition products. Polysorbate-n series, sorbitan esters such as sesquiisostearate, sorbitan, PEG(6)-isostearate sorbitan, PEG-(10)-sorbitan laurate, PEG-17-dioleate sorbitan. Glucose derivatives, C8-C22 alkyl-mono and oligo-glycosides and ethoxylated analogues with glucose being preferred as the sugar component. O/W emulsifiers such as methyl gluceth-20 sesquistearate, sorbitan stearate/sucrose cocoate, methyl glucose sesquistearate, cetearyl alcohol/cetearyl glucoside. W/O emulsifiers such as methyl glucose dioleate/methyl glucose isostearate. Sulfates and sulfonated derivatives, dialkylsulfosuccinates, dioctyl succinate, alkyl lauryl sulfonate, linear sulfonated parafins, sulfonated tetraproplyne sulfonate, sodium lauryl sulfates, amonium and ethanolamine lauryl sulfates, lauyl ether sulfates, sodium laureth sulfates, sulfosuccinates, aceyl isothionates, alkanolamide sulfates, taurines, methyl taurines, imidazole sulfates. Amine derivatives, amine salts, ethoxylated amines, oxide amine with chains containing an heterocycle such as alkyl imidazolines, pyridine derivatives, isoquinoteines, cetyl pyridinium chlorure, cetyl pyridinium bromide, quaternary ammonium such as cetyltrimethylbroide amonium broide (CTBA), stearylalkonium. Amide derivatives, alkanolamides such as acylamide DEA, ethoxylated amides such as PEG-n acylamide, oxydeamide. Polysiloxane/polyalkyl/polyether copolymers and derivatives, dimethicone, copolyols, silicone polyethylene oxide copolymer, silicone glycol copolymer. Propoxylated or POE-n ethers (Meroxapols), Polaxamers or poly(oxyethylene)m-block-poly(oxypropylene)n-block(oxyethylene). Zwitterionic surfactants that carry at least one quaternary ammonium group and at least one carboxylate and/or sulfonate group in the molecule. Zwitterionic surfactants that are especially suitable are betaines, such as N-alkyl-N,N-dimethylammonium glycinates, cocoalkyldimethylammonium glycinate, N-acylaminopropyl-N,N-dimethylammonium glycinates, cocoacylaminopropyldimethylammonium glycinate and 2-alkyl-3-carboxymethyl-3-hydroxyethylimidazolines each having from 8 to 18 carbon atoms in the alkyl or acyl group and also cocoacylaminoethylhydroxyethylcarboxymethylglycinate, N-alkylbetaine, N-alkylaminobetaines. Alkylimidazolines, alkylopeptides, lipoaminoacides, self emulsifying bases and the compounds as described in K. F. DePolo, A short textbook of cosmetology, Chapter 8, Table 8-7, p 250-251.

Non ionic emulsifiers such as PEG-6 beeswax (and) PEG-6 stearate (and) polyglyceryl-2-isostearate [Apifac], glyceryl stearate (and) PEG-100 stearate. [Arlacel 165], PEG-5 glyceryl stearate [arlatone 983 S], sorbitan oleate (and) polyglyceryl-3 ricinoleate. [Arlacel 1689], sorbitan stearate and sucrose cocoate [arlatone 2121], glyceryl stearate and laureth-23 [Cerasynth 945], cetearyl alcohol and ceteth-20 [Cetomacrogol Wax], cetearyl alcohol and colysorbate 60 and PEG-150 and stearate-20 [Polawax GP 200, Polawax NF], cetearyl alcohol and cetearyl polyglucoside [Emulgade PL 1618], cetearyl alcohol and ceteareth-20 [Emulgade 1000N1, Cosmowax], cetearyl alcohol and PEG-40 castor oil [Emulgade F Special], cetearyl alcohol and PEG-40 castor oil and sodium cetearyl sulfate [Emulgade F], stearyl alcohol and steareth-7 and steareth-10 [Emulgator E 2155], cetearyl alcohol and steareth-7 and steareth-10 [Emulsifying wax U.S.N.F], glyceryl stearate and PEG-75 stearate [Gelot 64], propylene glycol ceteth-3 acetate. [Hetester PCS], propylene glycol isoceth-3 acetate [Hetester PHA], cetearyl alcohol and ceteth-12 and oleth-12 [Lanbritol Wax N 21], PEG-6 stearate and PEG-32 stearate [Tefose 1500], PEG-6 stearate and ceteth-20 and steareth-20 [Tefose 2000], PEG-6 stearate and ceteth-20 and glyceryl stearate and steareth-20 [Tefose 2561], glyceryl stearate and ceteareth-20 [Teginacid H, C, X].

Silicone emulsifiers particularly suitable for W/Si emulsions are those corresponding to the following formula:

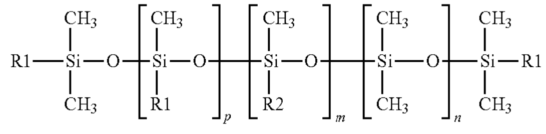

wherein m is a number from 1 to 20 n is a number from 0 to 500 p is a number from 0 to 50

R1 is linear or branched C1-C30 Alkyl radical or phenyl radical

R2 is —$C_cH2_c$ (—O—C2H4)$_a$—(—O—C3H6)$_b$-(-O—C4H8)$_d$-R3

R3 is —H, —OH; linear or branched alkyl C1-C12; linear or branched alkoxy C1-C6; linear or branched acyloxy C2-C12; —NHCH2$CH_2$COOM; aminoalkyl radical optionally substituted on the amine function; —NHCO ($CH_2$)$_d$— COOM, C1-C30 carboxyacyl radical;

where M is H, Na, K, Li, NH4 or organic amine; optionally substituted phosphono group;

NHCO($CH_2$)$_d$ OH; —NH3Y where Y is a monovalent organic or inorganic anion such as Cl, Br, Sulfate, Carboxylate (Acetate, Lactate, Citrate).

a is a number from 0 to 100 b is a number from 0 to 50; and c is a number from 0 to 5 d is a number from 0 to 10.

These compounds represent the oxyalkylenated organo-modified silicones. Other denominations used are PEG/PPG Dimethicones (Dimethicone copolyols) or Silicone polyethers that clearly show surface active properties necessary to emulsify.

Preferred silicone emulsifiers which are particularly recommended correspond to formula

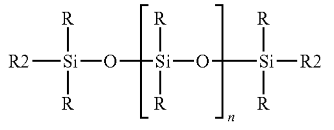

wherein n is a number from 1 to 500

R is linear or branched C1-C30 Alkyl radical or phenyl radical

R2 is —$C_cH2_c$ (—O—C2H4)$_a$-(-O—C3H6)$_b$-O(—C4H8)$_d$-R3

R3, a, b, c & d have the same meaning as previously described

A non exhaustive list of W/Si emulsifiers is given in the following table:

TABLE 4

| Examples for W/Si emulsifiers |
|---|
| INCI denomination |
| Oxyalkylenated organo-modified slicones: |
| PEG/PPG Dimethicones & Silicone polyethers |
| Bis-PEG/PPG-14/14 Dimethicone |
| Bis-PEG/PPG-20/20 Dimethicone |
| Bis-PEG/PPG-16/16 PEG/PPG-16/16 Dimethicone |
| Bis_PEG-15 Methyl Ether Dimethicone |
| Bis(PPG-7 Undeceneth-21) Dimethicone |
| Cetyl PEG/PPG-15/15 Butyl Ether Dimethicone |
| Cetyl PEG/PPG-7/3 Dimethicone |
| Cetyl PEG/PPG-10/1 Dimethicone |
| Dimethicone Copolyol |
| Dimethicone PEG-8 Adipate |
| Dimethicone PEG-7 Avocadoate |
| Dimethicone PEG-8 Avocadoate |
| Dimethicone PEG-8 Beeswax |
| Dimethicone PEG-n esters . . . |

TABLE 4-continued

| Examples for W/Si emulsifiers |
|---|
| Dimethicone/PEG-10 Crosspolymer |
| Dimethicone/PEG-15 Crosspolymer |
| Dimethicone/PEG-7 Phosphate |
| Dimethicone/PEG-n Phosphates . . . |
| Dimethicone PEG/PPG-7/4 Phosphate |
| Dimethicone PEG/PPG-12/4 Phosphate |
| Dimethicone PEG-7 Undecylenate |
| Laurylmethicone copolyol |
| PEG-10 Dimethicone crosspolymer |
| PEG-12 Dimethicone crosspolymer |
| PEG-10 Lauryl Dimethicone Crosspolymer |
| PEG-15 Lauryl Dimethicone Crosspolymer |
| PEG-6 Methyl ether Dimethicone |
| PEG-n Methyl ether Dimethicones . . . |
| PEG-32 Methyl ether Dimethicone |
| PEG/PPG-20/22 Butyl Ether Dimethicone |
| PEG/PPG-22/22 Butyl Ether Dimethicone |
| PEG/PPG-23/23 Butyl Ether Dimethicone |
| PEG/PPG-24/18 Butyl Ether Dimethicone |
| PEG/PPG-27/9 Butyl Ether Dimethicone |
| PEG/PPG-3/10 Dimethicone |
| PEG/PPG-5/3 Trisiloxane |
| PEG/PPG-n/m Dimethicones . . . |
| PEG/PPG-30/10 Dimethicone |
| Potassium Dimethicone PEG-7 Phosphate |
| PPG-12 Butyl Ether Dimethicone |
| PPG-12 Dimethicone |
| PPG-27 Dimethicone |
| TEA-Dimethicone PEG-7 Phosphate |
| Caprylyl Dimethicone Ethoxy Glucoside |
| Dimethicone Ethoxy Glucoside |
| Dimethicone/Polyglycerin-3 Crosspolymer |
| PEG-9 Polydimethylsiloxyethyl Dimethicone |
| Polydimethylsiloxy PEG/PPG-24/19 Butyl Ether Silsesquioxane |
| Polydimethylsiloxy PPG-13 Butyl Ether Silsesquioxane |
| Polyglyceryl-3 Disiloxane Dimethicone |
| Polyglyceryl-3 Polydimethylsiloxyethyl Dimethicone |
| Sodium Carboxydecyl PEG-8 Dimethicone |
| Non-oxyalkylenated organo-modified silicones: |
| C6-8 Alkyl C3-6 Alkyl Glucoside Dimethicone |

Anionic emulsifiers such as PEG-2 stearate SE, glyceryl stearate SE [Monelgine, Cutina KD], propylene glycol stearate [Tegin P], cetearyl Alcohol and Sodium cetearyl sulfate [Lanette N, Cutina LE, Crodacol GP], cetearyl alcohol and sodium lauryl sulfate [Lanette W], trilaneth-4 phopshate and glycol stearate and PEG-2 stearate [Sedefos 75], glyceryl stearate and sodium lauryl Sulfate [Teginacid Special]. Cationic acid bases such as cetearyl alcohol and cetrimonium bromide.

The emulsifiers may be used in an amount of, for example, from 1 to 30% by weight, especially from 4 to 20% by weight and preferably from 5 to 10% by weight, based on the total weight of the composition.

When formulated in O/W emulsions, the preferably amount of such emulsifier system could represent 5% to 20% of the oil phase.

In such inventive embodiments, emulsifiers will be used, such especially as: carboxylic acids and their salts (such as palmitinic acid, stearic acid, oleic acid, lauric acid etc.); alkyl phosphates or phosphoric acid esters (such as diethanolamine cetyl phosphate, potassium cetyl phosphate, etc.); alkylamines; alkyl imidazolines; ethoxylated amines; quaternary emulsifiers; sorbitol and sorbitan (polysorbates, sorbitan esters); sucrose and glucose derivatives (such as sorbitan stearate, sucrose cocoate, methyl glucose-sesquistearate, methyl glucose dioleate and methyl glucose isostearate); alkanolamides and ethoxylated amides (such as PEG-n acylamides (with n=1-50)); ethoxylated carboxylic acids or polyethylene glycol esters (PEG-n acylates with n=1-200), such as fatty alcohol; polyglycolethers; laureth-n (with n=1-200); ceteareth-n (with n=1-200); steareth-n (with n=1-100); oleth-n (with n=1-200) and PEG-n stearate (with n=1-200); PEG-n oleate (with n=1-200); PEG-n cocoate (with n=2-150); polyglyceryl esters and fatty acid esters; dimethicone copolyols such as silicone polyethylene oxide copolymer; silicone glycol copolymer; propoxylated or polyoxyethylene ethers; polaxamers; polymeric emulsifiers (such as acrylate copolymers or crosspolymers and acrylamides or polyacrylamides); and mixtures or combinations of two or more of the foregoing emulsifiers.

In emulsified embodiments of the present disclosure, the lipid phase will advantageously be selected from mineral oils; mineral waxes; oils (such as triglycerides of capric and caprylic acid); natural oils (such as castor oil); fats; waxes and other natural and synthetic fats (for example esters of fatty acids with short chain alcohols, such as isopropanol, propylene glycol or glycerine) or esters of fatty alcohols with fatty acids or carboxylic acids with low number of carbon atoms; alkylbenzoate; silicone oils (such as dimethylpolysiloxane, diethylpolysiloxane, diphenylpolysiloxane); and/or mixtures of two or more thereofIn various embodiments of the present disclosure, the oil phase of the emulsion, oleogel, hydrodispersion or lipodispersion is advantageously selected from saturated and/or unsaturated, branched and/or linear alkane carbonic acids with a chain length of 3 to 30 C-atoms; saturated and/or unsaturated, branched or linear alcohols with a chain length of 3 to 30 C-atoms; an ester of aromatic carbonic acids and saturated and/or unsaturated, branched and/or linear alcohols with a chain length of 3-30 C-atoms; and/or mixtures of two or more thereof. In some embodiments, exemplary ester oils are: isopropylmyristate, isopropylpalmitate, isopropylstearate, isopropyloleate, n-butylstearate, n-hexyllaurate, n-decyloleate, isooctylstearate, iso-nonylstearate, isononylisononanoate, 2-ethylhexylpalmitate, 2-hexyllaurate, 2-hexyldecylstearate, 2-octyldodecylpalmitate, oleyloleate, oleylerucate, erucyloleate and erucylerucate, as well as synthetic, semi-synthetic and natural mixtures of such esters such as jojoba oil.

In some embodiments comprising fatty acid triglycerides, they will be selected from synthetic, semi-synthetic and natural oils, such as: olive oil, sunflower oil, soy oil, peanut oil, rape-seed oil, palm oil, almond oil, coconut oil and similar oils.

Mixtures of such oil and wax components or waxes such as cetyl palmitate will be used in some embodiments as the sole oil phase.

In some embodiments, the oil phase comprises other preferred ingredients, such as: 2-ethylhexylisostearate; octyldodecanol; isotridecylisononanoate; isoeicosane; 2-ethylhexylcocoate; $C_{12}$-$C_{15}$ alkyl benzoate; caprylic-caprinic acid-triglycerides and dicaprylic ether or mixtures of those ingredients (such as mixtures of 2-ethylhexylisostearate with $C_{12}$-$C_{15}$ alkylbenzoate); mixtures of $C_{12}$-$C_{15}$ alkylbenozoate and isotridecylisononanoate and mixtures of $C_{12}$-$C_{15}$ alkylbenzoate with 2-ethylhexylisostearate and isotridecylisononanoate. Moreover cyclic or linear silicone oils can be used and are in some cases the only ingredient in the oil phase. In particular embodiments, preferred silicone oils include: cyclomethicone (octamethylcyclotetrasiloxane), hexamethylcyclotrisiloxane, polydimethylsiloxane and poly(methylphenylsiloxane).

In some embodiments, preferred hydrocarbons include: paraffin oil, squalane and squalene.

In some embodiments, the aqueous phase contains for example ingredients such as: alcohols, diols or polyols with a low number of C-atoms or their ethers (for example ethanol, isopropanol, propyleneglycol, glycerin, ethylene glycol, ethylene glycol monoethylether, ethylene glycol monobutylether, propylene glycol monomethylether, propylene glycol monoethylether, propylene glycol monobutylether, diethylene glycol monomethylether; diethylene glycol monoethylether, diethylene glycol monobutylether and similar products); lower homologs of alcohols (such as ethanol, isopropanol, 1,2-dipropandiol and glycerin), as well as one or more thickeners for example: silicium dioxide, aluminum silicates, polysaccharides or derivatives thereof (for example hyaluronic acid, xanthan gum, hydroxypropylmethylcellulose); polyacrylates {for example substances from the Carbopol range (for example Carbopol types 980, 981, ETD2001 or 2020, Aqua SF-1, Ultrez 1), Salcare range (Salcare SC80, Salcare SC81, Salcare SC91, Salcare AST, Salcare SC 92, Salcare SC95, Salcare SC96, Salcare Super 7) or Novemer™ EC-1}; Cosmedia® SP; Aristoflex AVC; or modified Starch (such as Structure® Solanace or Structure® XL).

(i) Additional Functional Ingredients

In some embodiments, the stabilizer employed in the cleansing compositions will comprise fatty acid esters. Esters of linear $C_6$-$C_{24}$ fatty acids with linear $C_3$-$C_{24}$ alcohols, esters of branched $C_6$-$C_{13}$carboxylic acids with linear $C_6$-$C_{24}$ fatty alcohols, esters of linear $C_6$-$C_{24}$ fatty acids with branched alcohols, especially 2-ethylhexanol, esters of hydroxycarboxylic acids with linear or branched $C_6$-$C_{22}$ fatty alcohols, especially dioctyl malates, esters of linear and/or branched fatty acids with polyhydric alcohols (for example propylene glycol, dimer diol or trimer triol) and/or Guerbet alcohols, for example caproic acid, caprylic acid, 2-ethylhexanoic acid, capric acid, lauric acid, isotridecanoic acid, myristic acid, palmitic acid, palmitoleic acid, stearic acid, isostearic acid, oleic acid, elaidic acid, petroselinic acid, linoleic acid, linolenic acid, elaeostearic acid, arachidic acid, gadoleic acid, behenic acid and erucic acid and technical-grade mixtures thereof (obtained, for example, in the pressure removal of natural fats and oils, in the reduction of aldehydes from Roelen's oxosynthesis or in the dimerisation of unsaturated fatty acids) with alcohols, for example, isopropyl alcohol, caproic alcohol, capryl alcohol, 2-ethylhexyl alcohol, capric alcohol, lauryl alcohol, isotridecyl alcohol, myristyl alcohol, cetyl alcohol, palmoleyl alcohol, stearyl alcohol, isostearyl alcohol, oleyl alcohol, elaidyl alcohol, petroselinyl alcohol, linoyl alcohol, linolenyl alcohol, elaeostearyl alcohol, arachidyl alcohol, gadoleyl alcohol, behenyl alcohol, erucyl alcohol and brassidyl alcohol and technical-grade mixtures thereof (obtained, for example, in the high-pressure hydrogenation of technical-grade methyl esters based on fats and oils or aldehydes from Roelen's oxosynthesis and as monomer fractions in the dimerisation of unsaturated fatty alcohols).

Examples of such ester oils are isopropylmyristate, isopropylpalmitate, isopropylstearate, isopropyl isostearate, isopropyloleate, n-butylstearate, n-hexyllaurate, n-decyloleate, isooctylstearate, iso-nonylstearate, isononyl isononanoate, 2-ethylhexylpalmitate, 2-hexyllaurate, 2-hexyldecylstearate, 2-octyldodecylpalmitate, oleyloleate, oleylerucate, erucyloleate, erucylerucate, cetearyl octanoate, cetyl palmitate, cetyl stearate, cetyl oleate, cetyl behenate, cetyl acetate, myristyl myristate, myristyl behenate, myristyl oleate, myristyl stearate, myristyl palmitate, myristyl lactate, propylene glycol dicaprylate/caprate, stearyl heptanoate, diisostearyl malate, octyl hydroxystearate, etc.

In some embodiments, $C_{10}$-$C_{22}$ ethylene glycol fatty acid esters are desirably combined with the polymeric thickeners (described above). In some embodiments, the ester is preferably a diester, more preferably a $C_{14}$-$C_{18}$ diester, most preferably ethylene glycol distearate. In embodiments wherein $C_{10}$-$C_{22}$ ethylene glycol fatty acid esters are utilized as the stabilizer, they will be present in a concentration range of: from about 3% to about 10%, preferably from about 5% to about 8%, more preferably from about 6% to about 8% of the personal cleansing compositions.

Another class of stabilizer which will be employed in some embodiments of the anti-microbial compositions of the present disclosure comprises dispersed amorphous silica: i.e. fumed silica, precipitated silica and mixtures thereof. As used herein the term "dispersed amorphous silica" refers to small, finely divided non-crystalline silica having a mean agglomerate particle size of less than about 100 microns.

In some embodiments in which amorphous silicas are used as the stabilizer, they will be included in the cleansing compositions at levels ranging from about 0.1% to about 10%, preferably from about 0.25% to about 8%, more preferably from about 0.5% to about 5%.

Another class of stabilizer which will be employed in embodiments of the anti-microbial compositions of the present disclosure comprises dispersed smectite clay selected from the group consisting of bentonite and hectorite and mixtures thereof. Bentonite is a colloidal aluminum clay sulfate (see Merck Index, Eleventh Edition, 1989, entry 1062, p. 164, which is incorporated by reference). Hectorite is a clay containing sodium, magnesium, lithium, silicon, oxygen, hydrogen and flourine. (See Merck Index, eleventh Edition, 1989, entry 4538, p. 729, which is herein incorporated by reference.) When smectite clay is employed as the stabilizer in some embodiments of the cleansing compositions of the present disclosure, it will be constitute about 0.1% to about 10%, preferably from about 0.25% to about 8%, more preferably from about 0.5% to about 5% of the composition.

In the embodiment of the present disclosure passivating agents might be used for stabilization especially from the group of hectorite, bentonite, montmorillonit, nontronit, saponit, sauconit, beidellit, allevardit, illit, halloysit, attapulgit, sepiolit and/or talcum.

Other known stabilizers, such as fatty acids and fatty alcohols, are also employed in some embodiment of the inventive compositions. In some embodiments, palmitic acid and lauric acid are especially preferred.

Some embodiments of the antimicrobial compositions of the present disclosure comprise suitable "skin lightening agents or skin bleaching ingredients" including kojic acid, arbutin, tranexamic acid, ascorbic acid and derivatives thereof, e.g., magnesium ascorbyl phosphate or sodium ascorbyl phosphateor other salts of ascorbyl phosphate. Also those ingredient displayed in the PCT application No US 95/07432, filed on Feb. 24, 1995 and PCT application No US 95/02809, filed on Jan. 3, 1995.

Some embodiments of the antimicrobial compositions of the present disclosure comprise suitable anti-wrinkle agents including sulfur-containing D and L amino acids and their derivatives and salts, particularly the N-acetyl derivatives, a preferred example of which is N-acetyl-L-cyteine; thiols; hydroxy acids (salicylic acid, glycolic acid), keto acids (pyruvic acid), phytic acid, lipoic acid; lysophophatidic acid, skin peel agents, flavonoids, stilbenes, cinnamates, resveratrol, kijnetin, zeatin, dimethylaminoethanol, peptides from natural and synthetic sources, salts of sugar acids (Mn gluconate), terpene alcohols, vitamin B compounds such as vitamin B3, vitamin B1 (Thiamine), vitamin B2 (riboflavin), vitamin B5 (Pantothenic acid), vitamin Bt (carnitine), Vitamin B12 (cobalamine), vitamin B15 (pangamic acid or diisopropylamine dichloroacetate) and their derivatives salts.

Some embodiments of the antimicrobial compositions of the present disclosure comprise substances suitable for use as super-fatting agents are, for example, lanolin and lecithin and also polyethoxylated or acrylated lanolin and lecithin derivatives, polyol fatty acid esters, monoglycerides and fatty acid alkanolamides, the latter simultaneously acting as foam stabilisers.

Some embodiments of the antimicrobial compositions of the present disclosure comprise substances suitable for use as adjuvants for example alpha glucosylrutin (CAS No. 130603-71-3), 2-butyloctyl o-hydroxybenzoate (CAS No. 190085-41-7), vitamin E (CAS No. 1406-18-4), vitamin E acetate (CAS No. 58-95-7), diethylhexyl 2,6-naphthalate, di-n-butyl adipate, di(2-ethylhexyl)-adipate, di(2-ethylhexyl)-succinate and diisotridecyl acelaat, and also diol esters, such as ethylene glycol dioleate, ethylene glycol diisotridecanoate, propylene glycol di(2-ethylhexanoate), propylene glycol diisostearate, propylene glycol dipelargonate, butanediol diisostearate and neopentyl glycol dicaprylate. Esters of $C_6$-$C_{24}$ fatty alcohols and/or Guerbet alcohols with aromatic carboxylic acids, saturated and/or unsaturated, especially benzoic acid, esters of $C_2$-$C_{12}$dicarboxylic acids with linear or branched alcohols having from 1 to 22 carbon atoms or polyols having from 2 to 10 carbon atoms and from 2 to 6 hydroxy groups, or iminodisuccinic acid and imiondisuccinic acid salts [CAS 7408-20-0] or latex particles, aloe vera, chamomile, ginko *biloba, ginseng*, coenzyme Q10, *laminaria ochroleuca* extract, *magnolia* oborata extract, melalenca alternifolia leaf oil, *rubus idaeus* seed oil, *vaccinium macrocarpon* seed oil, pumpkin seed extract, pumpkin seed oil, grape seed extract, carnosine, alpha-arbutin, madecassoside, termino-laside, tetrahydrocurcuminoids (THC), mycosporines, mycosporine like amino acids from the red alga *porphyra* umbilicalis, mycosporine-like amino acids (as described in WO2002039974), cis-9-octadecenedioic acid, lipoic acid, laurimino dipropiomic acid tocopheryl phosphates (LDTP), microcrystalline cellulose (MCC), polycarbonates as described in WO 0341676, sterols (cholesterol, lanosterol, phytosterols), as described in WO0341675 and linear poly-alpha-glucans as described in U.S. Pat. No. 6,616,935.

It is furthermore possible for the cosmetic preparations to contain, as adjuvants, anti-foams, such as silicones, structurants, such as maleic acid, solubilisers, such as ethylene glycol, propylene glycol, butylene glycol, PEG40 hydrogenated castor oil, glycerol or diethylene glycol, opacifiers, such as latex, styrene/PVP or styrene/acrylamide copolymers, complexing agents, such as EDTA, NTA, alaninediacetic acid or phosphonic acids, propellants, such as propane/butane mixtures, $N_2O$, dimethyl ether, $CO_2$, $N_2$ or air, so-called coupler and developer components as oxidation dye precursors, reducing agents, such as thioglycolic acid and derivatives thereof, thiolactic acid, cysteamine, thiomalic acid or mercaptoethanesulfonic acid, or oxidising agents, such as hydrogen peroxide, potassium bromate or sodium bromate.

A "colorant" is any compound or mixture capable of imparting a color to the composition. There may be used as colourants the substances that are suitable and permitted for cosmetic purposes, as compiled, for example, in the publication "Kosmetische Färbemittel" of the Farbstoffkommission der Deutschen Forschungsgemeinschaft, Verlag Chemie, Weinheim, 1984, pages 81 to 106. The colourants are usually used in concentrations of from 0.001 to 0.1% by weight, based on the total mixture.

An "emollient" is a compound or mixture capable of making the skin more soft or supple.

Some embodiments comprise one or more antioxidants. Preferably used are e.g. amino acids or amino acid derivatives; imidazoles and their derivatives; peptides such as D,L-carnosin; carotinoids; carotines and their derivatives; liponic acid; metal chelating agents (such as alpha-hydroxy fatty acids, palmitinic acid, phytinic acid, lactoferrine); alpha-hydroxyacids (for example lactic acid, maleic acid); humic acid; gallate;

EDTA, EGTA and their derivatives; unsaturated fatty acids and their derivatives; vitamin C (ascorbic acid) and its derivatives (such as acetylated derivatives); rutinic acid and its derivatives; alpha-glycosyl rutin, ferulic acid, butylhydroxytoluol, butylhydroxyanisol and suitable derivatives; and/or mixtures of two or more of these substances.

Additional examples for antioxidants are for example:

tocopherol (α, β, γ, δ isomers) and its esters of acids with general formulas $$H(CH_2)n(CHR)COOH \quad (1)$$

$$CH_3(CH_2)mCH{=}CH(CH_2)nCOOH \quad (2)$$

where R is hydrogen atom or OH group, m, n are integral numbers from 0 to 22 where m+n sum is maximally 22.

tocotrienol (α, β, γ, δ isomers), containing one unsaturated fatty chain, and its esters of acids ascorbic acid and its esters of acids such as phosphoric acid and also sodium, potassium, lithium and magnesium salts, Ascorbyl Tetraisopalmitate, further ester with pyrrolidoncarboxylic acid and esters of acids with general formulas $$H(CH2)n(CHR)COOH \quad (3)$$

$$CH3(CH2)mCH{=}CH(CH2)nCOOH \quad (4)$$

where R is hydrogen atom or OH group, m, n are integral numbers from 0 to 20 where m+n sum is maximally 21.

Retinoids include all natural and/or synthetic analogs of vitamin A or retinal-like compounds which possess the biological activity of vitamin A in the skin as well as the geometric isomers and stereoisomers of these compounds. Preferred compounds are retinal, retinol esters (e.g., C2-C22 alkyl esters (saturated or unsaturated alkyl chains) of retinal, including retinyl palmitate, retinyl acetate, retinyl propionate), retinal, and/or retinoic acid (including all trans retinoic acid and/or 13-cis-retinoic acid) or derivatives . . . Other retinoids which are useful herein are described in U.S. Pat. No. 4,677,120, issued Jun. 30, 1987 to Parish et al; U.S. Pat. No. 4,885,311, issued Dec. 5, 1989 to Parish et al; U.S. Pat. No. 5,049,584, issued Sep. 17, 1991 to Purcell et al., U.S. Pat. No. 5,124,356, issued Jun. 23, 1992 to Purcell et al. Other suitable retinoids are tocopheryl-retinoate [tocopherol ester of retinoic acid (trans or cis)], adapalene [6-(3-(1-adamantyl)-4-methoxyphenyl)-2-naphtoic acid] and tazarotene (ethyl 6-[2-(4,4-dimethylthiochroman-6-yl)ethynyl]nicotinate)

carotenoids such as α-, β-, γ-, and δ-carotene, lutein, xanthophylls, zeaxanthine, violaxanthine, cryptoxanthine, fukoxanthine, antheraxanthine, lycopene, didehydrolycopene and tetradehydrolycopene carotenoids enzymatic antioxidants such as Glutathione peroxidase, Catalase, Superoxide dismutase.

Ubiquinone and Idebenone(hydroxydecyl Ubiquinone), Ubiquinol and its derivatives Lipoic acid and its derivatives such as alpha-lipoic acid.

Rutinic acid and its derivatives such as a-glucosylrutin, a water soluble flavonoid, rutin hydrate (vitamin P)

Botanical extracts such as white and green tea extracts, chicory leaf extract (*Cichorium intubybus*), Passionflower extract (*Passiflora incarnata*), *Aspalathus linearis* extract, rosmary extract, red leaf extract of Aceraceae Maple tree or of Rosaceae Cherry tree, *Curcuma longa* L (curcuminoids active ingredients), *Leontopodium alpinum* extract, *Emblica officinalis* (phyllanthus emblica) tree extract.

Phenolic acids such as caffeic acid, 3,4-dihydroxyphenyl acetic acid, 3,4-dihydroxybenzoic acid.

Flavonoids and polyphenols such as flavanones selected from the group consisting of unsubstituted flavanones, mono-substituted flavanones, and mixtures thereof; chalcones selected from the group consisting of unsubstituted Chalcones, mono-substituted chalcones, di-substituted chalcones, tri-substituted chalcones, and mixture thereof; flavones selected from the group consisting of unsubstituted flavones, mono-substituted flavones, di-substituted flavones, and mixtures thereof; one or more isoflavones; coumarins selected from the group consisting of unsubstituted coumarins, mono-substituted coumarins, di-substituted coumarins, and mixtures thereof; flavonols, anthocyanins, catechins, proanthocyanidins (Grape seed extract). Flavonoids which are broadly disclosed in U.S. Pat. Nos. 5,686,082 and 5,686,367 can also be used.

chlorogenic acid and ferulic acid (k) Further biocidal active molecules, which are typically selected from the list of known biocides given further above. In case that such further biocides are used, the total amount of these further biocides and the antimicrobial agent of present component (a) generally remains within the limits specified for present component (a) alone, i.e. 1 part by weight of the biocide (a and optionally k) on 0.001 to 1000, especially 0.001 to 10, parts by weight of component (b); and 0.001 to 5% b.w. of the biocide (sum of a and optionally k), relative to the total weight of the composition.

The invention further provides personal care compositions, which are oral care compositions, comprising a biocide and water in an orally acceptable form. By "orally acceptable form", it is meant that the oral care composition includes at least one ingredient other than 4-phenoxyphenol derived substance and non-ionic or anionic surfactant, an alcohol, a detergent or combinations thereof, and that the ingredient is of the type that is tolerated by teeth and buccal tissues, such as the gums and inner cheek. Such orally acceptable compositions need not be ingestible (as most fluoride-containing toothpastes are not considered ingestible due their fluoride content), are non-toxic when applied to the mouth and then removed from the mouth. In particular, the disclosure provides oral care compositions that are mouth rinses, mouth washes, tooth pastes, tooth gels, denture pastes, denture gels, chewing gums, solid lozenges and oral sprays, which are described in more detail herein.

In some embodiments, the oral care compositions contain one or more additional oral care ingredients for treating the mouth, including the teeth, gums, tongue, or buccal skin surfaces. Such additional ingredients include cleaning agents, abrasives, fluoridating agents, malodor treating agents, tooth whitening agents, anti-carries agents, gelling agents, antibacterial agents (other than the inventive antimicrobial agent), flavorings, colorants and combinations of two or more of the foregoing. Such oral compositions may be used in a conventional manner commensurate with the physical form of the compositions, which may be liquid, paste, semi-solid or solid. For example, in some embodiments, wherein the compositions are pastes or gels, they are applied to a mouth surface (for example teeth and/or gums) with brushing. In other embodiments, where the compositions are liquids, they are applied to the mouth surface with gargling or swishing. They may be removed from the mouth by expectorating and optionally rinsing with water or a mouth rinse.

The disclosure provides antimicrobial compositions that possess antimicrobial activity against oral bacteria, and thus exhibit antibacterial effects in oral care applications. In particular embodiments, inventive compositions fight plaque; reduce, slow the progression of, or prevent gingivitis; reduce, slow the progression of, or prevent periodontitis and/or reduce mouth malodor. Such oral antimicrobial activity is enhanced in some inventive embodiments by combining the Biocide with other antimicrobial, anti-plaque, anti-gingivitis and/or anti-periodontitis agents such as chlorhexidine salts, quaternary compounds (such as cetrimonium bromide, benzalkonium chloride and cetyl pyridinium chloride) and/or phenolic substances {such as 2,4,4'-trichloro-2'-hydroxydiphenylether; 4,4'-dichloro-2-hydroxydiphenylether, thymol, and other phenolic compounds having the following generic formula

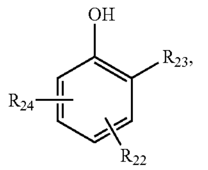

wherein $R_{22}$, $R_{23}$ and $R_{24}$ are independently from each other alkyl (branched, cyclo or linear), aryl, O-aryl, o-alkyl (linear, cyclo, or branched)}.

The disclosure further provides anti-plaque, anti-gingivitis and/or anti-periodontitis agents are for example thymol; 2-t-butyl-5-(4-t-butylphenyl)-phenol; 2,4-di-t-butyl phenol; 2-cyclohexylmethyl-4-t-butylphenol; 2-t-octyl-5-cyclohexylmethylphenol; 2-t-butyl-4-(1,1-dimethylpropyl)phenol; 2-t-butyl-4-(1,1-dimethylbutyl)phenol; 2,4-di-t-butyl-5-methylphenol; 2-t-butyl-4-(1,1,2,2-tetramethylpropyl)-5-methyl phenol; 2-t-butyl-4-(1,1,2,2-tetramethylpropyl)phenol; 2-t-butyl-5-cyclohexylmethylphenol; 2-t-butyl-4-n-heptylphenol; 2-isopropyl-5-cyclohexylmethylphenol; 2-isopropyl-4-cyclohexylmethylphenol; and 2-cyclohexyl-4-n-heptylphenol.

In some embodiments, the disclosure provides oral care compositions containing the Biocide alone, or in combinations with one or more of the above mentioned anti-microbial and/or anti-plaque agents are for example mouth rinses, semi-solids such as toothpastes or gel dentifrices, chewing gums or solid lozenge or the like.

Further embodiments of inventive oral compositions contain, for example:

- polishing agents (such as silica gels, colloidal silica or complex amorphous alkali metal aluminosilicate, sodium bicarbonate, sodium metaphosphate, potassium metaphosphate, tricalcium phosphate, dehydrated dicalcium phosphate, anhydrous dicalcium phosphate, calcium pyrophosphate, calcium carbonate, aluminum silicate, hydrated alumina, silica, bentonite and mixtures of any two or more thereof);
- humectants (such as glycerin, sorbitol, an alkylene glycol such as polyethylene glycol or propylene glycol, butylene glycol, PEG 40 hydrogenated castor oil and/or mixtures of any two or more thereof);
- water (for example as hereinbefore described);
- natural or synthetic thickener or gelling agent (such as Irish moss, iotacarragenan, kappa-carrageenan, gum tragacanth, starch, polyvinylpyrrolidone, hydroxyethyl propyl cellulose, hdroxybutyl methyl cellulose, hydroxypropyl methyl cellulose, hydroxyethyl cellulose and sodium carboxymethyl cellulose);
- alcohol (such as ethanol or isopropanol);
- organic surface-active agents, which are cationic, anionic or non-ionic;
- flavoring agents (such as thymol, menthol, methyl salicylate (wintergreen oil), eucalyptol, carvacrol, camphor, anethole, carvone, eugenol, isoeugenol, limonene, losimen, n-decyl alcohol, citronel, a-salpineol, methyl acetate, citronellyl acetate, methyl eugenol, cineol, linalool, ethyl linalaol, safrola vanillin, spearmint oil, peppermint oil, lemon oil, orange oil, sage oil, rosemary oil, cinnamon oil, pimento oil, laurel oil, cedar leaf oil, gerianol, verbenone, anise oil, bay oil, benzaldehyde, bergamot oil, bitter almond, chlorothymol, cinnamic aldehyde, citronella oil, clove oil, coal tar, *eucalyptus* oil, gualacol, lavender oil, mustard oil, phenol, phenyl salicylate, pine oil, pine needle oil, *sassafras* oil, spike lavender oil, storax, thyme oil, tolu balsam, terpentine oil, clove oil and combinations of two or more thereof; some preferred flavoring oils are: for example oil of spearmint, peppermint, wintergreen, *sassafras*, clove, sage, *eucalyptus*, cinnamon, lemon, orange and methyl salicylate);
- sweetening agents (such as sucrose, lactose, maltose, xylitol, sodium cyclamate, perillartine, aspartyl phenyl alanine methyl ester, saccharine and the like);
- agents used to diminish teeth sensitivity (such as strontium chloride, potassium nitrate and potassium citrate);
- whitening agents (for example peroxides, such as urea peroxide, carbamide peroxide and/or hydrogen peroxide);
- preservatives (such as sodium benzoate);
- substances that release fluoride ions to protect against caries (such as inorganic fluoride salts, for example sodium, potassium, ammonium or calcium fluoride or organic fluorides such as amine fluoride);
- other agents (such as chlorophyll compounds) and/or ammoniated materials (such as urea, diammonium phosphate) and/or mixtures thereof.

Another category of skin care formulations are water in silicone systems (w/silicone emulsions).

Silicones or siloxanes (organosubstituted polysiloxanes), Dimethylpolysiloxanes, methylphenylpolysiloxanes, cyclic silicones, and also amino-, fatty acid-, alcohol-, polyether-, epoxy-, fluorine-, glycoside- and/or alkyl-modified silicone compounds, which at room temperature may be in either liquid or resinous form. Linear polysiloxanes, dimethicone (Dow Corning 200 fluid, Rhodia Mirasil DM), dimethiconol, cyclic silicone fluids, cyclopentasiloxanes, volatiles (Dow Corning 345 fluid), phenyltrimethicone (Dow Corning 556 fluid). Also suitable are simethicones, which are mixtures of dimethicones having an average chain length of from 200 to 300 dimethylsiloxane units with hydrogenated silicates. A detailed survey by Todd et al. of suitable volatile silicones may in addition be found in Cosm. Toil. 91, 27 (1976).

A concentration of those silicone emulsifiers ranging from 0.1% to 20% relative to the total weight of the emulsion, and more particularly from 0.5% to 10%, is recommended to develop stable emulsions.

FORMULATION EXAMPLES (I) All Purpose Cleaner Providing Antibacterial Protection

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| Part A | Biocide | 0.001-5% | | 0.001 | 0.01 | 0.1 | 5 | 0.001 | 0.01 | 0.1 | 5 | 1 |
| | PEI (I), (II), (III), (IV) | | | 0.001 | 0.001 | 0.001 | 0.001 | 2 | 2 | 2 | 2 | 1 |
| Part B | Plurafac LF 400 | Alkoxylated Alcohol | BASF | 10.00 | 10.00 | 10.00 | 10.00 | 10.00 | 10.00 | 10.00 | 10.00 | 10.00 |
| | Hostapur SAS 60 | Sodium C14-17 Alkyl Sec Sulfonate | Clariant | 14.00 | 14.00 | 14.00 | 14.00 | 14.00 | 14.00 | 14.00 | 14.00 | 14.00 |
| | Texapon ® LS 35 | Lauryl-myristyl sulfate Na-salt | BASF | 5.00 | 5.00 | 5.00 | 5.00 | 5.00 | 5.00 | 5.00 | 5.00 | 5.00 |
| | Diethylene Glycol Monobutyl Ether | Diethylene Glycol Monobutyl Ether | Merck | 5.00 | 5.00 | 5.00 | 5.00 | 5.00 | 5.00 | 5.00 | 5.00 | 5.00 |
| Part C | Perfume and Preservative | | | qs | qs | qs | qs | qs | qs | qs | qs | qs |
| | Citric Acid | Citric Acid | Merck | ad pH 6.5 | ad pH 6.5 | ad pH 6.5 | ad pH 6.5 | ad pH 6.5 | ad pH 6.5 | ad pH 6.5 | ad pH 6.5 | ad pH 6.5 |
| | IRAGON ® Blue ABL 9 sol. 1% | Acid Blue | BASF | 0.01 | 0.01 | 0.01 | 0.01 | 0.01 | 0.01 | 0.01 | 0.01 | 0.01 |
| | Cibafast ® H Liquid | Sodium Benzotriazolyl Butylphenol Sulfonate (and) Buteth-3 (and) Tributyl Citrate | BASF | 0.05 | 0.05 | 0.05 | 0.05 | 0.05 | 0.05 | 0.05 | 0.05 | 0.05 |
| Part D | Water | Aqua | | qs to 100 | qs | qs | qs | qs | qs | qs | qs | qs |

% w/w: wt % as supplied (II) All Purpose Cleaner, Providing Strong Immediate Bactericidal and Long Lasting Effects on Treated Surface

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| Part A | Biocide | | | 0.001 | 0.01 | 0.1 | 5 | 0.001 | 0.01 | 0.1 | 5 | 1 |
| | PEI (I), (II), (III), (IV) | | | 0.001 | 0.001 | 0.001 | 0.001 | 2 | 2 | 2 | 2 | 1 |
| Part B | Tinosan ® HP 100 | Hydroxydichlorodiphenyl Ether | BASF | 0.30 | 0.30 | 0.30 | 0.30 | 0.30 | 0.30 | 0.30 | 0.30 | 0.30 |
| Part C | Texapon ® LS 35 | Lauryl-myristyl sulfate Na-salt | BASF | 10.00 | 10.00 | 10.00 | 10.00 | 10.00 | 10.00 | 10.00 | 10.00 | 10.00 |
| | Diethylene Glycol Monobutyl Ether | Diethylene Glycol Monobutyl Ether | Merck | 5.00 | 5.00 | 5.00 | 5.00 | 5.00 | 5.00 | 5.00 | 5.00 | 5.00 |
| | Glucopon ® 215 CS UP | Alkyl Polyglycoside | BASF | 3.00 | 3.00 | 3.00 | 3.00 | 3.00 | 3.00 | 3.00 | 3.00 | 3.00 |
| Part D | Perfume and Preservative | | | qs | qs | qs | qs | qs | qs | qs | qs | qs |
| | Citric Acid | Citric Acid | Merck | ad pH 3.0 | ad pH 3.0 | ad pH 3.0 | ad pH 3.0 | ad pH 3.0 | ad pH 3.0 | ad pH 3.0 | ad pH 3.0 | ad pH 3.0 |
| | Water | Aqua | | qs to 100 | qs to 100 | qs to 100 | qs to 100 | qs to 100 | qs to 100 | qs to 100 | qs to 100 | qs to 100 |

(III) All Purpose Cleaner, Providing Bactericidal and Long Lasting Effects on Treated Surfaces

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| Part A | Biocide | | | 0.001 | 0.01 | 0.1 | 5 | 0.001 | 0.01 | 0.1 | 5 | 1 |
| | PEI (I), (II), (III), (IV) | | | 0.001 | 0.001 | 0.001 | 0.001 | 2 | 2 | 2 | 2 | 1 |
| Part B | Plurafac LF 400 | Alkoxylated Alcohol | BASF | 2.00 | 2.00 | 2.00 | 2.00 | 2.00 | 2.00 | 2.00 | 2.00 | 2.00 |
| | Sodium Cumene Sulfonate | Sodium Cumene Sulfonate | Hickson Manro | 5.00 | 5.00 | 5.00 | 5.00 | 5.00 | 5.00 | 5.00 | 5.00 | 5.00 |
| | Marlon PS 65 | Sodium C13-17 Alkane Sulfonate | Sasol | 10.0 | 10.0 | 10.0 | 10.0 | 10.0 | 10.0 | 10.0 | 10.0 | 10.0 |
| Part C | Perfume and Preservative | | | q | q | q | q | q | q | q | q | q |
| | Water | Aqua | | qs to 100 | qs to 100 | qs to 100 | qs to 100 | qs to 100 | qs to 100 | qs to 100 | qs to 100 | qs to 100 |
| | Trisodium Citrate Dihydrate | Trisodium Citrate Dihydrate | Fluka | 5.00 | 5.00 | 5.00 | 5.00 | 5.00 | 5.00 | 5.00 | 5.00 | 5.00 |

(IV) All Purpose Cleaner and Disinfectant, Provides Strong Immediate Bactericidal and Long Lasting Effects on Treated Surfaces Even at Low Concentrations

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| Part A | Biocide | | | 0.001 | 0.01 | 0.1 | 5 | 0.001 | 0.01 | 0.1 | 5 | 1 |
| | PEI (I), (II), (III), (IV) | | | 0.001 | 0.001 | 0.001 | 0.001 | 2 | 2 | 2 | 2 | 1 |
| Part B | Glucopon ® 215 CS UP | Alkyl Polyglycoside | BASF | 3.00 | 3.00 | 3.00 | 3.00 | 3.00 | 3.00 | 3.00 | 3.00 | 3.00 |
| | Texapon ® LS 35 | Lauryl-myristyl sulfate Na-salt | BASF | 10.00 | 10.00 | 10.00 | 10.00 | 10.00 | 10.00 | 10.00 | 10.00 | 10.00 |
| | Sodium Cumene Sulfonate | Sodium Cumene Sulfonate | Hickson Manro | 5.00 | 5.00 | 5.00 | 5.00 | 5.00 | 5.00 | 5.00 | 5.00 | 5.00 |
| | 2-Propanol | Isopropyl Alcohol | Merck | 10.00 | 10.00 | 10.00 | 10.00 | 10.00 | 10.00 | 10.00 | 10.00 | 10.00 |
| Part C | Perfume and Preservative | | | qs | 5.00 | 5.00 | 5.00 | 5.00 | 5.00 | 5.00 | 5.00 | 5.00 |
| | Water | Aqua | | qs to 100 | qs to 100 | qs to 100 | qs to 100 | qs to 100 | qs to 100 | qs to 100 | qs to 100 | qs to 100 |
| | Trisodium Citrate Dihydrate | Trisodium Citrate Dihydrate | Fluka | 5.00 | 5.00 | 5.00 | 5.00 | 5.00 | 5.00 | 5.00 | 5.00 | 5.00 |

(V) Bactericidal all Purpose Cleaner, Providing Strong Immediate Bactericidal and Long Lasting EfFects on Treated Surfaces

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| Part A | Biocide | | | 0.001 | 0.01 | 0.1 | 5 | 0.001 | 0.01 | 0.1 | 5 | 1 |
| | PEI (I), (II), (III), (IV) | | | 0.001 | 0.001 | 0.001 | 0.001 | 2 | 2 | 2 | 2 | 1 |
| Part B | Texapon ® LS 35 | Lauryl-myristyl sulfate Na-salt | BASF | 10.00 | 10.00 | 10.00 | 10.00 | 10.00 | 10.00 | 10.00 | 10.00 | 10.00 |
| | Glucopon ® 215 CS UP | Alkyl Polyglycoside | BASF | 3.00 | 3.00 | 3.00 | 3.00 | 3.00 | 3.00 | 3.00 | 3.00 | 3.00 |
| | Sodium Cumene Sulfonate | Sodium Cumene Sulfonate | Hickson Manro | 5.00 | 5.00 | 5.00 | 5.00 | 5.00 | 5.00 | 5.00 | 5.00 | 5.00 |

-continued

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| Part C | Perfume and Preservative | | | qs | qs | qs | qs | qs | qs | qs | qs | qs |
| | Citric Acid | Citric Acid | Merck | ad pH 3 | ad pH 3 | ad pH 3 | ad pH 3 | ad pH 3 | ad pH 3 | ad pH 3 | ad pH 3 | ad pH 3 |
| | Water | Aqua | | qs to 100 | qs to 100 | qs to 100 | qs to 100 | qs to 100 | qs to 100 | qs to 100 | qs to 100 | qs to 100 |

(VI) Anti-Bacterial Fabric Softener Based on Conventional Quat

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| Part A | Biocide | | | 0.001 | 0.01 | 0.1 | 5 | 0.001 | 0.01 | 0.1 | 5 | 1 |
| | PEI (I), (II), (III), (IV) | | | 0.001 | 0.001 | 0.001 | 0.001 | 2 | 2 | 2 | 2 | 1 |
| Part B | Neodol 25-7 E | C12-15 Pareth-7 | Shell Chemicals | 0.50 | 0.50 | 0.50 | 0.50 | 0.50 | 0.50 | 0.50 | 0.50 | 0.50 |
| | Arquad 2HT-75 | Quaternium 18 (and) Isopropyl Alcohol | Akzo Nobel | 4.00 | 4.00 | 4.00 | 4.00 | 4.00 | 4.00 | 4.00 | 4.00 | 4.00 |
| Part D | Water | Aqua | | qs | qs | qs | qs | qs | qs | qs | qs | qs |
| | Perfume and Preservative | | | qs | qs | qs | qs | qs | qs | qs | qs | qs |

(VII) Anti-Bacterial Fabric Softener Based on Esterquat

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| Part A | Biocide | | | 0.001 | 0.01 | 0.1 | 5 | 0.001 | 0.01 | 0.1 | 5 | 1 |
| | PEI (I), (II), (III), (IV) | | | 0.001 | 0.001 | 0.001 | 0.001 | 2 | 2 | 2 | 2 | 1 |
| Part B | Rewoquat WE 18 | Dihydrogenated Tallowethyl Hydroxyethyla monium | Evonik | 4.00 | 0.50 | 0.50 | 0.50 | 0.50 | 0.50 | 0.50 | 0.50 | 0.50 |
| | Neodol 25-7 E | C12-15 Pareth-7 | Shell Chemicals | 0.50 | 4.00 | 4.00 | 4.00 | 4.00 | 4.00 | 4.00 | 4.00 | 4.00 |
| | Antifoam DB 31 | | Dow Corning | 0.10 | qs | qs | qs | qs | qs | qs | qs | qs |
| | Part D | Water | Aqua | qs to 100 | qs to 100 | qs to 100 | qs to 100 | qs to 100 | qs to 100 | qs to 100 | qs to 100 | qs to 100 |
| | | Perfume and Preservative | | qs | qs | qs | qs | qs | qs | qs | qs | qs |

(VIII) Antibacterial Heavy Duty Liquid Detergent

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| Part A | Biocide | | | 0.001 | 0.01 | 0.1 | 5 | 0.001 | 0.01 | 0.1 | 5 | 1 |
| | PEI (I), (II), (III), (IV) | | | 0.001 | 0.001 | 0.001 | 0.001 | 2 | 2 | 2 | 2 | 1 |
| Part B | Marlon A375 | Sodium Dodecylbenzene-sulfonate | Sasol | 15.00 | 15.00 | 15.00 | 15.00 | 15.00 | 15.00 | 15.00 | 15.00 | 15.00 |
| | Neodol 45-7 E | C14-15 Pareth-7 | Shell Chemicals | 14.00 | 14.00 | 14.00 | 14.00 | 14.00 | 14.00 | 14.00 | 14.00 | 14.00 |
| | Alcohol | SD Alcohol 39-C | Berkel | 9.00 | 9.00 | 9.00 | 9.00 | 9.00 | 9.00 | 9.00 | 9.00 | 9.00 |

-continued

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| Part C | Soap Base | Sodium Tallowate (and) Sodium Cocoate | Mettler | 10.00 | 10.00 | 10.00 | 10.00 | 10.00 | 10.00 | 10.00 | 10.00 | 10.00 |
| | Trisodium Citrate Dihydrate | Trisodium Citrate Dihydrate | Fluka | 4.00 | 4.00 | 4.00 | 4.00 | 4.00 | 4.00 | 4.00 | 4.00 | 4.00 |
| | Triethanolamine | Triethanolamine | BASF | 5.00 | 5.00 | 5.00 | 5.00 | 5.00 | 5.00 | 5.00 | 5.00 | 5.00 |
| Part D | Tinopal ® CBS-X | Fluorescent Whitening Agent (FWA) | BASF | 0.10 | 0.10 | 0.10 | 0.10 | 0.10 | 0.10 | 0.10 | 0.10 | 0.10 |
| Part E | Water | Aqua | | qs to 100 | qs to 100 | qs to 100 | qs to 100 | qs to 100 | qs to 100 | qs to 100 | qs to 100 | qs to 100 |

(IX) Anti-Bacterial Heavy Duty Liquid Detergent

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| Part A | Biocide | | | 0.001 | 0.01 | 0.1 | 5 | 0.001 | 0.01 | 0.1 | 5 | 1 |
| | PEI (I), (II), (III), (IV) | | | 0.001 | 0.001 | 0.001 | 0.001 | 2 | 2 | 2 | 2 | 1 |
| Part B | Nansa SSA/A | Dodecylbenzene Sulfonic Acid | Albright & Wilson/ Rhodia | 7.50 | 7.50 | 7.50 | 7.50 | 7.50 | 7.50 | 7.50 | 7.50 | 7.50 |
| | Edenor ® K12-18 | Coconut Fatty Acid | BASF | 12.50 | 12.50 | 12.50 | 12.50 | 12.50 | 12.50 | 12.50 | 12.50 | 12.50 |
| | Neodol 23-6, 5 E | C12-13 Pareth-7 | Shell Chemicals | 10.00 | 10.00 | 10.00 | 10.00 | 10.00 | 10.00 | 10.00 | 10.00 | 10.00 |
| | Elfan NS 243 S | Sodium Laureth Sulfate 3 EO | Akzo Nobel | 17.00 | 17.00 | 17.00 | 17.00 | 17.00 | 17.00 | 17.00 | 17.00 | 17.00 |
| Part C | 2-Propanol | Isopropyl Alcohol | Merck | 6.00 | 6.00 | 6.00 | 6.00 | 6.00 | 6.00 | 6.00 | 6.00 | 6.00 |
| | Alcohol | SD Alcohol 39-C | Berkel | 6.00 | 6.00 | 6.00 | 6.00 | 6.00 | 6.00 | 6.00 | 6.00 | 6.00 |
| | Trisodium Citrate Dihydrate | Trisodium Citrate Dihydrate | Fluka | 5.50 | 5.50 | 5.50 | 5.50 | 5.50 | 5.50 | 5.50 | 5.50 | 5.50 |
| | Sodium Hydroxide (30% solution) | Water (and) Sodium Hydroxide | Fluka | 10.70 | 10.70 | 10.70 | 10.70 | 10.70 | 10.70 | 10.70 | 10.70 | 10.70 |
| Part D | Water | Aqua | | qs to 100 | qs to 100 | qs to 100 | qs to 100 | qs to 100 | qs to 100 | qs to 100 | qs to 100 | qs to 100 |

(X) Antibacterial Liquid Laundry Detergent

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| Part A | Biocide | | | 0.001 | 0.01 | 0.1 | 5 | 0.001 | 0.01 | 0.1 | 5 | 1 |
| | PEI (I), (II), (III), (IV) | | | 0.001 | 0.001 | 0.001 | 0.001 | 2 | 2 | 2 | 2 | 1 |
| Part B | Marlon A 375 | Sodium Dodecylbenzene-sulfonate | Sasol | 8.7 | 8.7 | 8.7 | 8.7 | 8.7 | 8.7 | 8.7 | 8.7 | 8.7 |
| | Marlipal O 13/129 | Trideceth-12 | Sasol | 3.50 | 3.50 | 3.50 | 3.50 | 3.50 | 3.50 | 3.50 | 3.50 | 3.50 |
| | Penta Sodium Triphosphate | Penta Sodium Triphosphate | Fluka | 24.00 | 24.00 | 24.00 | 24.00 | 24.00 | 24.00 | 24.00 | 24.00 | 24.00 |
| | Sodium Sulfate | Sodium Sulfate | Merck | 1.20 | 1.20 | 1.20 | 1.20 | 1.20 | 1.20 | 1.20 | 1.20 | 1.20 |
| | Sodium Hydroxide (10% solution) | Water (and) Sodium Hydroxide | Fluka | 1.60 | 1.60 | 1.60 | 1.60 | 1.60 | 1.60 | 1.60 | 1.60 | 1.60 |

-continued

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| | Glycerin | Glycerin | Merck | 1.00 | 1.00 | 1.00 | 1.00 | 1.00 | 1.00 | 1.00 | 1.00 | 1.00 |
| | Oleic Acid | Oleic Acid | Fluka | 0.90 | 0.90 | 0.90 | 0.90 | 0.90 | 0.90 | 0.90 | 0.90 | 0.90 |
| | Sodium Tetraborate | Sodium Borate | Fluka | 1.80 | 1.80 | 1.80 | 1.80 | 1.80 | 1.80 | 1.80 | 1.80 | 1.80 |
| Part C | Tylose C 10000 | Cellulose Gum | Clariant | 0.40 | 0.40 | 0.40 | 0.40 | 0.40 | 0.40 | 0.40 | 0.40 | 0.40 |
| Part D | Water | Aqua | | qs to 100 | qs to 100 | qs to 100 | qs to 100 | qs to 100 | qs to 100 | qs to 100 | qs to 100 | qs to 100 |

(XI) Concentrated Anti-Bacterial Fabric Softener Based on Conventional Quat

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| Part A | Biocide | | | 0.001 | 0.01 | 0.1 | 5 | 0.001 | 0.01 | 0.1 | 5 | 1 |
| | PEI (I), (II), (III), (IV) | | | 0.001 | 0.001 | 0.001 | 0.001 | 2 | 2 | 2 | 2 | 1 |
| Part B | Genapol O 100 | Oleth-10 | Clariant | 2.00 | 2.00 | 2.00 | 2.00 | 2.00 | 2.00 | 2.00 | 2.00 | 2.00 |
| | Arquad 2HT-75 | Quatemium 18 (and) Isopropyl Alcohol | Akzo Nobel | 15.00 | 15.00 | 15.00 | 15.00 | 15.00 | 15.00 | 15.00 | 15.00 | 15.00 |
| Part C | 2-Propanol | Isopropyl Alcohol | Merck | 3.00 | 3.00 | 3.00 | 3.00 | 3.00 | 3.00 | 3.00 | 3.00 | 3.00 |
| | Magnesium Chloride saturated solution | Magnesium Chloride | | 1.00 | 1.00 | 1.00 | 1.00 | 1.00 | 1.00 | 1.00 | 1.00 | 1.00 |
| Part D | Water | Aqua | | qs to 100 | qs to 100 | qs to 100 | qs to 100 | qs to 100 | qs to 100 | qs to 100 | qs to 100 | qs to 100 |
| | Perfume and Preservative | | | qs | qs | qs | qs | qs | qs | qs | qs | qs |

(XII) Concentrated Anti-Bacterial Fabric Softener Based on Esterquat

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| Part A | Biocide | | | 0.001 | 0.01 | 0.1 | 5 | 0.001 | 0.01 | 0.1 | 5 | 1 |
| | PEI (I), (II), (III), (IV) | | | 0.001 | 0.001 | 0.001 | 0.001 | 2 | 2 | 2 | 2 | 1 |
| Part B | RewoquatWE 18 | Dihydrogenated Tallowethyl Hydroxyethyl amonium | Evonik | 15.00 | 15.00 | 15.00 | 15.00 | 15.00 | 15.00 | 15.00 | 15.00 | 15.00 |
| | Genapol O 100 | Oleth-10 | Clariant | 2.00 | 2.00 | 2.00 | 2.00 | 2.00 | 2.00 | 2.00 | 2.00 | 2.00 |
| Part C | Antifoam DB 31 | | Dow Corning | 0.50 | 0.50 | 0.50 | 0.50 | 0.50 | 0.50 | 0.50 | 0.50 | 0.50 |
| | 2-Propanol | Isopropyl Alcohol | Merck | 3.00 | 3.00 | 3.00 | 3.00 | 3.00 | 3.00 | 3.00 | 3.00 | 3.00 |
| | Magnesium Chloride | Magnesium Chloride saturated solution | | 1.00 | 1.00 | 1.00 | 1.00 | 1.00 | 1.00 | 1.00 | 1.00 | 1.00 |
| Part D | Water | Aqua | | qs to 100 | qs to 100 | qs to 100 | qs to 100 | qs to 100 | qs to 100 | qs to 100 | qs to 100 | qs to 100 |
| | Perfume and Preservative | | | qs | qs | qs | qs | qs | qs | qs | qs | qs |

(XIII) Antibacterial Surface Disinfectant Spray, Providing Strong Immediate BacteRicidal and Long Lasting Effects on Treated Surfaces

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| Part A | Biocide | | | 0.001 | 0.01 | 0.1 | 5 | 0.001 | 0.01 | 0.1 | 5 | 1 |
| | PEI (I), (II), (III), (IV) | | | 0.001 | 0.001 | 0.001 | 0.001 | 2 | 2 | 2 | 2 | 1 |
| Part B | 2-Propanol | Isopropyl Alcohol | Merck | 10.00 | 10.00 | 10.00 | 10.00 | 10.00 | 10.00 | 10.00 | 10.00 | 10.00 |
| | Texapon ® K12 | Sodium Lauryl Sulfate | BASF | 1.00 | 1.00 | 1.00 | 1.00 | 1.00 | 1.00 | 1.00 | 1.00 | 1.00 |
| | Citric Acid | Citric Acid | Merck | 3.00 | 3.00 | 3.00 | 3.00 | 3.00 | 3.00 | 3.00 | 3.00 | 3.00 |
| | Preservative | | | qs | qs | qs | qs | qs | qs | qs | qs | qs |
| Part C | Sodium Hydroxide (10% solution) | Water (and) Sodium Hydroxide | Fluka | ad pH 5.0 | ad pH 5.0 | ad pH 5.0 | ad pH 5.0 | ad pH 5.0 | ad pH 5.0 | ad pH 5.0 | ad pH 5.0 | ad pH 5.0 |
| Part D | Water | Aqua | | qs to 100 | qs to 100 | qs to 100 | qs to 100 | qs to 100 | qs to 100 | qs to 100 | qs to 100 | qs to 100 |

(XIV) Surface Disinfectant Wet Wipes, Providing Strong Immediate Bactericidal and Long Lasting Effects on Treated Surfaces

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| Part A | Biocide | | | 0.001 | 0.01 | 0.1 | 5 | 0.001 | 0.01 | 0.1 | 5 | 1 |
| | PEI (I), (II), (III), (IV) | | | 0.001 | 0.001 | 0.001 | 0.001 | 2 | 2 | 2 | 2 | 1 |
| Part B | Dowanol DPM | PPG-2 Methyl Ether | Dow Chemical | 1000 | 10.00 | 10.00 | 10.00 | 10.00 | 10.00 | 10.00 | 10.00 | 10.00 |
| | Texapon ® K12 | Sodium Lauryl Sulfate | BASF | 1.00 | 1.00 | 1.00 | 1.00 | 1.00 | 1.00 | 1.00 | 1.00 | 1.00 |
| | Citric Acid | Citric Acid | Merck | 3.00 | 3.00 | 3.00 | 3.00 | 3.00 | 3.00 | 3.00 | 3.00 | 3.00 |
| | Preservative | | | qs | qs | qs | qs | qs | qs | qs | qs | qs |
| Part C | Sodium Hydroxide (10% Sodium solution) | Water (and) Hydroxide | Fluka | ad pH 5.0 | ad pH 5.0 | ad pH 5.0 | ad pH 5.0 | ad pH 5.0 | ad pH 5.0 | ad pH 5.0 | ad pH 5.0 | ad pH 5.0 |
| Water | Aqua | | | qs | qs | qs | qs | qs | qs | qs | qs | qs |

(XV) Surface Disinfectant Spray, Providing Strong Immediate Bactericidal and Long Lasting Effects on Treated Surfaces

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| Part A | Biocide | | | 0.001 | 0.01 | 0.1 | 5 | 0.001 | 0.01 | 0.1 | 5 | 1 |
| | PEI (I), (II), (III), (IV) | | | 0.001 | 0.001 | 0.001 | 0.001 | 2 | 2 | 2 | 2 | 1 |
| Part B | Glucopon ® 215 CS UP | Alkyl Polyglycoside | BASF | 3.50 | 3.50 | 3.50 | 3.50 | 3.50 | 3.50 | 3.50 | 3.50 | 3.50 |
| | Dehydol ® 04 Deo | Capryleth-4 | BASF | 1.70 | 1.70 | 1.70 | 1.70 | 1.70 | 1.70 | 1.70 | 1.70 | 1.70 |
| Part C | Perfume and Preservative | | | qs | qs | qs | qs | qs | qs | qs | qs | qs |
| | Acetic Acid conc. | Acetic Acid | Fluka | 2.40 | 2.40 | 2.40 | 2.40 | 2.40 | 2.40 | 2.40 | 2.40 | 2.40 |
| | Water | Aqua | | qs to 100 | qs to 100 | qs to 100 | qs to 100 | qs to 100 | qs to 100 | qs to 100 | qs to 100 | qs to 100 |
| | Citric Acid | Citric Acid | Merck | 9.00 | 9.00 | 9.00 | 9.00 | 9.00 | 9.00 | 9.00 | 9.00 | 9.00 |

(XVI) Surface Disinfectant Spray, Providing Strong Immediate Bactericidal and Long Lasting Effects on Treated Surfaces

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| Part A | Biocide | | | 0.001 | 0.01 | 0.1 | 5 | 0.001 | 0.01 | 0.1 | 5 | 1 |
| | PEI (I), (II), (III), (IV) | | | 0.001 | 0.001 | 0.001 | 0.001 | 2 | 2 | 2 | 2 | 1 |
| Part B | Glucopon ® 215 CS UP | Alkyl Polyglycoside | BASF | 3.50 | 3.50 | 3.50 | 3.50 | 3.50 | 3.50 | 3.50 | 3.50 | 3.50 |
| | Dehydol ® 04 Deo | Capryleth-4 | BASF | 1.70 | 1.70 | 1.70 | 1.70 | 1.70 | 1.70 | 1.70 | 1.70 | 1.70 |
| | Sodium Cumene Sulfonate | Sodium Cumene Sulfonate | Hickson Manro | 5.00 | 5.00 | 5.00 | 5.00 | 5.00 | 5.00 | 5.00 | 5.00 | 5.00 |
| Part C | Perfume and Preservative | | | qs | qs | qs | qs | qs | qs | qs | qs | qs |
| | Citric Acid | Citric Acid | Merck | ad pH 3.0 | ad pH 3.0 | ad pH 3.0 | ad pH 3.0 | ad pH 3.0 | ad pH 3.0 | ad pH 3.0 | ad pH 3.0 | ad pH 3.0 |
| | Water | Aqua | | qs to 100 | qs to 100 | qs to 100 | qs to 100 | qs to 100 | qs to 100 | qs to 100 | qs to 100 | qs to 100 |

(XVII) Surface Disinfectant Spray, Providing Strong Immediate Bactericidal and Long Lasting Effects on Treated Surfaces

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| Part A | Biocide | | | 0.001 | 0.01 | 0.1 | 5 | 0.001 | 0.01 | 0.1 | 5 | 1 |
| | PEI (I), (II), (III), (IV) | | | 0.001 | 0.001 | 0.001 | 0.001 | 2 | 2 | 2 | 2 | 1 |
| Part B | Texapon ® K12 | Sodium Lauryl Sulfate | BASF | 1.00 | 1.00 | 1.00 | 1.00 | 1.00 | 1.00 | 1.00 | 1.00 | 1.00 |
| | Citric Acid | Citric Acid | Merck | 3.00 | 3.00 | 3.00 | 3.00 | 3.00 | 3.00 | 3.00 | 3.00 | 3.00 |
| | Preservative | | | qs | qs | qs | qs | qs | qs | qs | qs | qs |
| | Dowanol DPM | PPG-2 Methyl Ether | Dow Chemical | 1000 | 10.00 | 10.00 | 10.00 | 10.00 | 10.00 | 10.00 | 10.00 | 10.00 |
| Part C | Sodium Hydroxide (10% solution) | Water (and) Sodium Hydroxide | Fluka | ad pH 5.0 | ad pH 5.0 | ad pH 5.0 | ad pH 5.0 | ad pH 5.0 | ad pH 5.0 | ad pH 5.0 | ad pH 5.0 | ad pH 5.0 |

(XVIII) Surface Disinfectant Spray, Providing Strong Immediate Bactericidal and Long Lasting Effects on Treated Surfaces.

Formulation can be diluted: 1 part to 9 parts of water

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| Part A | Biocide | | | 0.001 | 0.01 | 0.1 | 5 | 0.001 | 0.01 | 0.1 | 5 | 1 |
| | PEI (I), (II), (III), (IV) | | | 0.001 | 0.001 | 0.001 | 0.001 | 2 | 2 | 2 | 2 | 1 |
| Part B | Texapon ® K12 | Sodium Lauryl Sulfate | BASF | 2.00 | 2.00 | 2.00 | 2.00 | 2.00 | 2.00 | 2.00 | 2.00 | 2.00 |
| | 1-Propanol | Propyl Alcohol | Merck | 10.00 | 10.00 | 10.00 | 10.00 | 10.00 | 10.00 | 10.00 | 10.00 | 10.00 |
| Part C | Hydrogen Peroxide 30% | Hydrogen Peroxide | Merck | 10.00 | 10.00 | 10.00 | 10.00 | 10.00 | 10.00 | 10.00 | 10.00 | 10.00 |
| Part D | Citric Acid sol. 20% | Citric Acid | Merck | ad pH 3.0 | ad pH 3.0 | ad pH 3.0 | ad pH 3.0 | ad pH 3.0 | ad pH 3.0 | ad pH 3.0 | ad pH 3.0 | ad pH 3.0 |
| | Preservative | | | qs | qs | qs | qs | qs | qs | qs | qs | qs |
| Part E | Water | Aqua | | qs to 100 | qs to 100 | qs to 100 | qs to 100 | qs to 100 | qs to 100 | qs to 100 | qs to 100 | qs to 100 |

(XIX) Surface Disinfectant Spray, Providing Immediate Bactericidal and Long LastIng Effects on Treated Surfaces

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| Part A | Biocide | | | 0.001 | 0.01 | 0.1 | 5 | 0.001 | 0.01 | 0.1 | 5 | 1 |
| | PEI (I), (II), (III), (IV) | | | 0.001 | 0.001 | 0.001 | 0.001 | 2 | 2 | 2 | 2 | 1 |
| Part B | 2-Propanol | Isopropyl Alcohol | Merck | 10.00 | 10.00 | 10.00 | 10.00 | 10.00 | 10.00 | 10.00 | 10.00 | 10.00 |
| | Glucopon ® 215 CS UP | Alkyl Polyglycoside | BASF | 2.00 | 2.00 | 2.00 | 2.00 | 2.00 | 2.00 | 2.00 | 2.00 | 2.00 |
| Part C | Perfume and Preservative | | | qs | qs | qs | qs | qs | qs | qs | qs | qs |
| | Water | Aqua | | qs to 100 | qs to 100 | qs to 100 | qs to 100 | qs to 100 | qs to 100 | qs to 100 | qs to 100 | qs to 100 |
| | Citric Acid | Citric Acid | Merck | 1.00 | 1.00 | 1.00 | 1.00 | 1.00 | 1.00 | 1.00 | 1.00 | 1.00 |
| | Sodium Hydroxide (10% solution) | Water (and) Sodium Hydroxide | Fluka | ad pH 5.0 | ad pH 5.0 | ad pH 5.0 | ad pH 5.0 | ad pH 5.0 | ad pH 5.0 | ad pH 5.0 | ad pH 5.0 | ad pH 5.0 |

(XX) Surface Disinfectant Wet Wipes, Providing Immediate Bactericidal and Long Lasting Effects on Treated Surfaces

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| Part A | Biocide | | | 0.001 | 0.01 | 0.1 | 5 | 0.001 | 0.01 | 0.1 | 5 | 1 |
| | PEI (I), (II), (Ill), (IV) | | | 0.001 | 0.001 | 0.001 | 0.001 | 2 | 2 | 2 | 2 | 1 |
| Part B | 2-Propanol | Isopropyl Alcohol | Merck | 10.00 | 10.00 | 10.00 | 10.00 | 10.00 | 10.00 | 10.00 | 10.00 | 10.00 |
| | Glucopon ® 215 CS UP | Alkyl Polyglycoside | BASF | 2.00 | 2.00 | 2.00 | 2.00 | 2.00 | 2.00 | 2.00 | 2.00 | 2.00 |
| Part C | Perfume and Preservative | | | qs | qs | qs | qs | qs | qs | qs | qs | qs |
| | Water | Aqua | | qs to 100 | qs to 100 | qs to 100 | qs to 100 | qs to 100 | qs to 100 | qs to 100 | qs to 100 | qs to 100 |
| | Citric Acid | Citric Acid | Merck | 1.00 | 1.00 | 1.00 | 1.00 | 1.00 | 1.00 | 1.00 | 1.00 | 1.00 |
| | Sodium Hydroxide (10% solution) | Water (and) Sodium Hydroxide | Fluka | ad pH 5.0 | ad pH 5.0 | ad pH 5.0 | ad pH 5.0 | ad pH 5.0 | ad pH 5.0 | ad pH 5.0 | ad pH 5.0 | ad pH 5.0 |

(XXI) Antibacterial Window Cleaner, Providing Immediate Bactericidal and Long Lasting Effects on Treated Surfaces

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| Part A | Biocide | | | 0.001 | 0.01 | 0.1 | 5 | 0.001 | 0.01 | 0.1 | 5 | 1 |
| | PEI (I), (II), (III), (IV) | | | 0.001 | 0.001 | 0.001 | 0.001 | 2 | 2 | 2 | 2 | 1 |
| Part B | 2-Propanol | Isopropyl Alcohol | Merck | 10.00 | 10.00 | 10.00 | 10.00 | 10.00 | 10.00 | 10.00 | 10.00 | 10.00 |
| | Glucopon ® 215 CS UP | Alkyl Polyglycoside | BASF | 2.00 | 2.00 | 2.00 | 2.00 | 2.00 | 2.00 | 2.00 | 2.00 | 2.00 |
| Part C | Perfume and Preservative | | | qs | qs | qs | qs | qs | qs | qs | qs | qs |
| | Water | Aqua | | qs to 100 | qs to 100 | qs to 100 | qs to 100 | qs to 100 | qs to 100 | qs to 100 | qs to 100 | qs to 100 |
| | Citric Acid | Citric Acid | Merck | 1.00 | 1.00 | 1.00 | 1.00 | 1.00 | 1.00 | 1.00 | 1.00 | 1.00 |
| | Sodium Hydroxide (10% solution) | Water (and) Sodium Hydroxide | Fluka | ad pH 5.0 | ad pH 5.0 | ad pH 5.0 | ad pH 5.0 | ad pH 5.0 | ad pH 5.0 | ad pH 5.0 | ad pH 5.0 | ad pH 5.0 |

(XXII) Bactericidal Dishwashing Liquid, Providing Strong Bactericidal and Long Lasting Antibacterial Protection of Dishwashing Utensils

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| Part A | Biocide | | | 0.001 | 0.01 | 0.1 | 5 | 0.001 | 0.01 | 0.1 | 5 | 1 |
| | PEI (I), (II), (III), (IV) | | | 0.001 | 0.001 | 0.001 | 0.001 | 2 | 2 | 2 | 2 | 1 |
| Part B | Marlon A 375 | Sodium Dodecyl benzenesulfonate | Sasol | 7.00 | 7.00 | 7.00 | 7.00 | 7.00 | 7.00 | 7.00 | 7.00 | 7.00 |
| | Sodium Cumene Sulfonate | Sodium Cumene Sulfonate | Hickson Manro | 5.00 | 5.00 | 5.00 | 5.00 | 5.00 | 5.00 | 5.00 | 5.00 | 5.00 |
| Part C | Citric Acid | Citric Acid | Merck | 3.00 | 3.00 | 3.00 | 3.00 | 3.00 | 3.00 | 3.00 | 3.00 | 3.00 |
| | Benzoic Acid | Benzoic Acid | Merck | 0.50 | 0.50 | 0.50 | 0.50 | 0.50 | 0.50 | 0.50 | 0.50 | 0.50 |
| | Sodium Chloride | Sodium Chloride | Fluka | 1.00 | 1.00 | 1.00 | 1.00 | 1.00 | 1.00 | 1.00 | 1.00 | 1.00 |
| | Sodium Sulfate | Sodium Sulfate | Merck | 3.50 | 3.50 | 3.50 | 3.50 | 3.50 | 3.50 | 3.50 | 3.50 | 3.50 |
| | Sodium Hydroxide (30% solution) | Water (and) Sodium Hydroxide | Fluka | ad pH 5.0 | ad pH 5.0 | ad pH 5.0 | ad pH 5.0 | ad pH 5.0 | ad pH 5.0 | ad pH 5.0 | ad pH 5.0 | ad pH 5.0 |
| Part D | Water | Aqua | | qs | qs | qs | qs | qs | qs | qs | qs | qs |

(XVII) High Foaming and Mild Dishwashing Liquid, Providing Strong Bactericidal and Long Lasting Antibacterial Protection of Dishwashing Utensils and Sponges

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| Part A | Biocide | | | 0.001 | 0.01 | 0.1 | 5 | 0.001 | 0.01 | 0.1 | 5 | 1 |
| | PEI (I), (II), (III), (IV) | | | 0.001 | 0.001 | 0.001 | 0.001 | 2 | 2 | 2 | 2 | 1 |
| Part B | Texapon ® LS 35 | Lauryl-myristyl sulfate Na-salt | BASF | 7.00 | 7.00 | 7.00 | 7.00 | 7.00 | 7.00 | 7.00 | 7.00 | 7.00 |
| | Texapon ® K14 Special | Sodium Myreth Sulfate | BASF | 7.00 | 7.00 | 7.00 | 7.00 | 7.00 | 7.00 | 7.00 | 7.00 | 7.00 |
| | Plantacare ® 1200 UP | Lauryl Glucoside | BASF | 4.00 | 4.00 | 4.00 | 4.00 | 4.00 | 4.00 | 4.00 | 4.00 | 4.00 |
| | Dehyton ® AB 30 | Coco Betaine | BASF | 1.1 | 1.1 | 1.1 | 1.1 | 1.1 | 1.1 | 1.1 | 1.1 | 1.1 |
| | Alcohol | SD Alcohol 39-C | Berkel | 5.00 | 5.00 | 5.00 | 5.00 | 5.00 | 5.00 | 5.00 | 5.00 | 5.00 |
| Part C | Sodium Chloride | Sodium Chloride | Fluka | 1.00 | 1.00 | 1.00 | 1.00 | 1.00 | 1.00 | 1.00 | 1.00 | 1.00 |
| Part D | Citric Acid | Citric Acid | Merck | ad pH 6.5 | ad pH 6.5 | ad pH 6.5 | ad pH 6.5 | ad pH 6.5 | ad pH 6.5 | ad pH 6.5 | ad pH 6.5 | ad pH 6.5 |
| | Preservative | | | qs | qs | qs | qs | qs | qs | qs | qs | qs |
| | Water | Aqua | | qs | qs | qs | qs | qs | qs | qs | qs | qs |

(XXIII) Disinfectant Toilet Cleaner, Providing Strong Immediate Bactericidal and Long Lasting Effects on Treated Surfaces

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| Part A | Biocide | | | 0.001 | 0.01 | 0.1 | 5 | 0.001 | 0.01 | 0.1 | 5 | 1 |
| | PEI (I), (II), (III), (IV) | | | 0.001 | 0.001 | 0.001 | 0.001 | 2 | 2 | 2 | 2 | 1 |
| | Glucopon ® 215 CS UP | Alkyl Poly glycoside | BASF | 3.50 | 3.50 | 3.50 | 3.50 | 3.50 | 3.50 | 3.50 | 3.50 | 3.50 |
| | Neodol 91-8E | 9-11 pareth-8 | Caldic | 1.70 | 1.70 | 1.70 | 1.70 | 1.70 | 1.70 | 1.70 | 1.70 | 1.70 |
| Part B | RHEOVIS ® CSP | Cationic Polymer | BASF | 1.30 | 1.30 | 1.30 | 1.30 | 1.30 | 1.30 | 1.30 | 1.30 | 1.30 |

-continued

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| Part C | Acetic Acid conc. | Acetic Acid | Fluka | 2.40 | 2.40 | 2.40 | 2.40 | 2.40 | 2.40 | 2.40 | 2.40 | 2.40 |
| | Citric Acid | Citric Acid | Merck | 9.00 | 9.00 | 9.00 | 9.00 | 9.00 | 9.00 | 9.00 | 9.00 | 9.00 |
| PartD | IRAGON ® Blue ABL80 sol. 1% | Acid blue 80 | BASF | 0.50 | 0.50 | 0.50 | 0.50 | 0.50 | 0.50 | 0.50 | 0.50 | 0.50 |
| | Water | Aqua | | qs to 100 | qs to 100 | qs to 100 | qs to 100 | qs to 100 | qs to 100 | qs to 100 | qs to 100 | qs to 100 |

(XXIV) Shoe Deodorant (Alcohol Based Spray Formulation)

| | Trade name | INCI Name/ Chemical name | Supplyer | % w/w | % w/w | % w/w | % w/w | % w/w | % w/w | % w/w | % w/w | % w/w |
|---|---|---|---|---|---|---|---|---|---|---|---|---|
| Part A | Biocide | | | 0.001 | 0.01 | 0.1 | 5 | 0.001 | 0.01 | 0.1 | 5 | 1 |
| | PEI (I), (II), (III), (IV) | | | 0.001 | 0.001 | 0.001 | 0.001 | 2 | 2 | 2 | 2 | 1 |
| Part B | Ethanol absolut. | Alcohol | Riedel | 20.00 | 20.00 | 20.00 | 20.00 | 20.00 | 20.00 | 20.00 | 20.00 | 20.00 |
| | Propylene Glycol | Propylene Glycol | BASF | 20.00 | 20.00 | 20.00 | 20.00 | 20.00 | 20.00 | 20.00 | 20.00 | 20.00 |
| | Marlipal 24/99 | Laureth-9 | Sasol | 1.00 | 1.00 | 1.00 | 1.00 | 1.00 | 1.00 | 1.00 | 1.00 | 1.00 |
| | Glycerin | Glycerin | Merck | 1.00 | 1.00 | 1.00 | 1.00 | 1.00 | 1.00 | 1.00 | 1.00 | 1.00 |
| | Perfume | | | qs | qs | qs | qs | qs | qs | qs | qs | qs |
| Part C | Water | Aqua | | qs to 100 | qs to 100 | qs to 100 | qs to 100 | qs to 100 | qs to 100 | qs to 100 | qs to 100 | qs to 100 |

Biocides used in each of the above formulations (I) to (XXIV) are: Bronopol, Phenoxyethanol, Glutaraldehyde, Formic Acid, Glyoxal, 2,4-Dichlorobenzylalcohol, Dazomet (3,5-Dimetyl-1,3-5-thiadiazinane-2-thione), 1,3,5-Tris-(2-hydroxyethyl)-1,3,5-hexahydrotriaxine, Cybutryne (2-Methylthio-4-tert-butylamino cyclopropylamino-6-(1,3,5-triazine)), Irgaguard ® B5000, Irgaguard ® B6000, Irgaguard ® B7000, Triclosan, 4,4'-Dichloro 2'-hydroxydiphenylether (Diclosan, a.i. of Tinosan ®HP 100).

The following examples illustrate the invention. Wherever noted, room temperature (r.t.) depicts a temperature from the range 22-25° C.; over night means a period of 12 to 15 hours; percentages are given by weight, if not indicated otherwise.

Abbreviations

HPLC high pressure liquid chromatography

Mw molecular weight (usually as detected by GPC)

GPC gel permeation chromatography

DSC differential scanning calorimetry

NMR nuclear magnetic resonance a.i. active ingredient

Example 1

Microbiological data demonstrating synergistic efficacy of biocides (reduction of the number of viable cells expressed as common logarythm (log redn.)) in combinations with Polyethylenimines are summarized in the following tables. Lines in grey shading indicate control sample (no PEI or no biocide added):

TABLE 1

Examples for synergistic bactericidal effects of biocides in combination with Polyethylenimines. The bactericidal activities are determined according to to method EN1040 against *Pseudomonas aeruginosa* ATCC 15442.

| Conc. of PEI | | Conc. of Biocide | | log redn. after Contact time | | | |
|---|---|---|---|---|---|---|---|
| PEI | [ppm a.i.] | Biocide | [% a.i.] | 1 hr | 3 hrs | 6 hrs | 24 hrs |
| Lupasol ® FG | 100 | | | 2.3 | 3.2 | 4.1 | >6 |
| | | Phenoxyethanol | 1 | <1 | 1.3 | 2.8 | >6 |
| Lupasol ® FG | 100 | Phenoxyethanol | 1 | >5 | >5 | >5 | >5 |
| PEI (II) | 50 | | | 3.5 | 4.4 | >5 | >6 |
| | | Phenoxyethanol | 1 | <1 | 1.3 | 2.8 | >6 |
| PEI (II) | 50 | Phenoxyethanol | 1 | >5 | >5 | >5 | >5 |
| Lupasol ® WF | 50 | | | >5 | 5.0 | 5 | >5 |
| | | Phenoxyethanol | 1 | <1 | 1.3 | 2.8 | >6 |
| Lupasol ® WF | 50 | Phenoxyethanol | 1 | >5 | 5.0 | 5.0 | >5 |
| PEI (IV) | 80 | | | <1 | <1 | <1 | >1 |
| | | Phenoxyethanol | 1 | <1 | 1.3 | 2.8 | >6 |
| PEI (IV) | 80 | Phenoxyethanol | 1 | >5 | >5 | >5 | >5 |
| PEI (IV) | 80 | | | <1 | <1 | <1 | >6 |
| | | Bronopol | 0.1 | <1 | <1 | 4.2 | 2.4 |
| PEI (IV) | 80 | Bronopol | 0.1 | <1 | 1.7 | >5 | >5 |

TABLE 2

Examples for synergistic bactericidal effects of biocides in combination with Polyethylenimines. The bactericidal activities are determined according to to method EN1040 against *Staphylococcus aureus* ATCC 6538.

| Conc. of PEI | | Conc. of Biocide | | log redn. after Contact time | | | |
|---|---|---|---|---|---|---|---|
| PEI | [ppm a.i.] | Biocide | [% a.i.] | 1 hr | 3 hrs | 6 hrs | 24 hrs |
| Lupasol ® FG | 100 | | | <1 | 1.2 | 1.2 | 2.3 |
| | | Phenoxyethanol | 1 | <1 | <1 | <1 | 1.1 |
| Lupasol ® FG | 100 | Phenoxyethanol | 1 | 1.0 | 1.7 | 4.5 | >5 |
| PEI (II) | 50 | | | 1.3 | 2.1 | 1.9 | 4.4 |
| | | Phenoxyethanol | 1 | <1 | <1 | <1 | 1.1 |
| PEI (II) | 50 | Phenoxyethanol | 1 | 1.3 | 4.4 | >5 | >5 |
| Lupasol ® WF | 50 | | | <1 | 2.1 | 3.1 | >5 |
| | | Phenoxyethanol | 1 | <1 | <1 | <1 | 1.1 |
| Lupasol ® WF | 50 | Phenoxyethanol | 1 | >5 | >5 | >5 | >5 |
| PEI (IV) | 50 | | | <1 | <1 | <1 | <1 |
| | | Phenoxyethanol | 1 | <1 | <1 | <1 | 1.1 |
| PEI (IV) | 50 | Phenoxyethanol | 1 | <1 | <1 | <1 | 4.2 |
| PEI (IV) | 80 | | | <1 | <1 | <1 | >1 |
| | | Bronopol | 0.1 | <1 | <1 | <1 | 2.4 |
| PEI (IV) | 80 | Bronopol | 0.1 | <1 | <1 | <1 | >5 |

TABLE 3

Boosting efficacy of Polyethylenimines and Tinosan ® HP 100. The bactericidal activities are determined according to to method EN1276 against *Staphylococcus aureus* ATCC 6538.

| Conc. of PEI | | Conc. of Biocide | | log redn. after Contact time |
|---|---|---|---|---|
| PEI | [ppm a.i.] | Biocide | [ppm a.i.] | 5 min |
| | | Tinosan ® HP 100 | 250 | 4.9 |
| Lupasol ® FG | 100 | Tinosan ® HP 100 | 250 | 5.1 |
| Lupasol ®FG | 1000 | Tinosan ® HP 100 | 250 | 5.4 |

An independent study (control) shows that 1000 ppm (a.i.) Lupasol® FG alone has no bactericidal activity at a contact time of 5 minutes (<1 log reduction) against *S. aureus* ATCC 6538.

Example 2

Preservation Challenge Test according to the test method for topical products described in Eur. Pharm. edition 7.1 against several typical bacterial or fungal spoilage microorganisms. A surfactant formulation (45% Cocoamidopropyl betaine in water) is preserved with 0.5% phenoxyethanol alone or in combination with 0.1% polyethyleneimine (referring to active ingredient).

Samples are inoculated with 1.5 to 3.5x105 cfu/ml as indicated in Table 5 below. After 7 days of incubation at 20° C., samples are taken and the total viable count is determined. Log reductions are calculated with reference to the initial germ load. The results show that the combination of phenoxyethanol with polyethylenimines perform better with regard to antimicrobial activity than phenoxyethanol alone. Table 4 shows the composition of formulations, Table 5 shows antimicrobial efficacies (log red.) after 7 d of contact time.

TABLE 4

| Formulations | | | | |
|---|---|---|---|---|
| Ingredient | Sample 25 (comparison) | Sample 26 (invention) | Sample 27 (invention) | Sample 28 (invention) |
| surfactant | | | | |
| formulation | 11.11% | 11.11% | 11.11% | 11.11% |
| phenoxyethanol | 0.5% | 0.5% | 0.5% | 0.5% |
| Lupasol ® WF | — | 0.1% | — | — |
| Lupasol ® FG | — | — | 0.1% | — |
| PEI (IV) | — | — | — | 0.1% |
| Water | to 100 % | to 100% | to 100% | to 100% |

pH is adjusted to 7 by addition of citric acid and/or NaOH.

TABLE 5

Antimicrobial effect (log red.) after 7 days of contact time

| Test organism | Initial germ load [cfu/ml] | Sample 25 (comp.) | Sample 26 (invention) | Sample 27 (invention) | Sample 28 (inven-tion) |
|---|---|---|---|---|---|
| *P. aeruginosa* ATCC 9027 | 2.5 x $10^5$ | ≤1 | ≥3 | ≥3 | ≤3 |
| *S. aureus* ATCC 6538 | 1.9 x $10^5$ | ≥3 | 5 | 5 | 3 |
| *C. albicans* ATCC 10231 | 3.4 x $10^5$ | ≥4 | 6 | 6 | 6 |

Example 3: Bactericidal Effect

Bactericidal activities are determined according to method EN1040 against *Staphylococcus aureus* ATCC 6538, *Pseudomonas aeruginosa* ATCC 15442 and *Escherichia coli* ATCC 10536. Suspensions adjusted to pH 4, pH 7 and pH 9 by addition of citric acid and/or NaOH are used. Bactericidal efficacies are given in the following tables as log reduction calculated from total viable counts compared to the water control. The microbicidal activities are determined after the following contact times: 5 minutes, 15 minutes, 30 minutes, 60 minutes, 3 hours, 6 hours and 24 hours. Effects (log red.) by bactericide alone, polyethylenimine alone, and by the combination of bactericide and polyethylenimine are compiled in Tables 6 (Lupasol® FG), Table 7 (Lupasol® WF) and Table 8 (PEI (IV)).

TABLE 6

Bactericidal effect on *Staphylococcus aureus* (S), *Pseudomonas aeruginosa* (P) and *Escherichia coli* (E) by combination of biocide with Lupasol ® FG

| Biocide | Active Conc. [ppm] | log redn. Biocide alone (comparison) | log redn. at Polymer Active Concentration Lupasol ® FG [1000 ppm] | [100 ppm] | [10 ppm] |
|---|---|---|---|---|---|
| 5-chloro-2-(4-chlorophenoxy) phenol | 10000 | | | | |
| | 1000 | | | | |
| | 100 | | | | |
| | 10 | | | | |
| | 1 | | | | |
| | 0.1 | | | | |

TABLE 6-continued

Bactericidal effect on *Staphylococcus aureus* (S), *Pseudomonas aeruginosa* (P) and *Escherichia coli* (E) by combination of biocide with Lupasol ® FG

| Biocide | Active Conc. [ppm] | log redn. Biocide alone (comparison) | log redn. at Polymer Active Concentration Lupasol ® FG [1000 ppm] | [100 ppm] | [10 ppm] |
|---|---|---|---|---|---|
| 2, 4, 4'-trichloro-2' hydroxyl-diphenylether | 10000 | | | | |
| | 1000 | | | | |
| | 100 | | | | |
| | 10 | | | | |
| | 1 | | | | |
| | 0.1 | | | | |
| 1,5-pentanedial | 10000 | | | | |
| | 5000 | | | | |
| | 2500 | | | | |
| | 500 | | | | |
| | 50 | | | | |
| | 5 | | | | |
| 1,2-ethanedial | 200000 | | | | |
| | 100000 | | | | |
| | 20000 | | | | |
| | 4000 | | | | |
| | 2000 | | | | |
| | 400 | | | | |
| formic acid | 20000 | | | | |
| | 16000 | | | | |
| | 8000 | | | | |
| | 4000 | | | | |
| | 1000 | | | | |
| | 500 | | | | |
| 2-bromo-2-nitropropane-1,3-diol | 10000 | | | | |
| | 5000 | | | | |
| | 1000 | | | | |
| | 500 | | | | |
| | 100 | | | | |
| | 50 | | | | |
| 2-phenoxy-1-ethanol | 10000 | | | | |
| | 5000 | | | | |
| | 1000 | | | | |
| | 500 | | | | |
| | 100 | | | | |
| | 50 | | | | |
| | | Polymer (comp.) | | | |

TABLE 7

Bactericidal effect (log redn.) on *Staphylococcus aureus* (S), *Pseudomonas aeruginosa* (P) and *Escherichia coli* (E) by combination of biocide with Lupasol ® WF

| Biocide | Active Conc. [ppm] | Biocide alone (comparison) | Polymer Active Concentration Lupasol ® FG [1000 ppm] | [100 ppm] | [10 ppm] |
|---|---|---|---|---|---|
| 5-chloro-2-(4-chlorophenoxy) phenol | 10000 | | | | |
| | 1000 | | | | |
| | 100 | | | | |
| | 10 | | | | |
| | 1 | | | | |
| | 0.1 | | | | |
| 2, 4, 4'-trichloro-2' hydroxyl-diphenylether | 10000 | | | | |
| | 1000 | | | | |
| | 100 | | | | |
| | 10 | | | | |
| | 1 | | | | |
| | 0.1 | | | | |

TABLE 7-continued

Bactericidal effect (log redn.) on *Staphylococcus aureus* (S), *Pseudomonas aeruginosa* (P) and *Escherichia coli* (E) by combination of biocide with Lupasol ® WF

| Biocide | Active Conc. [ppm] | Biocide alone (comparison) | Polymer Active Concentration Lupasol ® FG [1000 ppm] | [100 ppm] | [10 ppm] |
|---|---|---|---|---|---|
| 1,5-pentanedial | 10000 | | | | |
| | 5000 | | | | |
| | 2500 | | | | |
| | 500 | | | | |
| | 50 | | | | |
| | 5 | | | | |
| 1,2-ethanedial | 200000 | | | | |
| | 100000 | | | | |
| | 20000 | | | | |
| | 4000 | | | | |
| | 2000 | | | | |
| | 400 | | | | |
| formic acid | 20000 | | | | |
| | 16000 | | | | |
| | 8000 | | | | |
| | 4000 | | | | |
| | 1000 | | | | |
| | 500 | | | | |
| 2-bromo-2-nitropropane-1,3-diol | 10000 | | | | |
| | 5000 | | | | |
| | 1000 | | | | |
| | 500 | | | | |
| | 100 | | | | |
| | 50 | | | | |
| 2-phenoxy-1-ethanol | 10000 | | | | |
| | 5000 | | | | |
| | 1000 | | | | |
| | 500 | | | | |
| | 100 | | | | |
| | 50 | Polymer alone (comparison) | | | |

TABLE 8

Bactericidal effect (log redn.) on *Staphylococcus aureus* (S), *Pseudomonas aeruginosa* (P) and *Escherichia coli* (E) by combination of biocide with PEI (IV)

| Biocide | Active Conc. [ppm] | Biocide alone (comparison) | Polymer Active Concentration PEI (IV) [1000 ppm] | [100 ppm] | [10 ppm] |
|---|---|---|---|---|---|
| 5-chloro-2-(4-chlorophenoxy) phenol | 10000 | | | | |
| | 1000 | | | | |
| | 100 | | | | |
| | 10 | | | | |
| | 1 | | | | |
| | 0.1 | | | | |
| 2, 4, 4'-trichloro-2' hydroxyl-diphenylether | 10000 | | | | |
| | 1000 | | | | |
| | 100 | | | | |
| | 10 | | | | |
| | 1 | | | | |
| | 0.1 | | | | |
| 1,5-pentanedial | 10000 | | | | |
| | 5000 | | | | |
| | 2500 | | | | |
| | 500 | | | | |
| | 50 | | | | |
| | 5 | | | | |

TABLE 8-continued

Bactericidal effect (log redn.) on *Staphylococcus aureus* (S), *Pseudomonas aeruginosa* (P) and *Escherichia coli* (E) by combination of biocide with PEI (IV)

| Biocide | Active Conc. [ppm] | Biocide alone (comparison) | Polymer Active Concentration PEI (IV) [1000 ppm] | [100 ppm] | [10 ppm] |
|---|---|---|---|---|---|
| 1,2-ethanedial | 200000 | | | | |
| | 100000 | | | | |
| | 20000 | | | | |
| | 4000 | | | | |
| | 2000 | | | | |
| | 400 | | | | |
| formic acid | 20000 | | | | |
| | 16000 | | | | |
| | 8000 | | | | |
| | 4000 | | | | |
| | 1000 | | | | |
| | 500 | | | | |
| 2-bromo-2-nitropropane-1,3-diol | 10000 | | | | |
| | 5000 | | | | |
| | 1000 | | | | |
| | 500 | | | | |
| | 100 | | | | |
| | 50 | | | | |
| 2-phenoxy-1-ethanol | 10000 | | | | |
| | 5000 | | | | |
| | 1000 | | | | |
| | 500 | | | | |
| | 100 | | | | |
| | 50 | Polymer alone (comparison) | | | |

Example 4: Fungicidal Effect

Fungicidal activities are determined according to method EN1275 against *Candida* albicans ATCC 10231 and *Aspergillus brasiliensis* ATCC 16404. Suspensions adjusted to pH 4, pH 7 and pH 9 by addition of citric acid and/or NaOH are used. Efficacies are given as log reduction calculated from total viable counts compared to the water control. The microbicidal activities are determined after the following contact times: 5 minutes, 15 minutes, 30 minutes, 60 minutes, 3 hours, 6 hours and 24 hours. Fungicidal effect (log red.) by the biocide alone, polyethylenimine alone, and by the combination of biocide and polyethylenimine are compiled in Tables 9 (Lupasol® FG), Table 10 (Lupasol® WF) and Table 11 (PEI (IV)).

TABLE 9

Fungicidal effect (log redn.) on Candida albicans (C) and Aspergillus brasiliensis (A) by combination of biocide with Lupasol® FG

| Biocide | Active Conc. [ppm] | Biocide alone (comparison) | Polymer Active Concentration Lupasol® FG [1000 ppm] | [100 ppm] | [10 ppm] |
|---|---|---|---|---|---|
| 5-chloro-2-(4-chlorophenoxy) phenol | 10000 | | | | |
| | 1000 | | | | |
| | 100 | | | | |
| | 10 | | | | |
| | 1 | | | | |
| | 0.1 | | | | |

TABLE 9-continued

Fungicidal effect (log redn.) on Candida albicans (C) and Aspergillus brasiliensis (A) by combination of biocide with Lupasol® FG

| Biocide | Active Conc. [ppm] | Biocide alone (comparison) | Polymer Active Concentration Lupasol® FG [1000 ppm] | [100 ppm] | [10 ppm] |
|---|---|---|---|---|---|
| 2, 4, 4'-trichloro-2' hydroxyl-diphenylether | 10000 | | | | |
| | 1000 | | | | |
| | 100 | | | | |
| | 10 | | | | |
| | 1 | | | | |
| | 0.1 | | | | |
| 1,5-pentanedial | 10000 | | | | |
| | 5000 | | | | |
| | 2500 | | | | |
| | 500 | | | | |
| | 50 | | | | |
| | 5 | | | | |
| 1,2-ethanedial | 200000 | | | | |
| | 100000 | | | | |
| | 20000 | | | | |
| | 4000 | | | | |
| | 2000 | | | | |
| | 400 | | | | |
| formic acid | 20000 | | | | |
| | 16000 | | | | |
| | 8000 | | | | |
| | 4000 | | | | |
| | 1000 | | | | |
| | 500 | | | | |
| | 10000 | | | | |
| 2-bromo-2-nitropropane-1,3-diol | 5000 | | | | |
| | 1000 | | | | |
| | 500 | | | | |
| | 100 | | | | |
| | 50 | | | | |
| 2-phenoxy-1-ethanol | 10000 | | | | |
| | 5000 | | | | |
| | 1000 | | | | |
| | 500 | | | | |
| | 100 | | | | |
| | 50 | Polymer alone (comparison) | | | |

TABLE 10

Fungicidal effect (log redn.) on Candida albicans (C) and Aspergillus brasiliensis (A) by combination of biocide with Lupasol® WF

| Biocide | Active Conc. [ppm] | Biocide alone (comparison) | Polymer Active Concentration Lupasol® WF [1000 ppm] | [100 ppm] | [10 ppm] |
|---|---|---|---|---|---|
| 5-chloro-2-(4-chlorophenoxy) phenol | 10000 | | | | |
| | 1000 | | | | |
| | 100 | | | | |
| | 10 | | | | |
| | 1 | | | | |
| | 0.1 | | | | |
| 2, 4, 4'-trichloro-2' hydroxyl-diphenylether | 10000 | | | | |
| | 1000 | | | | |
| | 100 | | | | |
| | 10 | | | | |
| | 1 | | | | |
| | 0.1 | | | | |

TABLE 10-continued

Fungicidal effect (log redn.) on Candida albicans (C) and Aspergillus brasiliensis (A) by combination of biocide with Lupasol ® WF

| Biocide | Active Conc. [ppm] | Biocide alone (comparison) | Polymer Active Concentration Lupasol ® WF [1000 ppm] | [100 ppm] | [10 ppm] |
|---|---|---|---|---|---|
| 1,5-pentanedial | 10000 | | | | |
| | 5000 | | | | |
| | 2500 | | | | |
| | 500 | | | | |
| | 50 | | | | |
| | 5 | | | | |
| 1,2-ethanedial | 200000 | | | | |
| | 100000 | | | | |
| | 20000 | | | | |
| | 4000 | | | | |
| | 2000 | | | | |
| | 400 | | | | |
| formic acid | 20000 | | | | |
| | 16000 | | | | |
| | 8000 | | | | |
| | 4000 | | | | |
| | 1000 | | | | |
| | 500 | | | | |
| 2-bromo-2-nitropropane-1,3-diol | 10000 | | | | |
| | 5000 | | | | |
| | 1000 | | | | |
| | 500 | | | | |
| | 100 | | | | |
| | 50 | | | | |
| 2-phenoxy-1-ethanol | 10000 | | | | |
| | 5000 | | | | |
| | 1000 | | | | |
| | 500 | | | | |
| | 100 | | | | |
| | 50 | Polymer alone (comparison) | | | |

TABLE 11

Fungicidal effect (log redn.) on Candida albicans (C) and Aspergillus brasiliensis (A) by combination of biocide with PEI (IV)

| Biocide | Active Conc. [ppm] | Biocide alone (comparison) | Polymer Active Concentration PEI (IV) [1000 ppm] | [100 ppm] | [10 ppm] |
|---|---|---|---|---|---|
| 5-chloro-2-(4-chlorophenoxy) phenol | 10000 | | | | |
| | 1000 | | | | |
| | 100 | | | | |
| | 10 | | | | |
| | 1 | | | | |
| | 0.1 | | | | |
| 2, 4, 4'-trichloro-2' hydroxyl-diphenylether | 10000 | | | | |
| | 1000 | | | | |
| | 100 | | | | |
| | 10 | | | | |
| | 1 | | | | |
| | 0.1 | | | | |
| 1,5-pentanedial | 10000 | | | | |
| | 5000 | | | | |
| | 2500 | | | | |
| | 500 | | | | |
| | 50 | | | | |
| | 5 | | | | |
| 1,2-ethanedial | 200000 | | | | |
| | 100000 | | | | |
| | 20000 | | | | |

TABLE 11-continued

Fungicidal effect (log redn.) on Candida albicans (C) and Aspergillus brasiliensis (A) by combination of biocide with PEI (IV)

| Biocide | Active Conc. [ppm] | Biocide alone (comparison) | Polymer Active Concentration PEI (IV) [1000 ppm] | [100 ppm] | [10 ppm] |
|---|---|---|---|---|---|
| | 4000 | | | | |
| | 2000 | | | | |
| | 400 | | | | |
| formic acid | 20000 | | | | |
| | 16000 | | | | |
| | 8000 | | | | |
| | 4000 | | | | |
| | 1000 | | | | |
| | 500 | | | | |
| 2-bromo-2-nitropropane-1,3-diol | 10000 | | | | |
| | 5000 | | | | |
| | 1000 | | | | |
| | 500 | | | | |
| | 100 | | | | |
| | 50 | | | | |
| 2-phenoxy-1-ethanol | 10000 | | | | |
| | 5000 | | | | |
| | 1000 | | | | |
| | 500 | | | | |
| | 100 | | | | |
| | 50 | Polymer alone (comparison) | | | |

The invention claimed is:

1. A liquid composition comprising:

a) phenoxyethanol, and b) a polyethylenimine, wherein the polyethylenimine is an oligomer or polymer grafted with 0.01 to 100 parts by weight of ethylene oxide on 1 part by weight of the polyethylenimine;

wherein the polyethylenimine and the phenoxyethanol form a synergistic mixture in which the polyethylenimine enhances antimicrobial activity of the phenoxyethanol against at least one of *Pseudomonas aeruginosa* and *Staphylococcus aureus*; and wherein one of conditions (I) or (II) also apply to the liquid composition:

(I) the phenoxyethanol is present in an amount from 0.1% to 1% b.w. relative to the liquid composition total weight, and the polyethylenimine is present in an amount from 0.005% to 1% b.w. relative to the liquid composition total weight; or (II) the phenoxyethanol is present in an amount from 0.1% to 5% b.w. relative to the liquid composition total weight, and the polyethylenimine is present in an amount from 0.001 to 10 parts by weight per 1 part by weight of the phenoxyethanol, the liquid composition further comprises a surfactant, and the liquid composition is in the form of an aqueous composition further comprising water.

2. The liquid composition of claim 1, wherein:

condition (I) applies to the liquid composition; and the polyethylenimine is present in an amount from 0.001 to 2 parts by weight per 1 part by weight of the phenoxyethanol.

3. The liquid composition of claim 1, wherein condition (II) applies to the liquid composition.

4. The liquid composition of claim 3, wherein the water is present in the aqueous composition in an amount of at least 50% b.w. relative to the liquid composition total weight.

5. The liquid composition of claim 1, wherein:

the phenoxyethanol is present in an amount from 0.1% to 1% b.w. relative to the liquid composition total weight; and the polyethylenimine is present in an amount from 50 ppm to 1000 ppm relative to the liquid composition total weight.

6. The liquid composition of claim 1, wherein the liquid composition is in the form of a liquid home care formulation or a liquid personal care formulation.

7. The liquid composition of claim 1, wherein the polyethylenimine has a number-average molecular weight in the range from 500 to 2,000,000 g/mol.

8. The liquid composition of claim 1, wherein the polyethylenimine is a grafted variant of a branched polyethylenimine homopolymer, whose uncharged form conforms to the empirical formula $-(CH_2CH_2NH)_n-$, wherein n ranges from approximately 10 to 100000.

9. The liquid composition of claim 1, further comprising:

at least one of a surface active agent, a hydrotropic agent, a further antimicrobial agent, a stabilizing agent for phenoxyethanol in the composition, and a stabilizing agent for polyamine in the composition.

10. The liquid composition of claim 1, further comprising a surfactant selected from the group consisting of anionic surfactants, cationic surfactants, nonionic surfactants, amphoteric surfactants, and combinations thereof.

11. The liquid composition of claim 1, further comprising a surfactant in an amount from 0.001% to 80% b.w. relative to the liquid composition total weight.

12. The liquid composition of claim 1, wherein the liquid composition is in the form of a liquid home care formulation selected from the group consisting of a disinfectant, all purpose cleaner, laundry detergent, dishwashing liquid, deodorant, fabric conditioner, product for disinfection and sanitization of hard surfaces, floor cleaner, glass cleaner, kitchen cleaner, bath cleaner, sanitary cleaner, hygiene rinse product for fabrics, carpet cleaner, furniture cleaner, or a product for conditioning, sealing, caring or treating hard and soft surfaces.

13. The liquid composition of claim 1, further comprising at least one further component selected from the group consisting of alkoxylated alcohols, sodium C14-17alkyl-sec-sulfonate, lauryl-myristyl sulfate sodium salt, diethyleneglycol monobutyl ether, citric acid, acid blue, a mixture of sodium benzotriazolyl butylphenol sulfonate and buteth-3 and tributylcitrate, hydroxydichlorodiphenyl ether, alkyl polyglycoside, sodium cumenesulfonate, sodium C13-17-alkanesulfonate, trisodiumcitrate dihydrate, isopropyl alcohol, C12-15 pareth-7, C14-15 pareth-7, quaternium 18, dihydrogenated tallowethyl hydroxyethylamonium, sodium dodecylbenzenesulfonate, dodecylbenzenesulfonic acid, a mixture of sodium tallowate and sodium cocoate, triethanolamine, fluorescent whitening agent, trideceth-12, pentasodium triphosphate, sodium sulfate, a mixture of water and sodium hydroxide, glycerin, oleic acid, sodium borate, cellulose gum, oleth-10, magnesium chloride, PPG-2 methylether, sodium lauryl sulfate, capryleth-4, acetic acid, propyl alcohol, hydrogen peroxide, benzoic acid, sodium chloride, sodium sulfate, lauryl glucoside, coco betaine, SD Alcohol 39-C, C9-11 pareth-8, a further cationic polymer, propylene glycol, laureth-9, and combinations thereof.

14. The liquid composition of claim 1, wherein:

condition (II) applies to the liquid composition;

the phenoxyethanol is present in an amount from 0.1% to 1% b.w. relative to the liquid composition total weight;

the polyethylenimine is present in an amount from 0.005% to 1% b.w. relative to the liquid composition total weight; and the polyethylenimine is present in an amount from 0.001 to 1 parts by weight per 1 part by weight of the phenoxyethanol.

15. A method of manufacturing a liquid formulation selected from the group consisting of home care formulations and personal care formulations, which method comprises:

adding the liquid composition of claim 1 to the liquid formulation.

16. The liquid composition of claim 1, wherein:

condition (II) applies to the liquid composition;

the phenoxyethanol is present in an amount from 0.1% to 2% b.w. relative to the liquid composition total weight;

the polyethylenimine is present in an amount from 0.005% to 1% b.w. relative to the liquid composition total weight; and the polyethylenimine is present in an amount from 0.001 to 2 parts by weight per 1 part by weight of the phenoxyethanol.

17. The liquid composition of claim 14, wherein:

the polyethylenimine is present in an amount from 0.005 to 1 parts by weight per 1 part by weight of the phenoxyethanol.

* * * * *